(12) United States Patent
Netsu

(10) Patent No.: US 11,130,347 B2
(45) Date of Patent: Sep. 28, 2021

(54) PRINTER

(71) Applicant: SEIKO EPSON CORPORATION, Tokyo (JP)

(72) Inventor: Takahiro Netsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/785,716

(22) Filed: Feb. 10, 2020

(65) Prior Publication Data

US 2020/0254770 A1 Aug. 13, 2020

(30) Foreign Application Priority Data

Feb. 12, 2019 (JP) .............................. JP2019-022314

(51) Int. Cl.
*B41J 2/175* (2006.01)
*G01F 23/292* (2006.01)

(52) U.S. Cl.
CPC ........ *B41J 2/17566* (2013.01); *G01F 23/292* (2013.01); *B41J 2002/17573* (2013.01)

(58) Field of Classification Search
CPC .......... B41J 2002/17573; G01F 23/292; G01F 23/2921; G01F 23/2922; G01F 23/2924; G01F 23/2925; G01F 29/2927; G01F 23/2928
See application file for complete search history.

(56) References Cited

U.S. PATENT DOCUMENTS

| | | | |
|---|---|---|---|
| 5,652,610 A | 7/1997 | Kawai et al. | |
| 5,689,290 A | 11/1997 | Saito et al. | |
| 5,691,760 A | 11/1997 | Hosier et al. | |
| 5,757,390 A | 5/1998 | Gragg et al. | |
| 6,086,178 A | 7/2000 | Kawashima et al. | |
| 6,098,029 A | 8/2000 | Takagi et al. | |
| 6,249,655 B1 | 6/2001 | Baek et al. | |
| 6,337,959 B1 | 1/2002 | Kwak et al. | |
| 6,513,892 B2 | 2/2003 | Inoue et al. | |
| 6,520,612 B1 | 2/2003 | Merz et al. | |
| 6,729,711 B1 | 5/2004 | Hashimoto et al. | |
| 7,049,622 B1 | 5/2006 | Weiss | |
| 7,522,308 B2 | 4/2009 | Ueda | |
| 7,753,500 B2 | 7/2010 | Nishida | |
| 7,872,746 B2 | 1/2011 | Gao et al. | |
| 7,984,980 B2 | 7/2011 | Kachi | |
| 9,279,711 B1 | 3/2016 | Guldalian | |
| 9,415,601 B1 | 8/2016 | Tsukida | |

(Continued)

FOREIGN PATENT DOCUMENTS

CN 201597251 U 10/2010
EP 2815884 A1 12/2014
(Continued)

*Primary Examiner* — Julian D Huffman
(74) *Attorney, Agent, or Firm* — Global IP Counselors, LLP

(57) ABSTRACT

Provided is a printer including an ink tank, a print head performing printing by using ink in the ink tank, a light source provided at the substrate and irradiating the ink tank with light from a side of the ink tank, a photoelectric conversion device provided at the substrate and detecting light incident from the ink tank in a period during which the light source emits light, and a processing unit detecting an amount of ink based on an output of the photoelectric conversion device.

11 Claims, 34 Drawing Sheets

(56) References Cited

U.S. PATENT DOCUMENTS

| | | |
|---|---|---|
| 10,065,426 B2 | 9/2018 | Hayashi et al. |
| 2001/0035887 A1 | 11/2001 | Altfather et al. |
| 2002/0003579 A1 | 1/2002 | Inagaki |
| 2002/0008722 A1 | 1/2002 | Imanaka et al. |
| 2002/0175979 A1 | 11/2002 | Morita et al. |
| 2004/0017445 A1 | 1/2004 | Kojima et al. |
| 2004/0057097 A1 | 3/2004 | Huang et al. |
| 2004/0109039 A1* | 6/2004 | Kojima ............... B41J 2/17513 347/19 |
| 2006/0152539 A1 | 7/2006 | Zhang et al. |
| 2007/0040858 A1 | 2/2007 | Campbell et al. |
| 2007/0229626 A1 | 10/2007 | Yano |
| 2008/0198188 A1 | 8/2008 | Umeda |
| 2009/0040251 A1 | 2/2009 | Motominami et al. |
| 2009/0115804 A1 | 5/2009 | Cai et al. |
| 2009/0153846 A1 | 6/2009 | Gan et al. |
| 2011/0112472 A1 | 5/2011 | Jacobson et al. |
| 2012/0097567 A1 | 4/2012 | Zhao et al. |
| 2013/0293624 A1 | 11/2013 | Lester et al. |
| 2013/0300786 A1 | 11/2013 | Muyskens et al. |
| 2014/0022292 A1 | 1/2014 | Jones et al. |
| 2014/0043384 A1 | 2/2014 | Nakano et al. |
| 2014/0125007 A1 | 5/2014 | Sakano et al. |
| 2014/0368564 A1 | 12/2014 | Aznoe et al. |
| 2015/0256701 A1 | 9/2015 | Kimura et al. |
| 2015/0365555 A1 | 12/2015 | Kinoshita et al. |
| 2016/0279962 A1 | 9/2016 | Ishida et al. |
| 2016/0298997 A1 | 10/2016 | Tence et al. |
| 2017/0057240 A1 | 3/2017 | Munakata |
| 2017/0234717 A1 | 8/2017 | Tsuboi et al. |
| 2018/0126744 A1 | 5/2018 | Moriyama et al. |
| 2018/0201492 A1 | 7/2018 | Jung et al. |
| 2019/0009532 A1 | 1/2019 | Koyano et al. |
| 2019/0391018 A1 | 12/2019 | Dann |
| 2020/0034672 A1 | 1/2020 | Konishi et al. |
| 2020/0122995 A1* | 4/2020 | Chernov ............... B67D 1/0888 |
| 2020/0171836 A1 | 6/2020 | Gardner et al. |
| 2020/0240826 A1 | 7/2020 | Vaughan et al. |
| 2020/0254754 A1 | 8/2020 | Netsu |
| 2020/0254768 A1 | 8/2020 | Netsu |
| 2020/0254771 A1 | 8/2020 | Netsu et al. |
| 2020/0254772 A1 | 8/2020 | Netsu |
| 2020/0254773 A1 | 8/2020 | Netsu |
| 2020/0254774 A1 | 8/2020 | Netsu |
| 2020/0254775 A1 | 8/2020 | Netsu |

FOREIGN PATENT DOCUMENTS

| | | |
|---|---|---|
| JP | 2001-105627 A | 4/2001 |
| JP | 2005-186388 A | 7/2005 |
| WO | 2009/016614 A2 | 2/2009 |

* cited by examiner

FIG. 44
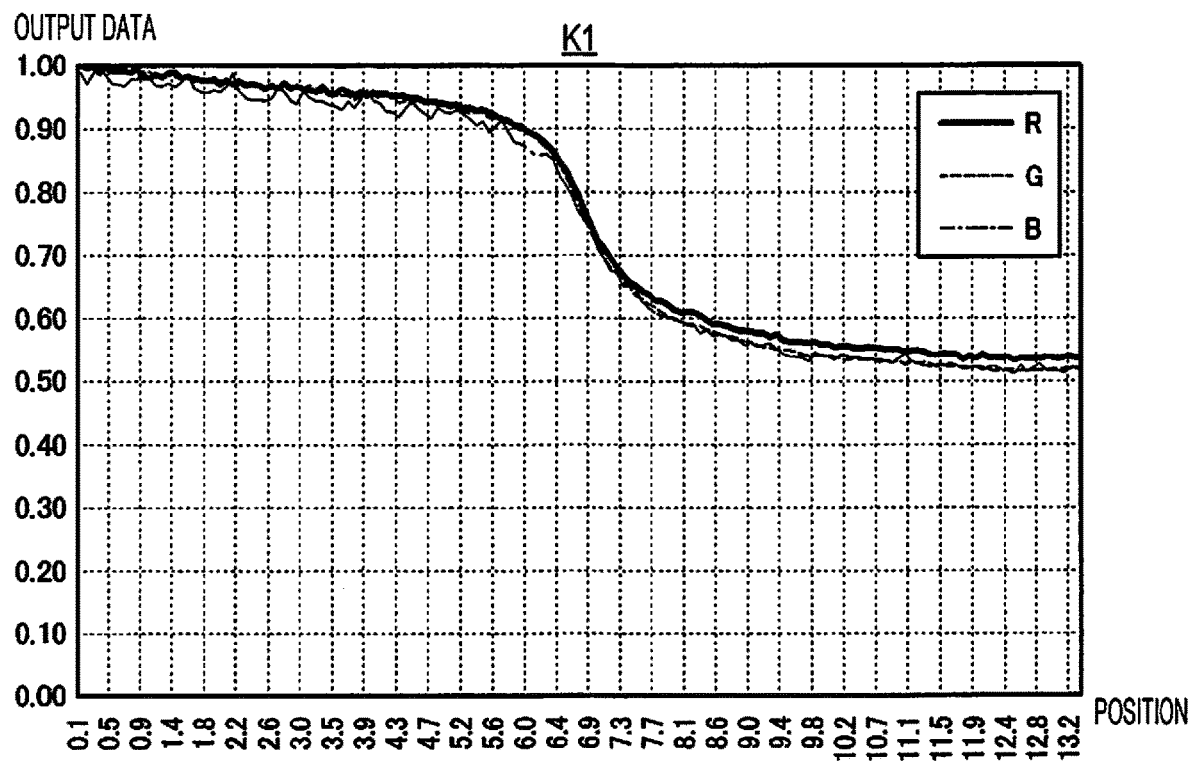
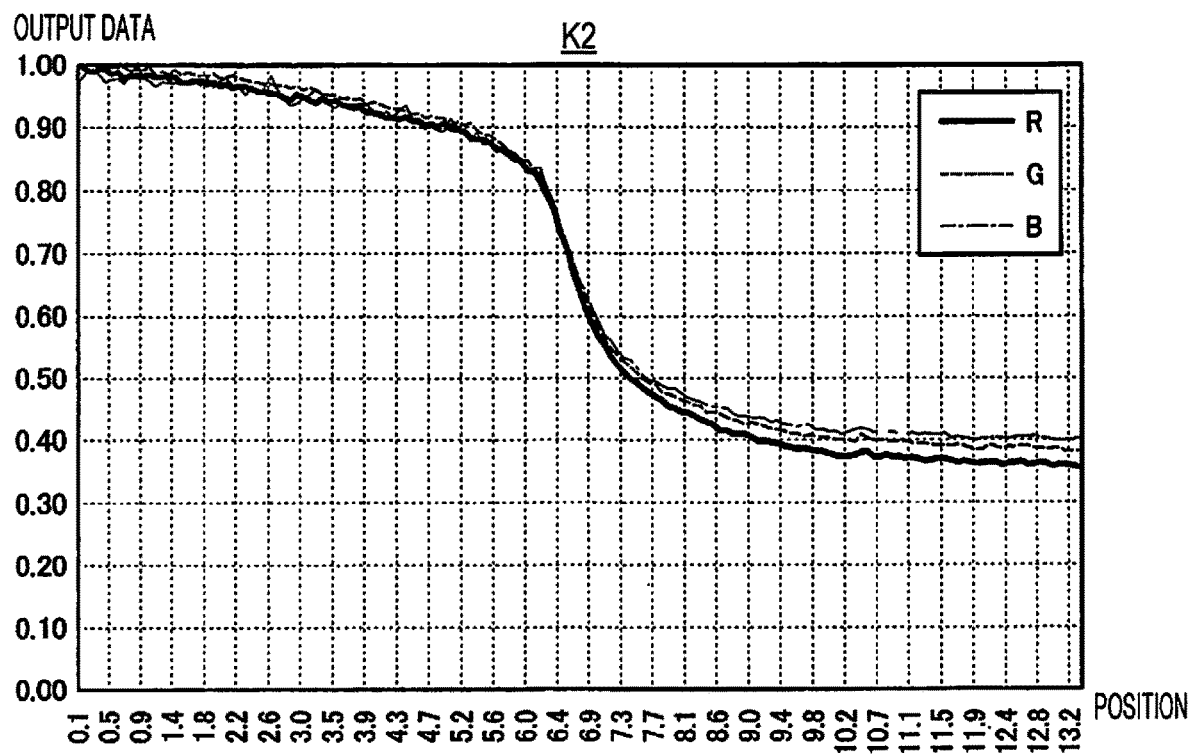

FIG. 45
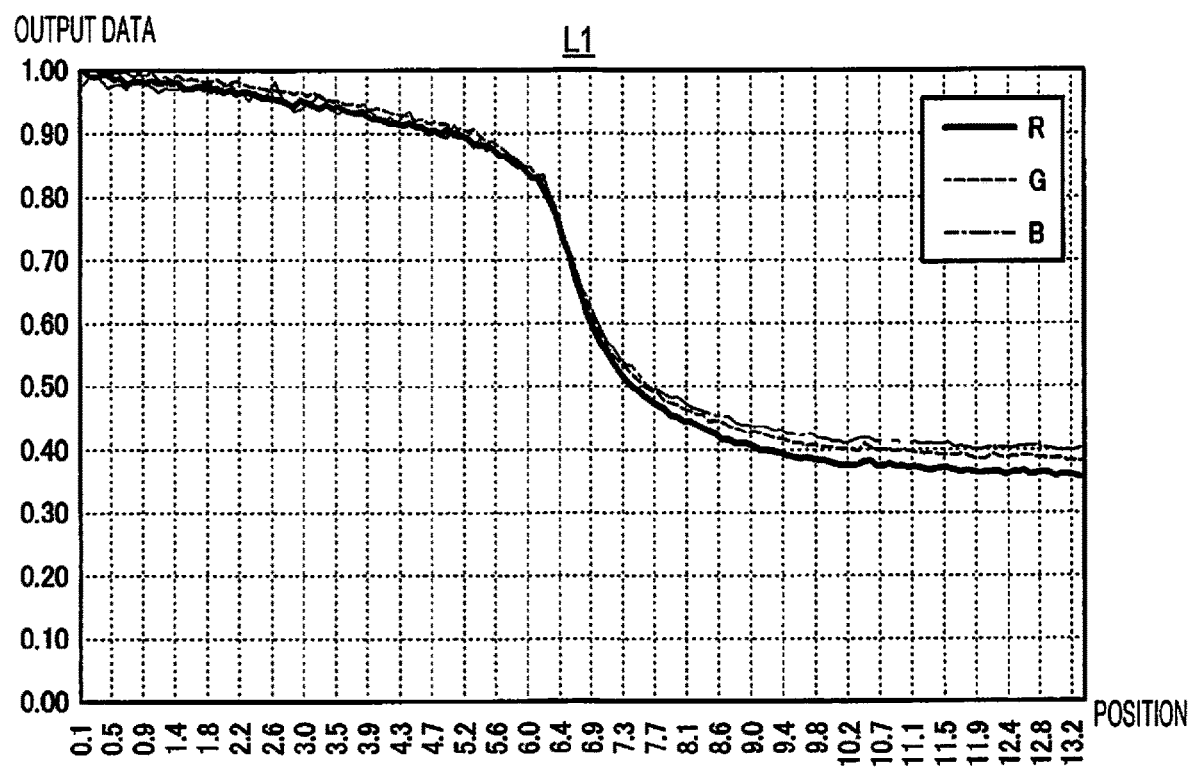
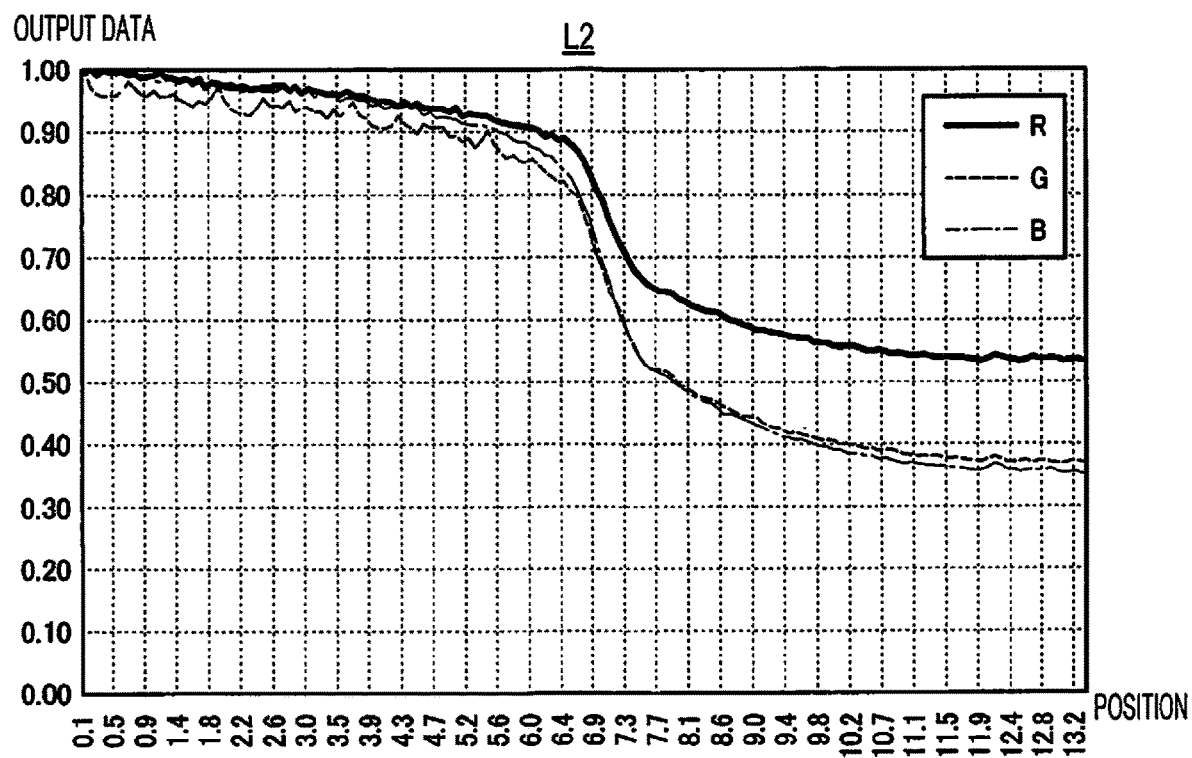

PRINTER

The present application is based on, and claims priority from JP Application Serial Number 2019-022314, filed Feb. 12, 2019, the disclosure of which is hereby incorporated by reference herein in its entirety.

BACKGROUND

1. Technical Field

The present disclosure relates to a printer and the like.

2. Related Art

In the related art, there is known a method for determining whether ink is present in an ink container in a printer that performs printing by using ink. For example, in JP-A-2001-105627, an ink supply device that detects a liquid level of ink by receiving light emitted from a light emitter and passing through an ink bottle by using a light receiver is disclosed.

Further improvements of the printer have been desired.

SUMMARY

An aspect of the present disclosure relates to a printer including: an ink tank, a print head performing printing by using ink in the ink tank, a substrate, a light source provided at the substrate and irradiating the ink tank with light from a side of the ink tank, a photoelectric conversion device provided at the substrate and detecting light incident from the ink tank in a period during which the light source emits light, and a processing unit detecting an amount of ink in the ink tank based on an output of the photoelectric conversion device. In the configuration using transmitted light, it is necessary to provide a light emitting unit and a light receiving unit in different directions with respect to the ink tank, but in this aspect, a member for ink amount detection can be efficiently disposed.

BRIEF DESCRIPTION OF THE DRAWINGS

FIG. 44 is a diagram illustrating a relationship between output data of yellow ink and output data of magenta ink.

FIG. 45 is a diagram illustrating a relationship between output data of magenta dye ink and output data of magenta pigment ink.

DESCRIPTION OF EXEMPLARY EMBODIMENTS

Hereinafter, the present embodiments will be described. The present embodiments described below do not unduly limit the content described in claims. Also, not all configurations described in the present embodiment are essential configuration requirements.

Figure 1:
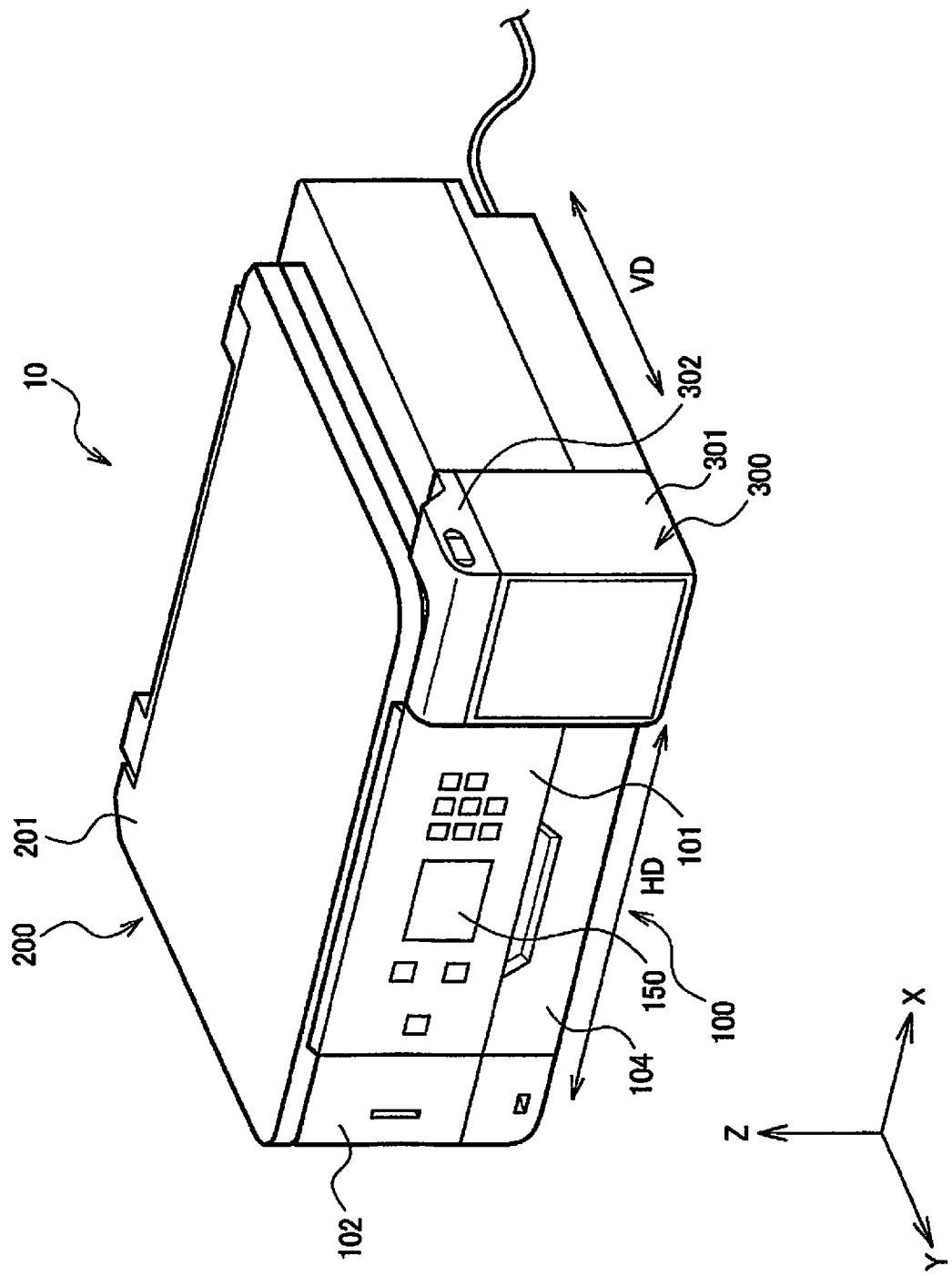
FIG. 1 is a perspective diagram illustrating a configuration of an electronic apparatus.

1. Configuration Example of Electronic Apparatus
1.1 Basic Configuration of Electronic Apparatus FIG. 1 is a perspective diagram of an electronic apparatus 10 according to the present embodiment. The electronic apparatus 10 is a multi-function peripheral (MFP) including a printer unit 100 and a scanner unit 200. The electronic apparatus 10 may have other functions such as a facsimile function in addition to a printing function and a scanning function. Alternatively, only the printing function may be provided without a scanning function. The electronic apparatus 10 includes an ink tank unit 300 that accommodates ink tanks 310. The printer unit 100 is an ink jet printer which executes printing by using ink supplied from the ink tanks 310. Hereinafter, the description of the electronic apparatus 10 can be appropriately replaced with a printer.

FIG. 1 illustrates a Y-axis, an X-axis orthogonal to the Y-axis, and a Z-axis orthogonal to the X-axis and the Y-axis. In each of the XYZ axes, a direction of an arrow indicates a positive direction, and a direction opposite from the direction of the arrow indicates a negative direction. Hereinafter, the positive direction of the X-axis is described as +X direction and the negative direction is described as −X direction. The same applies to the Y-axis and the Z-axis. The electronic apparatus 10 is disposed on a horizontal plane defined by the X-axis and the Y-axis in a use state, and the +Y direction is the front of the electronic apparatus 10. The Z-axis is an axis orthogonal to the horizontal plane, and −Z direction is vertically downward direction.

The electronic apparatus 10 has an operation panel 101 as a user interface unit. The operation panel 101 is provided with buttons for performing, for example, an ON/OFF operation of a power supply of the electronic apparatus 10, an operation related to printing using the printing function, and an operation related to reading of a document using the scanning function. The operation panel 101 is also provided with a display unit 150 for displaying an operating state of the electronic apparatus 10 and a message or the like. Further, the display unit 150 displays the ink amount detected by the method described later. Further, the operation panel 101 may be provided with a reset button for the user to replenish ink in the ink tank 310 to execute reset processing.

1.2 Printer Unit and Scanner Unit

The printer unit 100 performs printing on a printing medium P such as printing paper by ejecting ink. The printer unit 100 has a case 102 which is an outer shell of the printer unit 100. On a front side of the case 102, a front cover 104 is provided. Here, the "front" represents a face on which the operation panel 101 is provided and represents a face in +Y direction of the electronic apparatus 10. The operation panel 101 and the front cover 104 are pivotable around the X-axis with respect to the case 102. The electronic apparatus 10 includes a paper cassette (not illustrated), and the paper cassette is provided in the −Y direction with respect to the front cover 104. The paper cassette is coupled to the front cover 104 and detachably attached to the case 102. A paper discharge tray (not illustrated) is provided in the +Z direction of the paper cassette, and the paper discharge tray can be expanded and contracted in the +Y direction and the −Y direction. The paper discharge tray is provided in the −Y direction with respect to the operation panel 101 in the state illustrated in FIG. 1, and exposed to the outside by the pivoting of the operation panel 101.

The X-axis is a main scanning axis HD of a print head 107, and the Y-axis is a sub-scanning axis VD of the printer unit 100. A plurality of printing media P are placed in a stacked state on the paper cassette. The printing media P placed on the paper cassette are supplied one by one into the case 102 along the sub-scanning axis VD, printed by the printer unit 100, discharged along the sub-scanning axis VD, and placed on the paper discharge tray.

The scanner unit 200 is mounted on the printer unit 100. The scanner unit 200 has a case 201. The case 201 constitutes the outer shell of the scanner unit 200. The scanner unit 200 is of a flat bed type and has a document table formed of a transparent plate-like member such as glass and an image sensor. The scanner unit 200 reads an image or the like recorded on a medium such as paper as image data via an image sensor. The electronic apparatus 10 may be provided with an automatic document feeder (not illustrated). The scanner unit 200 sequentially feeds a plurality of stacked documents while reversing them one by one by the automatic document feeder, and reads them by using the image sensor.

1.3 Ink Tank Unit and Ink Tank

The ink tank unit 300 has a function of supplying ink IK to the print head 107 included in the printer unit 100. The ink tank unit 300 includes a case 301, and the case 301 has a lid 302. A plurality of ink tanks 310 are accommodated in the case 301.

Figure 2:
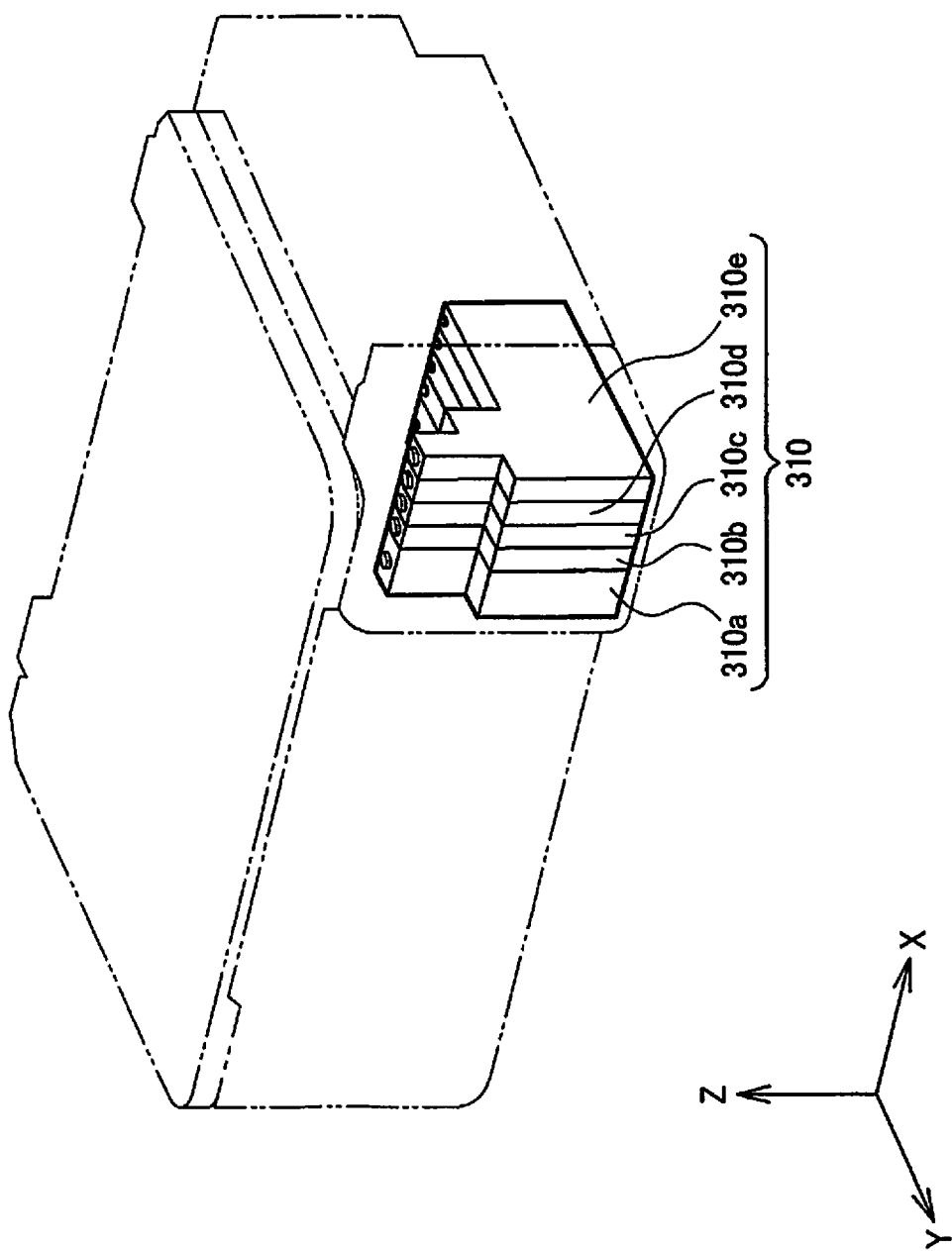
FIG. 2 is a diagram for explaining an arrangement of ink tanks in the electronic apparatus.

FIG. 2 is a diagram illustrating a state of the ink tanks 310 being accommodated. A portion indicated by a solid line in FIG. 2 represents the ink tanks 310. A plurality of inks IK of different kinds are individually accommodated in the plurality of ink tanks 310. That is, different kinds of inks IK are accommodated in the plurality of ink tanks 310 for each ink tank 310.

In the example illustrated in FIG. 2, the ink tank unit 300 accommodates five ink tanks 310a, 310b, 310c, 310d, and 310e. In the present embodiment, five kinds of inks are adopted, as the kinds of inks: two kinds of black inks, color inks of yellow, magenta, and cyan. Two kinds of black inks are pigment ink and dye ink. Ink IKa which is black pigment ink is accommodated in the ink tank 310a. The respective color inks IKb, IKc, and IKd of yellow, magenta, and cyan are accommodated in the ink tanks 310b, 310c, and 310d. Ink IKe which is a black dye ink is accommodated in the ink tank 310e.

The ink tanks 310a, 310b, 310c, 310d, and 310e are arranged side by side in this order along the +X direction, and fixed in the case 301. Hereinafter, when the five ink tanks 310a, 310b, 310c, 310d, and 310e and the five kinds of inks IKa, IKb, IKc, IKd, and IKe are not distinguished, they are simply expressed as the ink tank 310 and the ink IK.

In the present embodiment, ink IK is configured to be able to be filled into the ink tank 310 from the outside of the electronic apparatus 10 by the user for each of the five ink tanks 310. Specifically, the user of the electronic apparatus 10 fills ink IK accommodated in another container into the ink tank 310 from an ink filling port 311 to perform replenishment.

Figure 15:
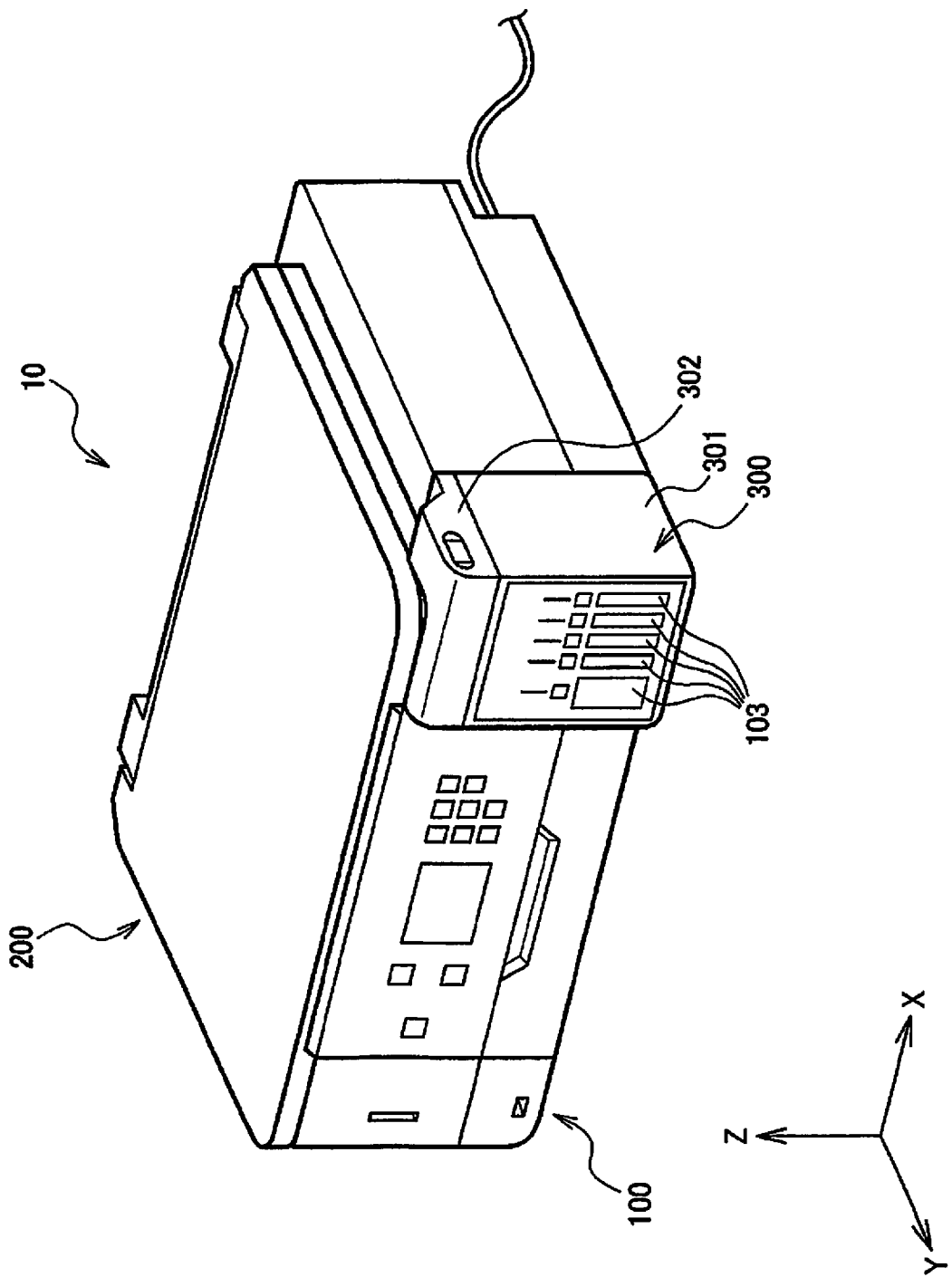
FIG. 15 is a perspective diagram of an electronic apparatus including a window portion.

In the present embodiment, the capacity of the ink tank 310a is larger than the capacities of the ink tanks 310b, 310c, 310d, and 310e. The capacities of the ink tanks 310b, 310c, 310d, and 310e are the same as each other. In the printer unit 100, it is assumed that the black pigment ink IKa is consumed more than that of the color inks IKb, IKc, and IKd and the black dye ink IKe. The ink tank 310a accommodating the black pigment ink IKa is disposed at a position close to the center of the electronic apparatus 10 on the X-axis. In this way, for example, when the case 301 has a window portion 103 as illustrated in FIG. 15 described later, the remaining amount of ink that is frequently used is easily confirmed. However, the arrangement order of the five ink tanks 310a, 310b, 310c, 310d, and 310e is not particularly limited. When any one of the other inks IKb, IKc, IKd, and IKe is consumed more than the black pigment ink IKa, the ink IK may be accommodated in the ink tank 310a of a large capacity.

Figure 3:
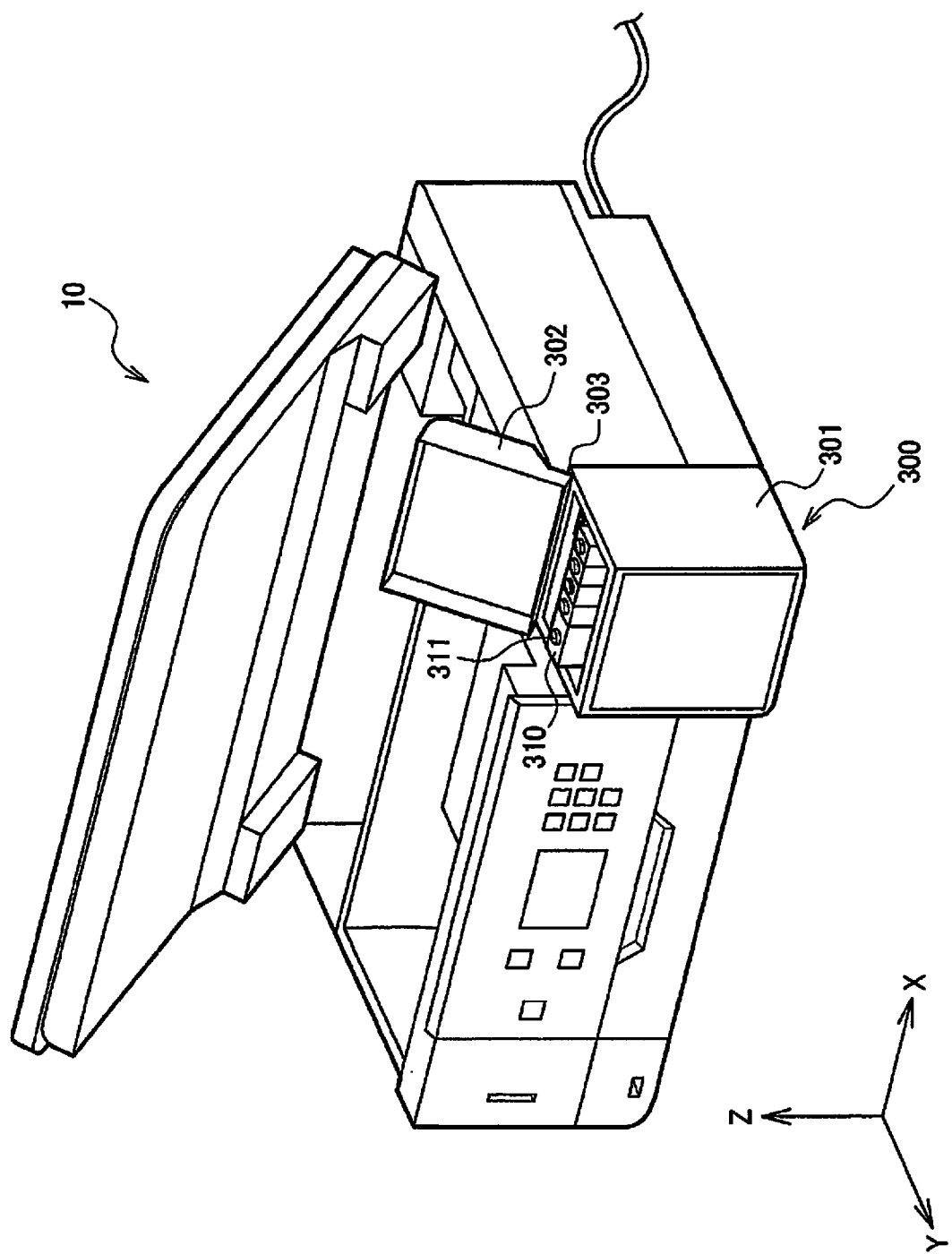
FIG. 3 is a perspective diagram of the electronic apparatus in a state where a lid of an ink tank unit is opened.

FIG. 3 is a perspective diagram of the electronic apparatus 10 in a state where the lid 302 of the ink tank unit 300 is opened. The lid 302 is pivotable with respect to the case 301 via a hinge portion 303. When the lid 302 is opened, five ink tanks 310 are exposed. More specifically, five caps corresponding to each ink tank 310 are exposed by opening the lid 302, and a portion of the ink tank 310 in the +Z direction is exposed by opening the caps. A portion of the ink tank 310 in the +Z direction is an area including an ink filling port 311 of the ink tank 310. When the ink IK is filled into the ink tank 310, the user accesses the ink tank 310 by pivoting the lid 302 and opening it upward.

Figure 4:
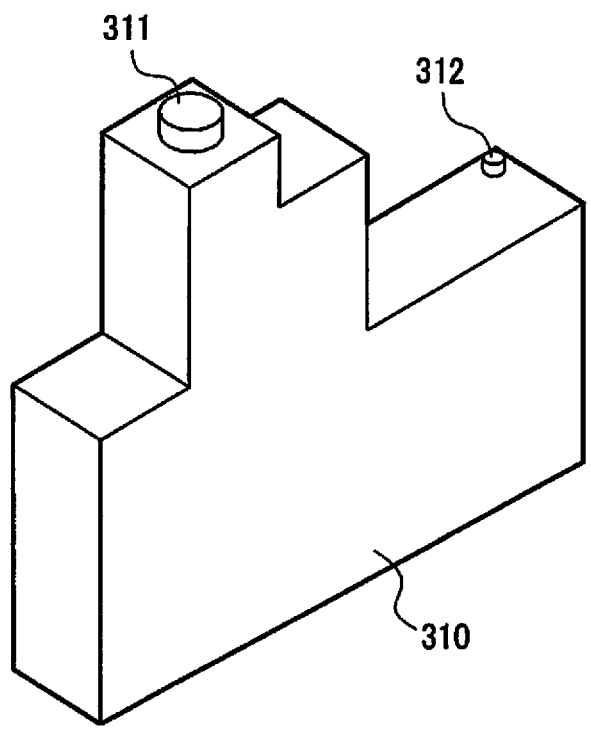
FIG. 4 is a perspective diagram illustrating a configuration of the ink tank.

FIG. 4 is a diagram illustrating the configuration of the ink tank 310. Each axis of X, Y, and Z in FIG. 4 indicates an axis in a state where the electronic apparatus 10 is used in a normal posture and the ink tank 310 is appropriately fixed to the case 301. Specifically, the X-axis and the Y-axis are axes along the horizontal direction, and the Z-axis is an axis along a vertical direction. For each axis of XYZ, unless otherwise specified, the same shall apply in the following drawings. The ink tank 310 is a three-dimensional body in which the ±X direction is a short side direction and the ±Y direction is a longitudinal direction. Hereinafter, of the surfaces of the ink tank 310, a surface in the +Z direction is referred to as an upper surface, a surface in the −Z direction is referred to as a bottom surface, and surfaces in the ±X direction and ±Y direction are referred to as side surfaces. The ink tank 310 is formed of a synthetic resin such as nylon or polypropylene, for example.

When the ink tank unit 300 includes a plurality of ink tanks 310 as described above, each of the plurality of ink tanks 310 may be configured separately or may be configured integrally. When the ink tank 310 is integrally configured, the ink tank 310 may be integrally formed, or a plurality of ink tanks 310 formed separately may be integrally bundled or coupled together.

The ink tank 310 includes the filling port 311 into which ink IK is filled by the user, and a discharging port 312 for discharging the ink IK toward the print head 107. In the present embodiment, the upper surface of the portion on the +Y direction side that is a front side of the ink tank 310 is higher than the upper surface of the portion on the −Y direction side that is a rear side. The filling port 311 for filling ink IK from the outside is provided on the upper surface of the portion on the front side of the ink tank 310. The filling port 311 is exposed by opening the lid 302 and the cap as described above with reference to FIG. 3. The ink IK of each color can be replenished to the ink tank 310 by filling the ink IK from the filling port 311 by the user. The ink IK for the user to replenish the ink tank 310 is accommodated and provided in a separate replenishing container. The discharging port 312 for supplying ink to the print head 107 is provided on the upper surface of the portion on the rear side of the ink tank 310. Since the filling port 311 is provided on the side close to the front of the electronic apparatus 10, filling of the ink IK can be facilitated.

1.4 Other Configurations of Electronic Apparatus

Figure 5:
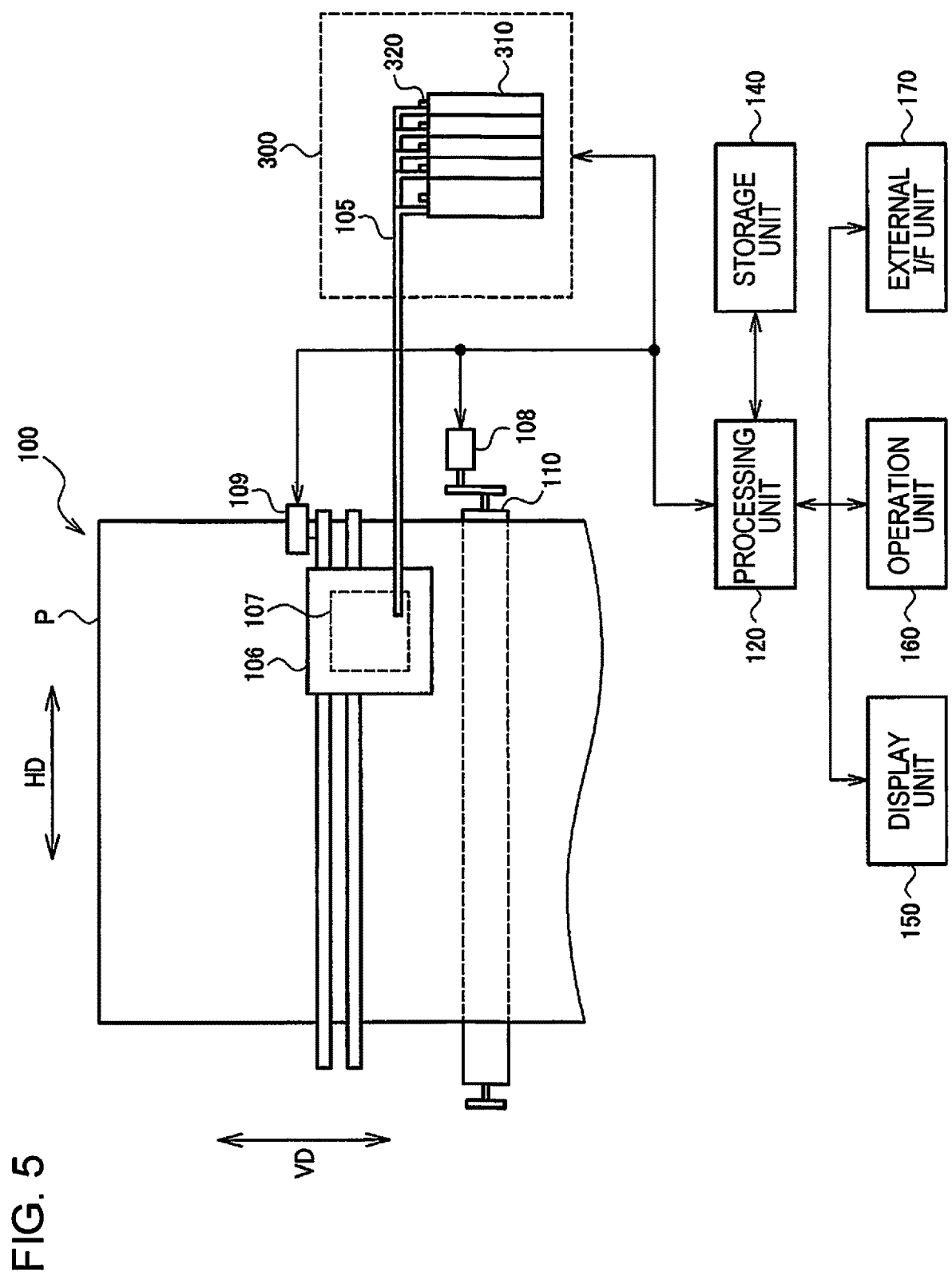
FIG. 5 is a diagram illustrating a configuration example of a printer unit and the ink tank unit.

FIG. 5 is a schematic configuration diagram of the electronic apparatus 10 according to the present embodiment. As illustrated in FIG. 5, the printer unit 100 according to the present embodiment includes a carriage 106, a paper feed motor 108, a carriage motor 109, a paper feed roller 110, a processing unit 120, a storage unit 140, the display unit 150, an operation unit 160, and an external I/F unit 170. In FIG. 5, the specific configuration of the scanner unit 200 is omitted. FIG. 5 is a diagram exemplifying a coupling relationship between each part of the printer unit 100 and the ink tank unit 300, and does not limit the physical structure or the positional relationship of each part. For example, in the arrangement of members such as the ink tank 310, the carriage 106, and a tube 105 in the electronic apparatus 10, various embodiments can be considered.

The print head 107 is mounted on the carriage 106. The print head 107 has a plurality of nozzles for ejecting ink IK in the −Z direction on the bottom surface side of the carriage 106. The tube 105 is provided between the print head 107 and each ink tank 310. Each ink IK in the ink tank 310 is sent to the print head 107 via the tube 105. The print head 107 ejects each ink IK sent from the ink tanks 310 to the printing medium P from the plurality of nozzles as ink droplets.

The carriage 106 is driven by the carriage motor 109 to reciprocate along the main scanning axis HD on the printing medium P. The paper feed motor 108 rotationally drives the paper feed roller 110 to transport the printing medium P along the sub-scanning axis VD. The ejection control of the print head 107 is performed by the processing unit 120 via a cable.

In the printer unit 100, printing is performed on the printing medium P by the carriage 106 ejecting the ink IK from the plurality of nozzles of the print head 107 to the printing medium P transported to the sub-scanning axis VD while moving along the main scanning axis HD, based on the control of the processing unit 120.

One end portion of the carriage 106 on the main scanning axis HD in a moving area is a home position area where the carriage 106 stands by. In the home position area, for example, a cap or the like (not illustrated) for performing maintenance such as cleaning the nozzle of the print head 107 is disposed. Also, a waste ink box for receiving waste ink when flushing or cleaning of the print head 107 is performed is disposed in the moving area of the carriage 106. The flushing means that ink IK is ejected from each nozzle of the print head 107 regardless of printing during printing of the printing medium P. The cleaning means cleaning the inside of the print head by sucking the print head by a pump or the like provided in the waste ink box, without driving the print head 107.

Here, an off-carriage type printer in which the ink tank 310 is provided at a location different from the carriage 106 is assumed. However, the printer unit 100 may be an on-carriage type printer in which the ink tank 310 is mounted on the carriage 106 and moved along the main scanning axis HD together with the print head 107. For example, in a printer for monochrome printing having one ink tank 310, the amount of ink IK to be accommodated is small, and even when the ink tank 310 is mounted on the carriage 106, the carriage is easily driven. Of course, also in a printer capable of color printing, the ink tank 310 may be mounted on the carriage 106.

The operation unit 160 and the display unit 150 as a user interface unit are coupled to the processing unit 120. The display unit 150 is for displaying various display screens and can be realized by, for example, a liquid crystal display or an organic EL display. The operation unit 160 is for the user to perform various operations and can be realized by various buttons, GUI, or the like. For example, as illustrated in FIG. 1, the electronic apparatus 10 includes the operation panel 101, and the operation panel 101 includes the display unit 150 and a button or the like as the operation unit 160. The display unit 150 and the operation unit 160 may be integrally configured by a touch panel. When the user operates the operation panel 101, the processing unit 120 operates the printer unit 100 and the scanner unit 200.

For example, in FIG. 1, the user operates the operation panel 101 to start operation of the electronic apparatus 10 after setting a document on a document table of the scanner unit 200. Then, the document is read by the scanner unit 200. Subsequently, based on the image data of the read document, the printing medium P is fed from the paper cassette into the printer unit 100, and printing is performed on the printing medium P by the printer unit 100.

An external device can be coupled to the processing unit 120 via the external I/F unit 170. The external device here is, for example, a personal computer (PC). The processing unit 120 receives the image data from the external device via the external I/F unit 170, and performs control for printing the image on the printing medium P by the printer unit 100. In addition, the processing unit 120 controls the scanner unit 200 to read the document and transmit the image data as a reading result to the external device via the external I/F unit 170, or to print the image data as the reading result.

The processing unit 120 performs, for example, drive control, consumption calculation processing, ink amount detection processing, and ink characteristics determination processing. The processing unit 120 of the present embodiment is configured by the following hardware. The hardware can include at least one of a circuit for processing a digital signal and a circuit for processing an analog signal. For example, the hardware can be configured by one or more circuit devices mounted on the circuit substrate or one or more circuit elements. The one or more circuit devices are, for example, ICs or the like. The one or more circuit elements are, for example, resistances, capacitors, or the like.

The processing unit 120 may be realized by the following processor. The electronic apparatus 10 of the present embodiment includes a memory that stores information, and a processor that operates based on information stored in the memory. The information is, for example, a program and various kinds of data. The processor includes hardware. As the processor, various processors such as a central processing unit (CPU), graphics processing unit (GPU), digital signal processor (DSP), or the like can be used. The memory may be semiconductor memory such as static random access memory (SRAM), dynamic random access memory (DRAM), or the like, and may be a register, or a magnetic storage device such as a hard disk device, or may be an optical storage device such as an optical disk device or the like. For example, the memory stores an instruction that can be read by a computer, and the function of each unit of the electronic apparatus 10 is realized as processing by executing the instruction by the processor. The instruction here may be an instruction of an instruction set constituting the program or an instruction for instructing the operation to the hardware circuit of the processor. In addition, the processor and the memory may be integrated as a system-on-a-chip (SOC).

The processing unit 120 controls the carriage motor 109 to perform drive control for moving the carriage 106. Based on the drive control, the carriage motor 109 drives to move the print head 107 provided on the carriage 106.

The processing unit 120 performs the consumption calculation processing of calculating a consumption of ink consumed by ejecting the ink IK from each nozzle of the print head 107. The processing unit 120 starts the consumption calculation processing with the state where each ink tank 310 is filled with the ink IK as an initial value. More specifically, when the user replenishes the ink IK to the ink tank 310 and presses a reset button, the processing unit 120 initializes a count value of the ink consumption with respect to the ink tank 310. Specifically, the count value of the ink consumption is set to 0 g. The processing unit 120 starts the consumption calculation processing with the pressing operation of the reset button as a trigger. The processing unit 120 executes the consumption calculation processing for each ink tank 310.

The processing unit 120 performs ink amount detection processing of detecting the amount of ink IK accommodated in the ink tank 310, based on the output of a sensor unit 320 provided corresponding to the ink tank 310 one by one. The processing unit 120 performs ink characteristics determination processing of determining the characteristics of the ink IK accommodated in the ink tank 310, based on the output of the sensor unit 320 provided corresponding to the ink tank 310. Details of the ink amount detection processing and ink characteristics determination processing are described later.

1.5 Detailed Configuration Example of Sensor Unit

Figure 6:
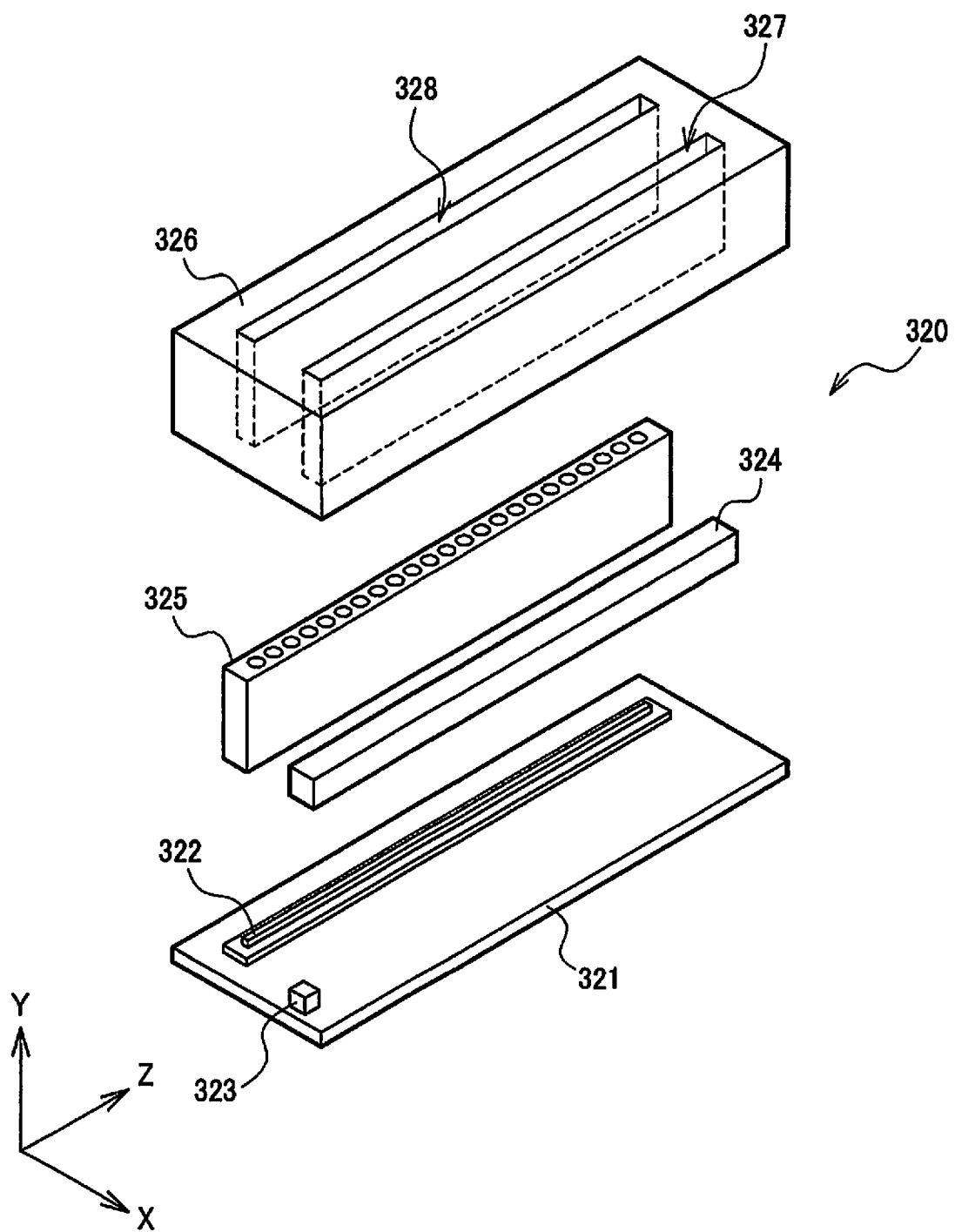
FIG. 6 is an exploded diagram of a sensor unit.

FIG. 6 is an exploded perspective diagram schematically illustrating the configuration of the sensor unit 320. The sensor unit 320 includes a substrate 321, a photoelectric conversion device 322, a light source 323, a light guide 324, a lens array 325, and a case 326.

The light source 323 and the photoelectric conversion device 322 are mounted on the substrate 321. The photoelectric conversion device 322 is a linear image sensor in which, for example, photoelectric conversion elements are arranged in a predetermined direction. The linear image sensor may be a sensor in which photoelectric conversion elements are arranged in one row or a sensor in which photoelectric conversion elements are arranged in two or more rows. The photoelectric conversion element is, for example, a photodiode (PD). A plurality of output signals based on a plurality of photoelectric conversion elements are acquired by using the linear image sensor. Therefore, not only whether the ink IK is present but also the position of the interface of the ink IK can be estimated.

The light source 323 has, for example, R, G, and B light emitting diodes (LED: Light emitting diode) and emits light sequentially while switching the R, G, and B light emitting diodes at high speed. The light emitting diode of R is represented as a red LED 323R, the light emitting diode of G is represented as a green LED 323G, and the light emitting diode of B is represented as a blue LED 323B. The light guide 324 is a rod-like member for guiding light, and the cross-sectional shape may be a square shape, a circular shape, or another shape. The longitudinal direction of the light guide 324 is a direction along the longitudinal direction of the photoelectric conversion device 322. Since light from the light source 323 goes out from the light guide 324, the light guide 324 and the light source 323 may be collectively referred to as a light source.

The light source 323, the light guide 324, the lens array 325, and the photoelectric conversion device 322 are accommodated between the case 326 and the substrate 321. The case 326 is provided with a first opening portion 327 for a light source and a second opening portion 328 for a photoelectric conversion device. Light emitted from the light source 323 enters the light guide 324, thereby the entire light guide emits light. Light emitted from the light guide 324 is emitted to the outside of the case 326 through the first opening portion 327. Light from the outside is inputted to the lens array 325 through the second opening portion 328. The lens array 325 guides the input light to the photoelectric conversion device 322. Specifically, the lens array 325 has a Selfoc lens array (Selfoc is a registered trademark) in which many refractive index distribution type lenses are arranged.

Figure 7:
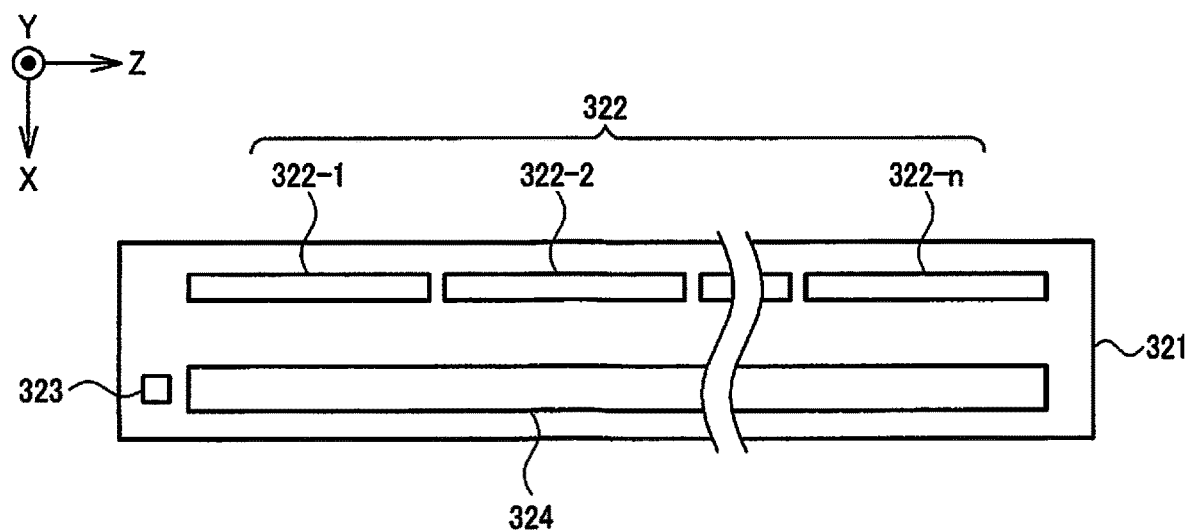
FIG. 7 is a diagram illustrating a positional relationship between a substrate, a photoelectric conversion device, and a light source.

FIG. 7 is a diagram schematically illustrating the arrangement of the photoelectric conversion devices 322. As illustrated in FIG. 7, n, n being an integer of 1 or more, photoelectric conversion devices 322 are arranged along a given direction on the substrate 321 side by side. Here, n may be 2 or more as illustrated in FIG. 7. That is, the sensor unit 320 includes a second linear image sensor provided on the longitudinal direction side of the linear image sensor. The linear image sensor is, for example, 322-1 in FIG. 7, and the second linear image sensor is 322-2. Each photoelectric conversion device 322 is a chip having many photoelectric conversion elements arranged side by side as described above. By using a plurality of photoelectric conversion devices 322, a reading range for detecting incident light is widened, thereby a target range for detecting the ink amount can be widened. However, the number of linear image sensors, that is, the setting of the target range for detecting the ink amount can be performed in various ways, and may extend over the entire range of the liquid level of ink IK, may be a part of the range of the liquid level of the ink IK, or the number of the linear image sensors may be one.

Figure 8:
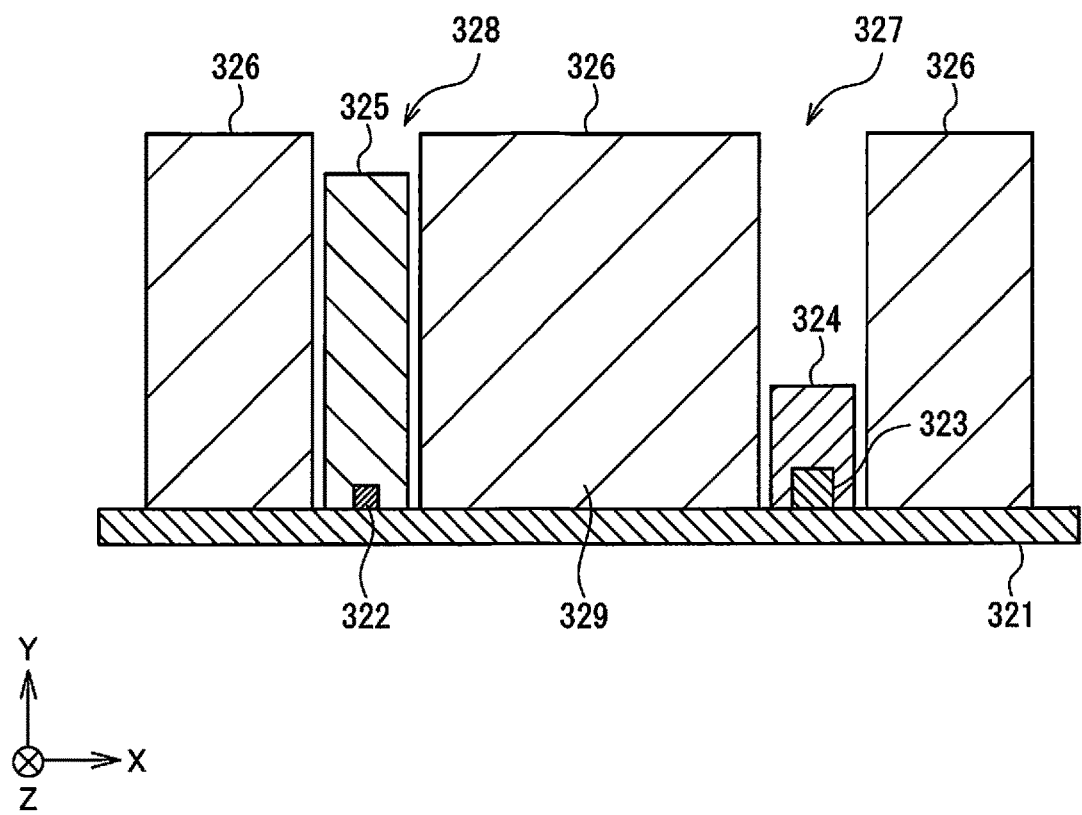
FIG. 8 is a sectional diagram of the sensor unit.

FIG. 8 is a sectional diagram schematically illustrating the arrangement of the sensor units 320. As can be seen from FIGS. 6 and 7, although the positions of the photoelectric conversion device 322 and the light source 323 do not overlap in the Z-axis, for convenience of describing the positional relationship with other members, the light source 323 is illustrated in FIG. 8. As illustrated in FIG. 8, the sensor unit 320 includes a light shielding wall 329 provided between the light source 323 and the photoelectric conversion device 322. The light shielding wall 329 is, for example, a portion of the case 326 and formed by extending a beam-like member between the first opening portion 327 and the second opening portion 328 to the substrate 321. The light shielding wall 329 shields direct light from the light source 323 toward the photoelectric conversion device 322. Since incidence of the direct light can be suppressed by providing the light shielding wall 329, detection accuracy of the ink amount can be enhanced. It is preferable that the light shielding wall 329 is capable of shielding direct light from the light source 323 toward the photoelectric conversion device 322, and the concrete shape is not limited to that in FIG. 8. A member separate from the case 326 is preferably used as the light shielding wall 329.

Figure 9:
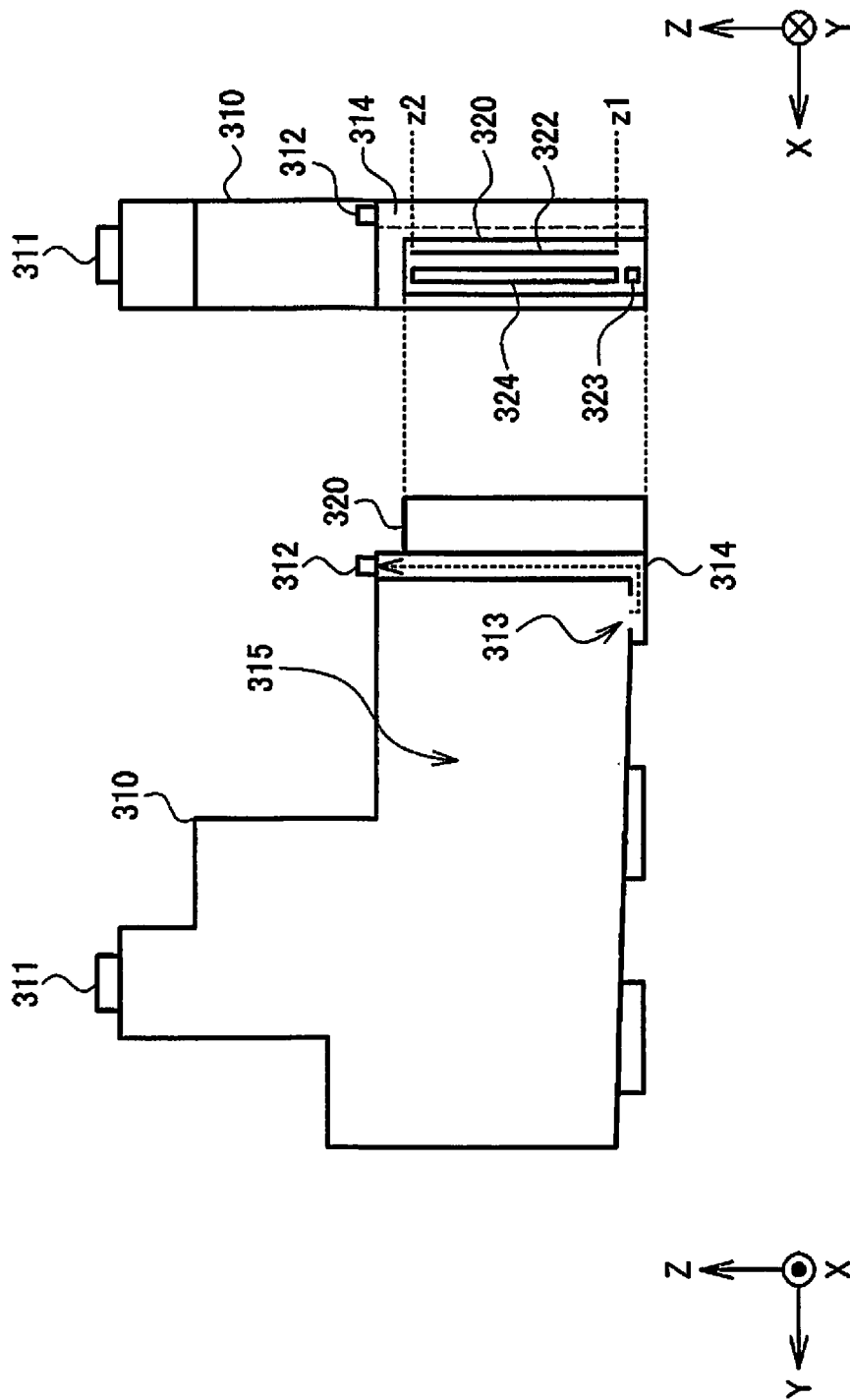
FIG. 9 is a diagram for explaining a positional relationship between the ink tank, the light source, and the photoelectric conversion device.

FIG. 9 is a diagram for explaining the positional relationship between the ink tank 310 and the sensor unit 320. As illustrated in FIG. 9, the sensor unit 320 is fixed to any wall surface of the ink tank 310 in such a posture that the longitudinal direction of the photoelectric conversion device 322 is the ±Z direction. That is, the photoelectric conversion device 322 as the linear image sensor is provided so that the longitudinal direction goes along the vertical direction. Here, the vertical direction represents the gravity direction and the reverse direction when the electronic apparatus 10 is used in a proper attitude.

In the example illustrated in FIG. 9, the sensor unit 320 is fixed to the side surface of the ink tank 310 in the −Y direction. That is, the substrate 321 provided with the photoelectric conversion device 322 is closer to the discharging port 312 than the filling port 311 of the ink tank 310. Whether printing in the printer unit 100 can be executed depends on whether the ink IK is supplied to the print head 107. Therefore, by providing the sensor unit 320 on the discharging port 312 side, the ink amount detection processing can be performed for a position where the ink amount is particularly important in the ink tank 310.

As illustrated in FIG. 9, the ink tank 310 may include a main container 315, a second discharging port 313, and an ink flow path 314. The main container 315 is a portion of the ink tank 310 that is used for accommodating the ink IK. The second discharging port 313 is, for example, an opening provided at a position in the most −Z direction in the main container 315. However, various modifications can be performed for the position and shape of the second discharging port 313. For example, when suction by a suction pump or supply of pressurized air by a pressure pump is performed on the ink tank 310, ink IK accumulated in the main container 315 of the ink tank 310 is discharged from the second discharging port 313. The ink IK discharged from the second discharging port 313 is guided in the +Z direction by the ink flow path 314, and discharged from the discharging port 312 to the outside of the ink tank 310. In this case, as illustrated in FIG. 9, detection processing of the proper ink amount can be performed by setting the positional relationship in which the ink flow path 314 and the photoelectric conversion device 322 do not face each other. For example, the ink flow path 314 is provided at the end of the ink tank 310 in the −X direction, and the sensor unit 320 is provided in the +X direction from the ink flow path 314. In this way, the decrease in accuracy of the ink amount detection processing can be suppressed by the ink in the ink flow path 314.

As described above, the "discharging port" in the present embodiment includes the discharging port 312 for discharging ink IK to the outside of the ink tank 310, and the second discharging port 313 for discharging ink IK from the main container 315 to the discharging port 312. Among them, the second discharging port 313 is more strongly related to whether ink IK is supplied to the print head 107. As illustrated in FIG. 9, the substrate 321 provided with the photoelectric conversion device 322 is closer to the second discharging port 313 than the filling port 311 of the ink tank 310. Thus, the ink amount detection processing can be performed for a position where the ink amount is particularly important. However, as the distance between the discharging port 312 and the second discharging port 313 becomes longer, it is necessary to lengthen the ink flow path 314, and the arrangement of the ink flow path 314 may become complicated. That is, it is desirable that the discharging port 312 and the second discharging port 313 are provided at positions close to each other. Therefore, as described above, by providing the substrate 321 at a position closer to the discharging port 312 than to the filling port 311, the ink amount detection processing can be performed for a position where the ink amount becomes important. The same applies to the following description. In the expression that a given member is "closer to the filling port 311 than to the discharging port 312 of the ink tank 310" or similar expressions, the discharging port 312 can be appropriately replaced with the second discharging port 313.

The sensor unit 320 may be bonded to the ink tank 310, for example. Alternatively, the sensor unit 320 may be mounted on the ink tank 310 by providing fixing members respectively to the sensor unit 320 and the ink tank 310 and fixing the members by fitting or the like. Various modifications can be performed in the shape, material, or the like of the fixing member.

The photoelectric conversion device 322 is provided in the range of z1 to z2, for example, in the Z-axis. The z1 and z2 are coordinate values in the Z-axis, and z1<z2. When the ink tank 310 is irradiated with light from the light source 323, absorption and scattering of light occur by the ink IK filled in the ink tank 310. Therefore, the portion of the ink tank 310 not filled with the ink IK becomes relatively bright, and the portion filled with the ink IK becomes relatively dark. For example, when the interface of the ink IK exists at the position of the coordinate value of z0 in the Z-axis, in the ink tank 310, the area of the Z coordinate value of z0 or less becomes dark and the area of the Z coordinate value of greater than z0 becomes bright.

As illustrated in FIG. 9, the position of the interface of the ink IK can be appropriately detected by providing the photoelectric conversion device 322 so that the longitudinal direction is the vertical direction. Specifically, in the case of z1<z0<z2, the photoelectric conversion elements arranged at a position corresponding to the range of z1 to z0 out of the photoelectric conversion device 322 has a relatively small amount of light to be inputted. Therefore, the output value becomes relatively small. The photoelectric conversion elements arranged at a position corresponding to the range of z0 to z2 has a relatively large amount of light to be inputted, so that the output value becomes relatively large. That is, z0 which is the interface of the ink IK can be estimated based on the output of the photoelectric conversion device 322. That is, it is possible to detect not only binary information relating to whether the ink amount is equal to or more than a predetermined amount but also a specific interface position. When the position of the interface is known, the ink amount can be estimated in units of milliliters or the like by preparing a conversion formula in advance based on the shape of the ink tank 310. When the output value of the entire range of z1 to z2 is large, the interface can be determined to be lower than z1, and when the output value of the entire range of z1 to z2 is small, the interface can be determined to be higher than z2. The range where the ink amount can be detected is a range of z1 to z2 which is a range where the photoelectric conversion device 322 is provided. Therefore, the detection range can be easily adjusted by changing the number of photoelectric conversion devices 322 and the length per chip. The resolution of ink amount detection is determined based on the longer pitch between the pitch of the photoelectric conversion device 322 and the pitch of the lens array 325. For example, when photoelectric conversion elements of the photoelectric conversion device 322 are provided at intervals of 20 micrometers and lenses of the lens array 325 are provided at intervals of 300 micrometers, the ink amount detection is performed in units of 300 micrometers. The specific resolution can be variously modified. However, according to the method of the present embodiment, it is possible to detect the ink amount with higher accuracy than the related art.

In consideration of the accurate detection of the ink amount, it is preferable that light emitted to the ink tank 310 be made to be approximately the same degree regardless of the position in the vertical direction. As described above, since whether the ink IK is present appears as a difference in brightness, variation in light amount of the irradiation light leads to reduction in accuracy. Therefore, the sensor unit 320 has a light guide 324 disposed so that the longitudinal direction is the vertical direction. The light guide 324 here is a rod-shaped light guide as described above. In consideration of uniformly illuminating the light guide, the light source 323 preferably causes the light to enter the light guide from the longitudinal direction, that is, the direction along the longitudinal direction of the light guide. Since the incident angle becomes large in this way, total reflection is easily generated.

Figure 10:
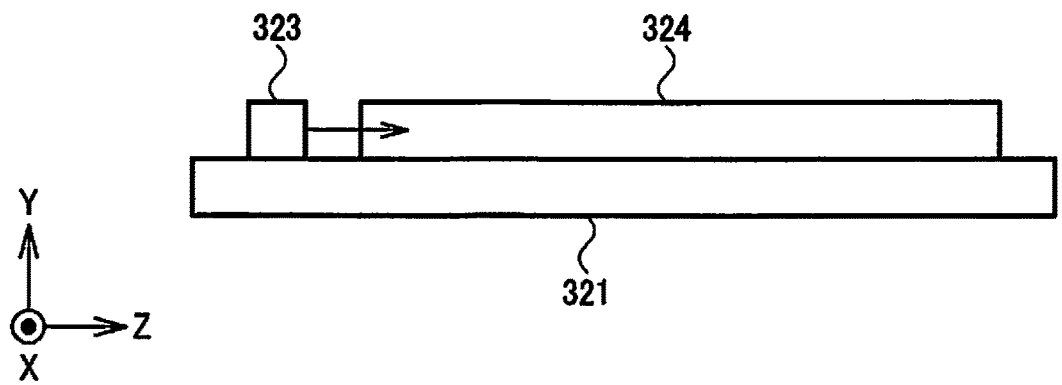
FIG. 10 is a diagram for explaining a positional relationship between the light source and a light guide.
Figure 11:
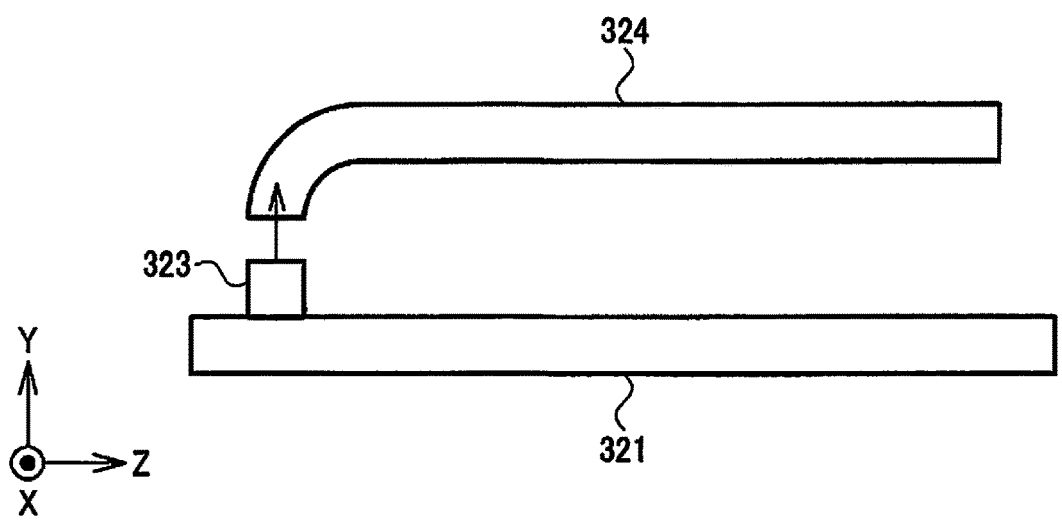
FIG. 11 is a diagram for explaining a positional relationship between the light source and the light guide.
Figure 12:
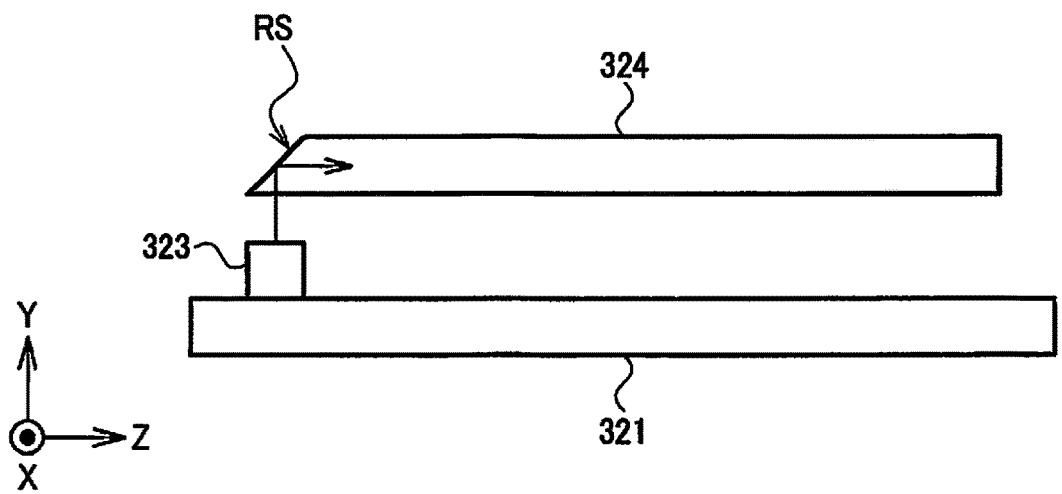
FIG. 12 is a diagram for explaining a positional relationship between the light source and the light guide.

FIGS. 10 to 12 are diagrams for explaining the positional relationship between the light source 323 and the light guide 324. For example, as illustrated in FIG. 10, the light source 323 and the light guide 324 may be provided so as to be aligned in the Z-axis. The light source 323 can guide light in the longitudinal direction of the light guide 324 by emitting light in the +Z direction. Alternatively, as illustrated in FIG. 11, the end of the light guide 324 on the light source side may be bent. In this way, the light source 323 can guide light in the longitudinal direction of the light guide 324 by emitting light in the direction perpendicular to the substrate 321. Alternatively, as illustrated in FIG. 12, a reflective surface RS may be provided at the end of the light guide 324 on the light source side. The light source 323 emits light in a direction perpendicular to the substrate 321. Light from the light source 323 is guided in the longitudinal direction of the light guide 324 by being reflected on the reflective surface RS. The light guide 324 according to the present embodiment can be widely applied to a known configuration such as providing a reflective plate on the −Y direction surface of the light guide 324 and changing the density of the reflective plate in accordance with the position from the light source 323. The light source 323 may be provided in the +Z direction from the light guide 324, or light sources 323 of the same color may be provided at both ends of the light guide 324, or the configuration of the light source 323 and the light guide 324 may be variously modified.

It is desirable that at least a portion of the inner wall of the ink tank 310 that faces the photoelectric conversion device 322 is higher in ink repellency than the outer wall of the ink tank 310. Of course, the entire inner wall of the ink tank 310 may be processed to enhance the ink repellency in comparison with the outer wall of the ink tank 310. The portion facing the photoelectric conversion device 322 may be the entire inner wall in the −Y direction of the ink tank 310 or a portion of the inner wall. Specifically, in the inner walls of the ink tank 310 in the −Y direction, the portion of the inner wall is an area including a portion where the position on the XZ plane overlaps the photoelectric conversion device 322. As will be described later with reference to FIG. 33, when an ink droplet adheres to the inner wall of the ink tank 310, the portion of the ink droplet becomes darker than a portion where no ink is present. Therefore, there is a possibility that the ink amount detection accuracy may be lowered due to the ink droplet. By enhancing the ink repellency of the inner wall of the ink tank 310, the adhesion of ink droplets can be suppressed.

1.6 Detailed Configuration Example of Sensor Unit and Processing Unit

Figure 13:
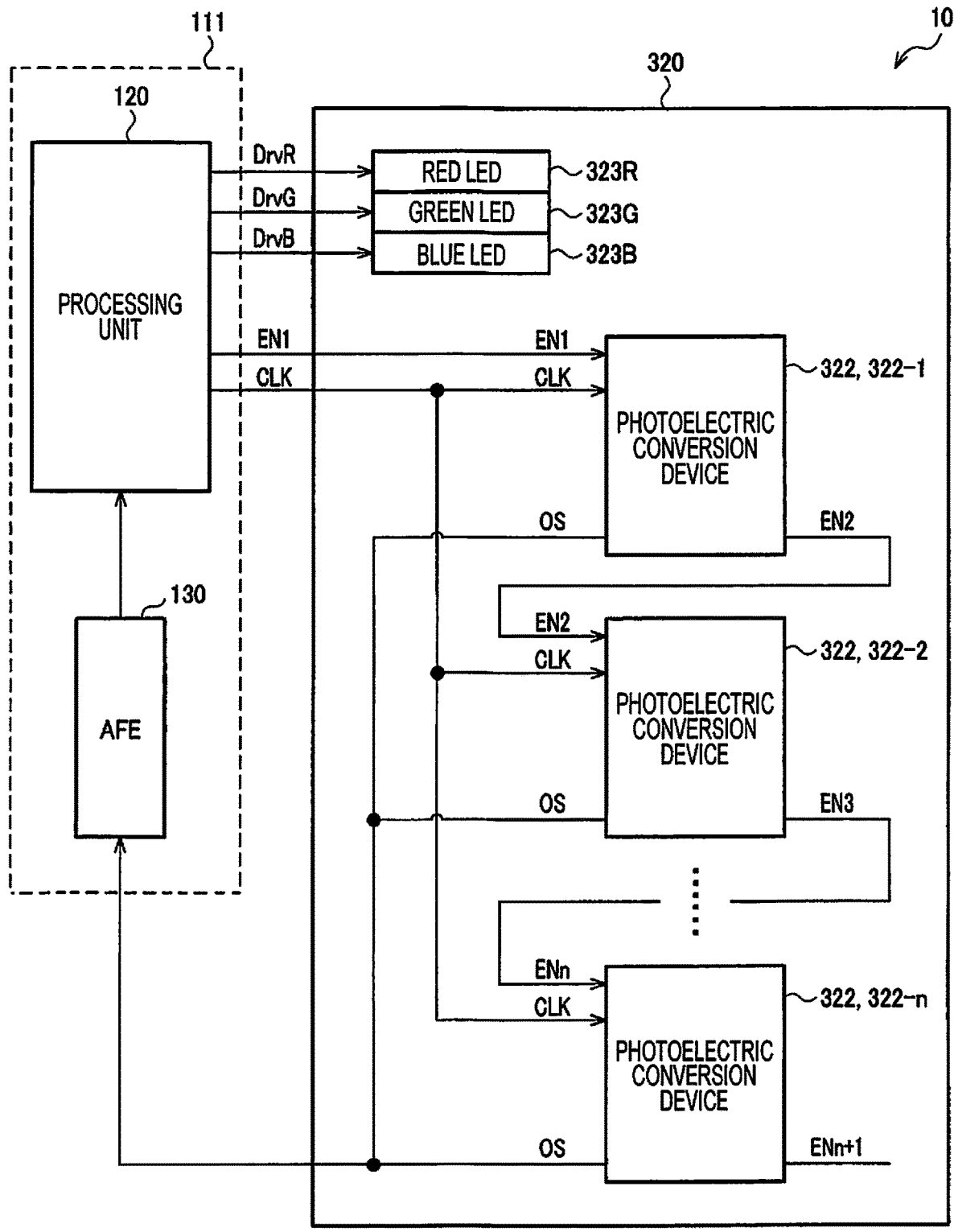
FIG. 13 is a diagram illustrating a configuration example of the sensor unit and a processing unit.

FIG. 13 is a functional block diagram relating to the sensor unit 320. The electronic apparatus 10 includes a second substrate 111 provided with the processing unit 120 and an analog front end (AFE) 130. The processing unit 120 outputs a control signal for controlling the photoelectric conversion device 322 corresponding to the processing unit 120 illustrated in FIG. 5. The control signal includes a clock signal CLK and a chip enable signal EN1 described later. The AFE 130 is a circuit having at least a function of analog-to-digital (A/D) converting an analog signal from the photoelectric conversion device 322. The second substrate 111 is, for example, a main substrate of the electronic apparatus 10, and the substrate 321 is a sub-substrate for a sensor unit.

In FIG. 13, the sensor unit 320 includes a red LED 323R, a green LED 323G, a blue LED 323B, and n photoelectric conversion devices 322. As described above, n is an integer of 1 or more. The red LED 323R, the green LED 323G, and the blue LED 323B are provided in the light source 323, and a plurality of photoelectric conversion devices 322 are arranged on the substrate 321. A plurality of red LEDs 323R, green LEDs 323G, and blue LEDs 323B may exist, respectively. The AFE 130 is realized by, for example, an integrated circuit (IC).

The processing unit 120 controls the operation of the sensor unit 320. First, a processing unit 120 controls operations of the red LED 323R, the green LED 323G, and the blue LED 323B. Specifically, the processing unit 120 supplies a drive signal DrvR to the red LED 323R at a fixed period T for a fixed exposure time Δt and causes the red LED 323R to emit light. Similarly, the processing unit 120 supplies the green LED 323G with a drive signal DrvG for the exposure time Δt at the period T to cause the green LED 323G to emit light, and supplies the blue LED 323B with a drive signal DrvB for the exposure time Δt at the period T to cause the blue LED 323B to emit light. The processing unit 120 causes the red LED 323R, the green LED 323G, and the blue LED 323B to emit light one or more times exclusively one by one in order during the period T.

The processing unit 120 controls the operation of the n photoelectric conversion devices 322-1 to 322-n. Specifically, the processing unit 120 supplies the clock signals CLK in common to the n photoelectric conversion devices 322. The clock signal CLK is an operation clock signal of the n photoelectric conversion devices 322, and each of the n photoelectric conversion devices 322 operates based on the clock signal CLK.

Each photoelectric conversion device 322-j (j=1 to n) generates and outputs a signal OS based on light received by each light receiving element in synchronization with the clock signal CLK when receiving a chip enable signal ENj after the light receiving element receives light.

The processing unit 120 causes the red LED 323R, the green LED 323G, or the blue LED 323B to emit light, generates a chip enable signal EN1 that is active only until the photoelectric conversion device 322-1 finishes outputting the output signal OS, and supplies it to the photoelectric conversion device 322-1.

The photoelectric conversion device 322-j generates a chip enable signal ENj+1 before the output of the output signal OS is finished. The chip enable signals EN2 to ENn are supplied to photoelectric conversion devices 322-2 to 322-n, respectively.

Thus, after the red LED 323R, the green LED 323G, or the blue LED 323B emits light, the n photoelectric conversion devices 322 sequentially output the output signals OS. Then, the sensor unit 320 outputs the output signal OS sequentially output by the n photoelectric conversion devices 322 from a terminal (not illustrated). The output signal OS is transferred to the second substrate 111 through wiring (not illustrated) that electrically couples the sensor unit 320 and the second substrate 111.

The AFE 130 sequentially receives the output signals OS outputted in order from the n photoelectric conversion devices 322, performs amplification processing and A/D conversion processing with respect to each output signal OS to convert into digital data including a digital value corresponding to the amount of light received by each light receiving element, and sequentially transmits each digital data to the processing unit 120. The processing unit 120 receives each digital data sequentially transmitted from the AFE 130, and performs ink amount detection processing and ink characteristics determination processing described later. The processing unit 120 may perform correction processing using a first correction parameter or the like described later, before the ink amount detection processing or the like.

Figure 14:
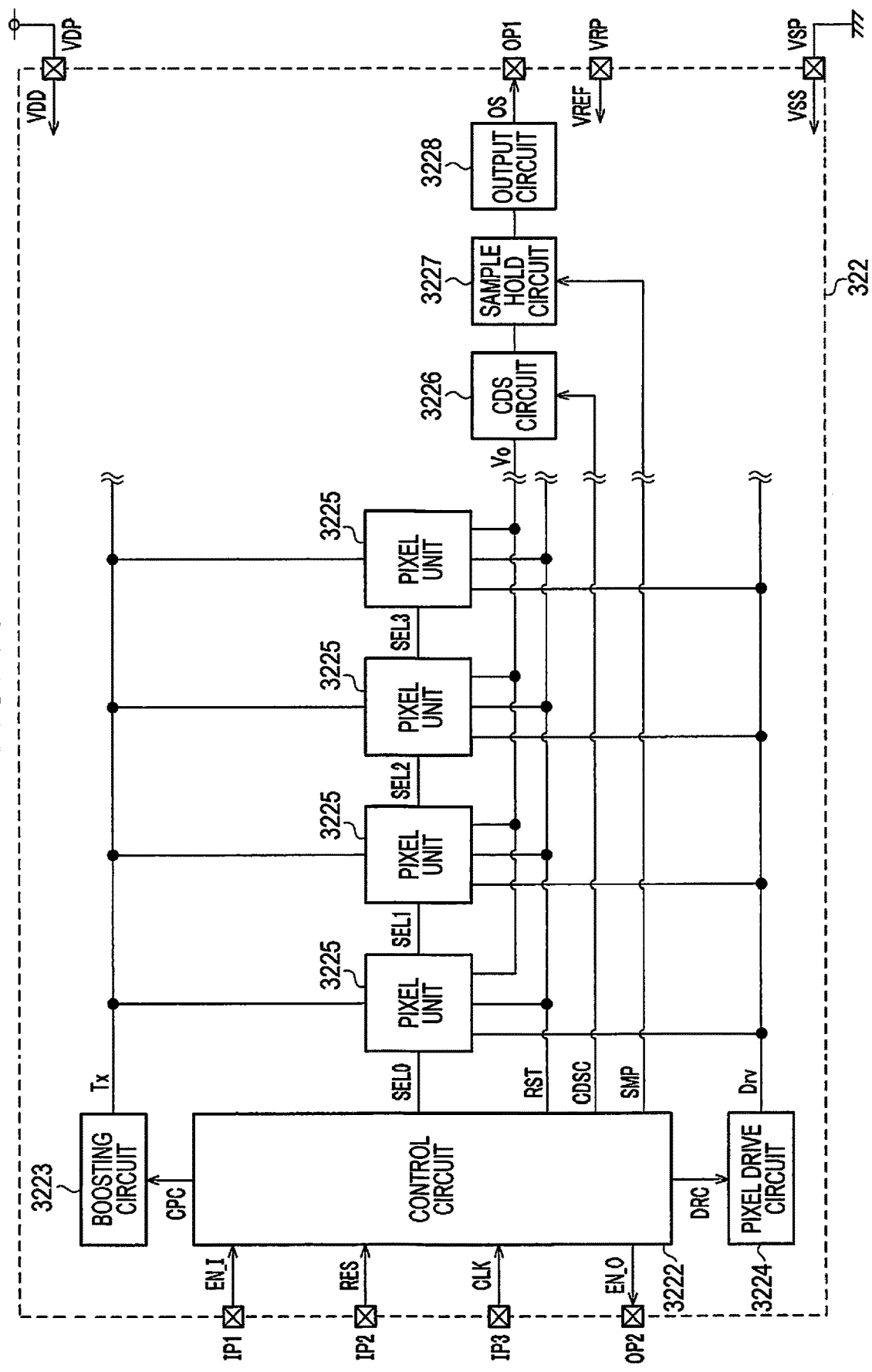
FIG. 14 is a diagram illustrating a configuration example of the photoelectric conversion device.

FIG. 14 is a functional block diagram of the photoelectric conversion device 322. The photoelectric conversion device 322 is provided with a control circuit 3222, a boosting circuit 3223, a pixel drive circuit 3224, p pixel units 3225, a correlated double sampling (CDS) circuit 3226, a sample hold circuit 3227, and an output circuit 3228. The photoelectric conversion device 322 is supplied with a power supply voltage VDD and a power supply voltage VSS from the two power supply terminals VDP and VSP, respectively. The photoelectric conversion device 322 operates based on a chip enable signal EN_I, a clock signal CLK, and a reference voltage VREF supplied from a reference voltage supply terminal VRP. The power supply voltage VDD corresponds to a high potential side power supply, and is 3.3 V, for example. The VSS corresponds to a low potential side power supply, and is 0 V, for example. The chip enable signal EN_I is any one of chip enable signals EN1 to ENn in FIG. 13.

The chip enable signal EN_I and the clock signal CLK are inputted to the control circuit 3222. The control circuit 3222 controls operations of the boosting circuit 3223, the pixel drive circuit 3224, the p pixel units 3225, the CDS circuit 3226, and the sample hold circuit 3227 based on the chip enable signal EN_I and the clock signal CLK. Specifically, the control circuit 3222 generates a control signal CPC that controls the boosting circuit 3223, a control signal DRC that controls the pixel drive circuit 3224, a control signal CDSC that controls the CDS circuit 3226, a sampling signal SMP that controls the sample hold circuit 3227, a pixel selection signal SELO that controls the pixel unit 3225, a reset signal RST, and a chip enable signal EN_O.

The boosting circuit 3223 boosts the power supply voltage VDD based on the control signal CPC from the control circuit 3222, and generates a transfer control signal Tx that sets the boosted power supply voltage to a high level. The transfer control signal Tx is a control signal for transferring electric charges generated during exposure time Δt based on photoelectric conversion by the light receiving element and is commonly supplied to the p pixel units 3225.

The pixel drive circuit 3224 generates a drive signal Dry for driving the p pixel units 3225 based on the control signal DRC from the control circuit 3222. The p pixel units 3225 are arranged side by side in a one-dimensional direction, and the drive signal Dry is transferred to the p pixel units 3225. When the drive signal Dry is active and a pixel selection signal SELi−1 is active, an i-th, i being any one of 1 to p, pixel unit 3225 activates a pixel selection signal SELi and outputs a signal. The pixel selection signal SELi is outputted to an i+1th pixel unit 3225.

The p pixel units 3225 include photoelectric conversion elements that receive light and perform photoelectric conversion, and based on the transfer control signal Tx, the pixel selection signal SEL (any one of SEL0 to SELp−1), the reset signal RST, and the drive signal Drv, respectively, output a signal having a voltage corresponding to light received by the light receiving element during the exposure time Δt. Signals outputted from the p pixel units 3225 are sequentially transferred to the CDS circuit 3226.

The CDS circuit 3226 receives a signal Vo sequentially including the signals respectively output from the p pixel units 3225, and operates based on the control signal CDSC from the control circuit 3222. The CDS circuit 3226 removes noise generated by the characteristics variation in the amplification transistors of the p pixel units 3225 and superimposed on the signal Vo by correlated double sampling with the reference voltage VREF as a reference. That is, the CDS circuit 3226 is a noise reduction circuit for reducing noise included in the signals outputted from the p pixel units 3225.

The sample hold circuit 3227 samples the signal from which noise is removed by the CDS circuit 3226 based on the sampling signal SMP, holds the sampled signal, and outputs it to the output circuit 3228.

The output circuit 3228 amplifies the signal outputted from the sample hold circuit 3227 to generate the signal OS. As described above, the signal OS is outputted from the photoelectric conversion device 322 via an output terminal OP1 and supplied to the AFE 130.

The control circuit 3222 generates a chip enable signal EN_O which is a high pulse signal shortly before the output of the signal OS from the output circuit 3228 is finished, and outputs it from an output terminal OP2 to a next-stage photoelectric conversion device 322. The chip enable signal EN_O here is any one of chip enable signals EN2 to ENn+1 in FIG. 13. Thereafter, the control circuit 3222 causes the output circuit 3228 to stop outputting the signal OS and sets the output terminal OP1 to high impedance.

As described above, the electronic apparatus 10 according to the present embodiment is a printer, and the printer includes the ink tank 310, the print head 107, the substrate 321, the light source 323, the photoelectric conversion device 322, and the processing unit 120. The print head 107 performs printing by using ink IK in the ink tank 310. The light source 323 is provided on the substrate 321 and irradiates the ink tank 310 with light from the side of the ink tank 310. The side is specifically the horizontal direction and includes both the direction along the X-axis and the direction along the Y-axis. In the present embodiment, light is emitted from the direction along the Y-axis. The photoelectric conversion device 322 is provided on the substrate 321 and detects light incident from the ink tank in a period during which the light source 323 emits light. The processing unit 120 detects the amount of ink in the ink tank 310 based on the output of the photoelectric conversion device 322. In this way, the amount of ink in the ink tank 310 can be detected by using the light source 323 and the photoelectric conversion device 322 provided on the same substrate 321. The sensor unit 320 including the light source 323 and the photoelectric conversion device 322 can be integrally configured, and the arrangement is easily optimized.

2. Modifications related to Configuration of Electronic Apparatus

The configuration of the electronic apparatus 10 is not limited to that described above, and various modifications can be made for each portion.

2.1 Window Portion

The electronic apparatus 10 may include ink viewing window portions 103 in the ink tank 310. For example, the case 301 is provided with the window portions 103 corresponding to each of the five ink tanks 310. The window portions 103 may be opening portions formed in the case 301, or may be a light transmissive member. The user can visually recognize the five ink tanks 310 through the window portions 103.

FIG. 15 is a perspective diagram of the electronic apparatus 10 including the window portions 103. In the example illustrated in FIG. 15, the window portions 103 are provided on a surface in the +Y direction that is the front side of the case 301 of the ink tank unit 300. By providing the window portions 103, the user can visually recognize a portion of the side surface of the ink tank 310 in the +Y direction, specifically a portion of the ink tank 310 facing the window portion 103.

Further, a portion of each ink tank 310 facing the window portion 103 has light transmittance. Therefore, the user can visually recognize the amount of ink IK included in the ink tank 310 through the window portion 103. The window portion 103 which is a member having light transmittance may be provided with a scale. The user can grasp the amount of ink IK in each ink tank 310 by using the scale as a mark. The scale may be provided on the side surface of the ink tank 310 instead of the window portion 103.

As can be seen from FIGS. 9 and 15, the window portion 103 is closer to the filling port 311 than to the discharging port 312 of the ink tank 310. In other words, the window portion 103, the filling port 311, and the discharging port 312 are arranged in this order along the −Y direction. As described above with reference to FIG. 9, the sensor unit 320 is provided at a position closer to the discharging port 312 than to the filling port 311 of the ink tank 310. That is, when the ink tank 310 is used as a reference, the window portion 103 is positioned in the +Y direction, and the sensor unit 320 is positioned in the −Y direction. Thus, it is possible to suppress the visual recognition of the ink amount by the user from being hindered by the sensor unit 320, and to efficiently arrange each part of the electronic apparatus 10.

2.2 Modifications related to Optical Separator

As illustrated in FIG. 9, in the method of the present embodiment, the amount of ink is detected by arranging the linear image sensors in the vertical direction. In the ink amount detection processing, each photoelectric conversion element included in the photoelectric conversion device 322 is required to detect light from a position facing the ink tank 310 in the Z direction. For example, it is desirable that the photoelectric conversion element provided at a position where the Z coordinate value is z3 mainly detects light from a position where the Z coordinate value is z3 in the ink tank 310, which is ideal. In other words, when the photoelectric conversion element provided at the position where the Z coordinate value is z3 detects light from a position where the Z coordinate value is not z3, the detection accuracy may be reduced. Therefore, the sensor unit 320 desirably includes an optical separator for separating light in the vertical direction.

Figure 16:
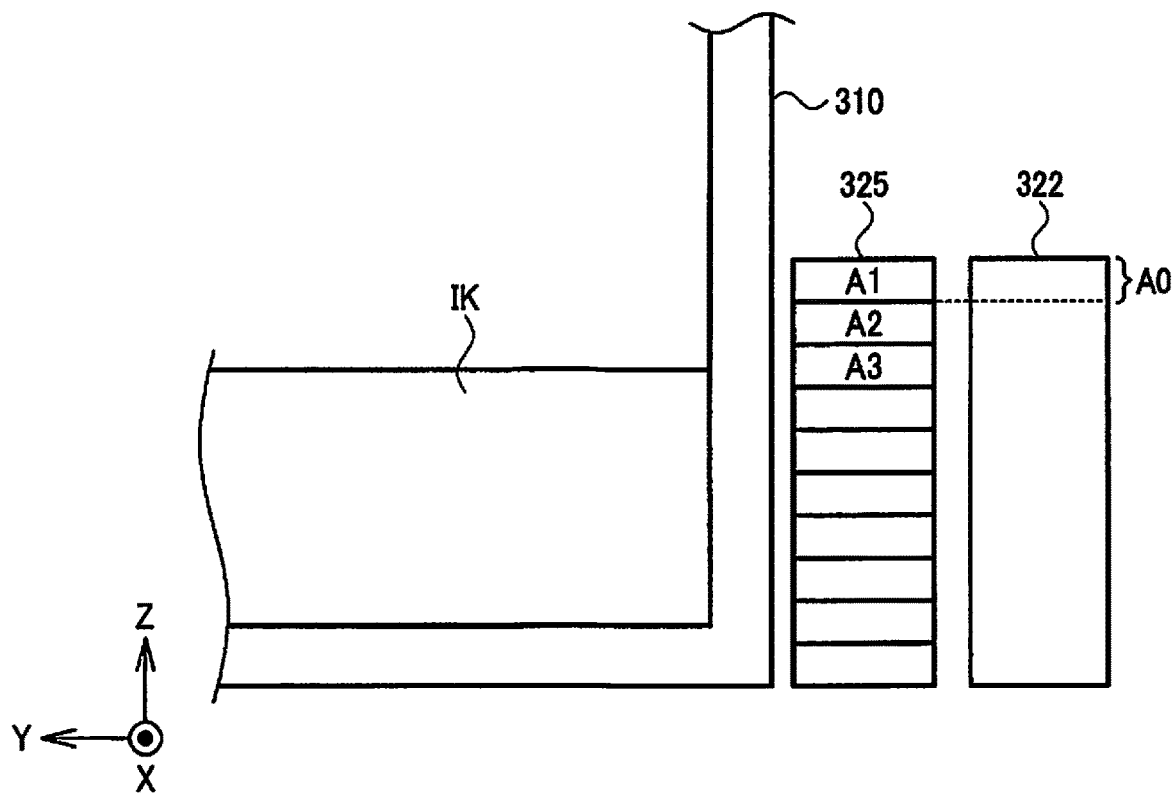
FIG. 16 is a schematic diagram when a lens array is provided as an optical separator.

FIG. 16 is a schematic diagram illustrating the relationship between the ink tank 310, the optical separator, and the photoelectric conversion device 322 when the lens array 325 is included as the optical separator as in the example illustrated in FIG. 6. In FIG. 16, the shape of the ink tank 310 is simplified. From this point onward, the description of the drawings is simplified with respect to the portion of the ink tank 310 that does not require a detailed shape. The drawing is an example in which the lower end of the photoelectric conversion device 322 is located below the lower end of an ink chamber of the ink tank 310 so that the ink amount can be detected until the ink almost runs out. Although the lower end of the ink tank 310 and the lower end of the photoelectric conversion device 322 have substantially the same height in the drawing, the lower end of the photoelectric conversion device 322 may be positioned further below the lower end of the ink tank 310.

Each lens included in the lens array 325 collects light incident on the lens at a predetermined position. Therefore, each photoelectric conversion element included in the photoelectric conversion device 322 mainly receives light transmitted through a given lens and also suppresses reception of light transmitted through another lens. For example, the photoelectric conversion element provided in the range illustrated by A0 mainly receives light from the lens illustrated by A1 and suppresses reception of light from the lens provided A2 and the lens provided in the −Z direction from A2. By using the lens array 325, since light is separated in the vertical direction, the accuracy of ink amount detection can be improved.

However, although the method of the present embodiment can use a linear image sensor the same as that in the image reading in the scanner unit 200, the ink amount detection processing does not necessarily require the same accuracy as in the image reading processing. When the ink amount detection processing requires lower accuracy, it is possible to use a simple optical separator having a light separation performance lower than that of the lens array 325.

Figure 17:
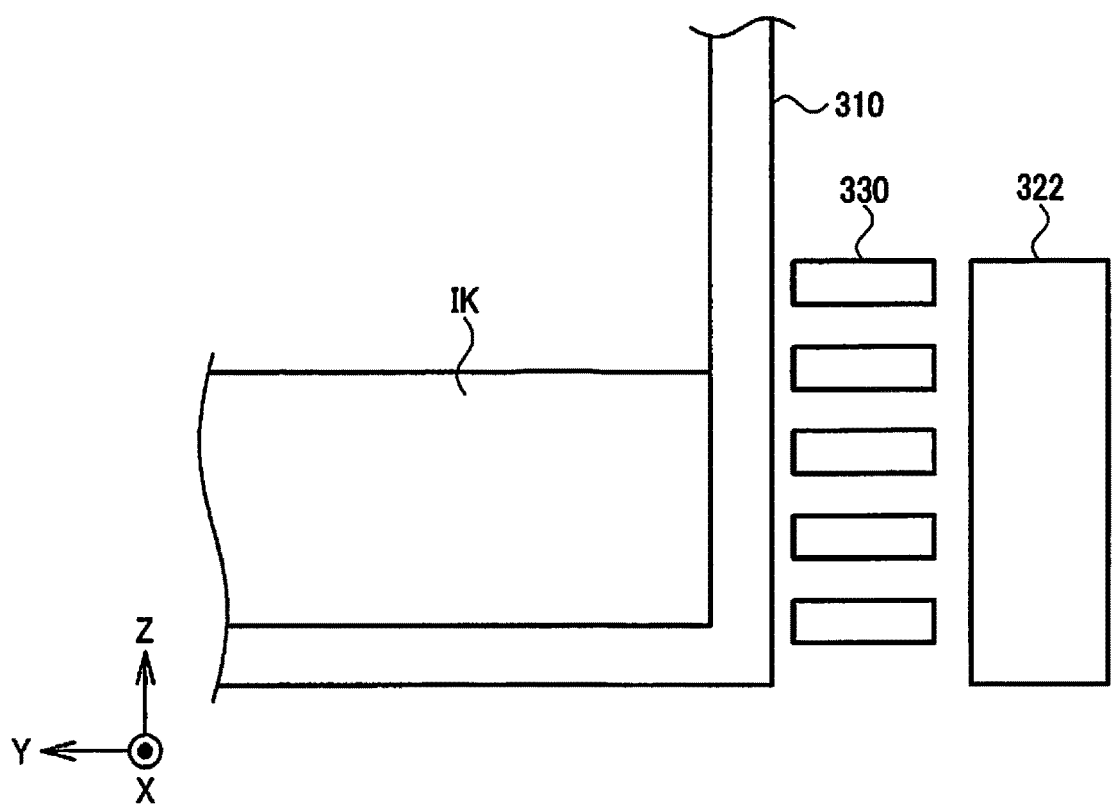
FIG. 17 is a schematic diagram when a resin slit is provided as an optical separator.

FIG. 17 is a schematic diagram for explaining another example of the optical separator. As illustrated in FIG. 17, the optical separator may be an optical slit provided between the photoelectric conversion device 322 and the ink tank 310. The optical slit is, for example, a resin slit 330 formed of a resin material.

Slits are formed by alternately providing areas having relatively high light transmittance and areas having relatively low light transmittance in the Z-axis. The area having high light transmittance and the area having low light transmittance are areas having a width of several hundred micrometers in the Z-axis respectively, for example. The resin slit 330 may be provided in the case 326 of the sensor unit 320. A member having low light transmittance is used for the case 326 for suppressing the incidence of environmental light to the photoelectric conversion device 322. Therefore, the resin slit 330 can be formed by providing the case 326 with openings having a pitch of several hundred micrometers. For example, in FIG. 6, the second opening portion 328 is illustrated as one continuous opening in a given range of the Z-axis, the resin slit 330 is realized by changing this to a plurality of openings provided at intervals of several hundred micrometers within a given range of the Z-axis. The area having high light transmittance is not limited to the opening, and may be formed of a light transmitting member having higher light transmittance than that of the case 326. The resin slit 330 illustrated in FIG. 17 is not limited to the one formed in the case 326, and may be provided as a separate body from the case 326. For example, the resin slit 330 separated from the case 326 is provided at a position corresponding to the lens array 325 in FIG. 6 or FIG. 8.

Figure 31:
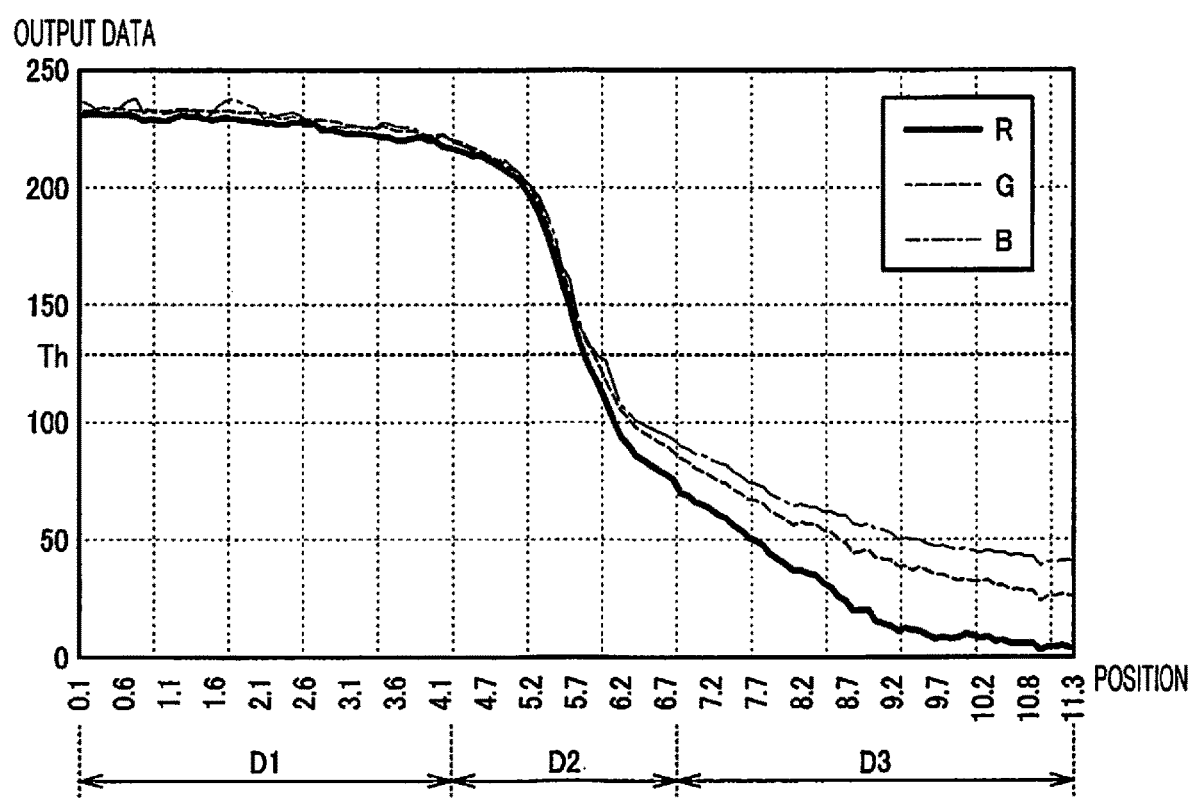
FIG. 31 is a diagram illustrating an example of output data of a photoelectric conversion device.

Among a plurality of photoelectric conversion elements included in the photoelectric conversion device 322, a photoelectric conversion element corresponding to an area with high light transmittance detects light from the ink tank 310. On the other hand, among the plurality of photoelectric conversion elements included in the photoelectric conversion device 322, a photoelectric conversion element corresponding to an area with low light transmittance has very little incidence of light from the ink tank 310. In order to suppress misidentifying an area where light is not incident due to the optical separator as an area where the ink IK exists, in the ink amount detection processing and the like to be described later, processing of extracting a portion corresponding to an area having a high light transmittance from a signal output from the photoelectric conversion device 322 is performed. For example, since the pitch of the resin slit 330 is known in design, the processing unit 120 extracts data corresponding to the opening portion of the slit from the signal OS as a set of output data of a plurality of photoelectric conversion elements, and performs ink amount detection processing based on data after the extraction processing. For example, a waveform described later with reference to FIG. 31 is data after the extraction processing.

The optical separator may be provided on the side surface of the ink tank 310. In this case, the electronic apparatus 10 includes the ink tank 310 provided with an optical separator that separates light in the vertical direction on the side surface, the print head 107 that performs printing by using ink IK in the ink tank 310, the photoelectric conversion device 322 that detects light incident from the ink tank 310 through the optical separator, and the processing unit 120 that detects the amount of ink in the ink tank 310 based on the output of the photoelectric conversion device 322. As described above, by providing the optical separator on the side surface of the ink tank 310, the configuration on the sensor unit 320 side can be simplified. Specifically, since the lens array 325 illustrated in FIG. 16 and the resin slit 330 illustrated in FIG. 17 can be omitted, the sensor unit 320 can be miniaturized.

Figure 18:
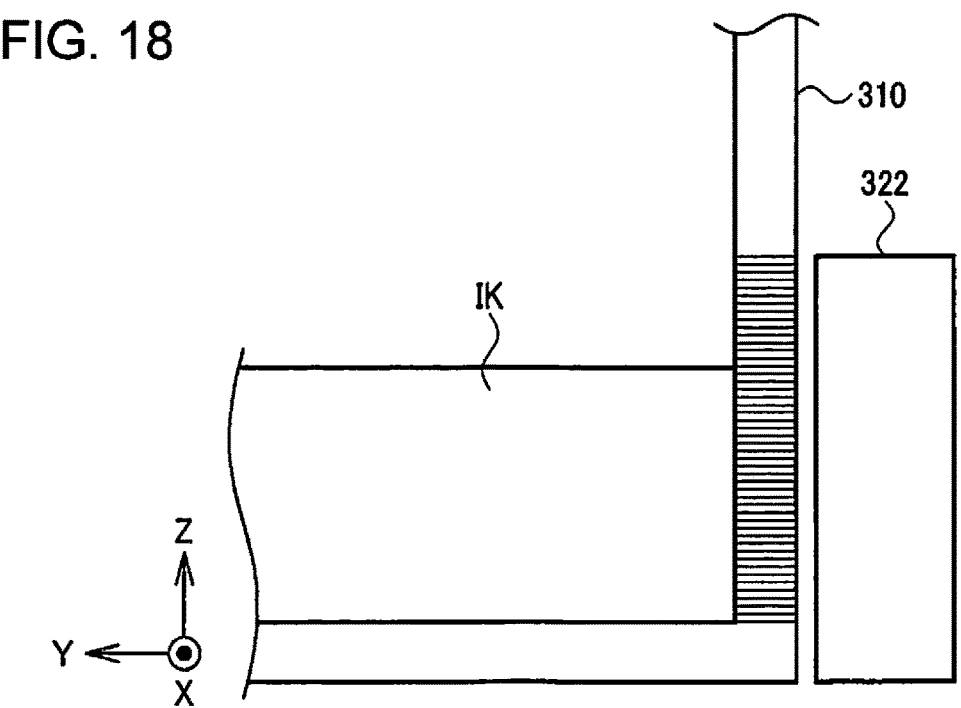
FIG. 18 is a schematic diagram when an optical separator is provided on a side surface of an ink tank.

FIG. 18 is a schematic diagram for explaining the optical separator provided on the side surface of the ink tank 310. The optical separator is an optical slit. This makes it possible to separate light in the vertical direction by using the slits provided in the ink tank 310.

The optical separator separates light in a vertical direction by passing the first light through a first transmission area between the first layer and the second layer and passing the second light through a second transmission area between the second layer and the third layer. The layer here represents any one of the structures in which a plurality of layers overlap each other in a predetermined direction. In this way, an optical slit can be formed by sandwiching an area having relatively high light transmittance by two layers having relatively low light transmittance. Since the ink tank 310 needs to accommodate ink IK which is a liquid, it is necessary to use a light transmissive member instead of an opening in an area where the light transmittance is relatively high. Various specific methods for forming layers are conceivable.

Figure 19:
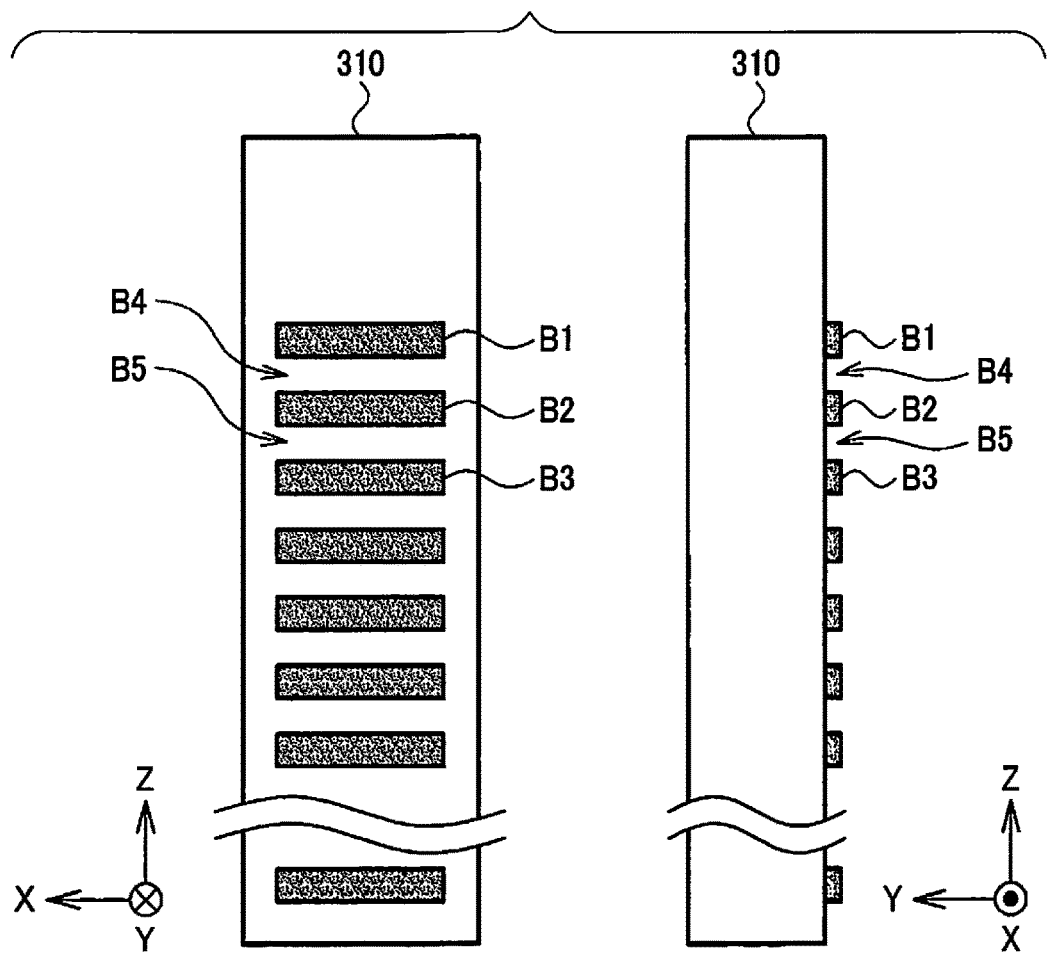
FIG. 19 is a diagram illustrating a configuration example of an optical separator provided on a side surface of an ink tank.

FIG. 19 is a schematic diagram illustrating a configuration of the ink tank 310 having the optical slits on the side surface. FIG. 19 illustrates a configuration of a side surface of the ink tank 310 in the −Y direction. The optical separator is formed by coating the outer wall of the ink tank 310 having light transmittance with a member having low light transmittance. Thus, the first layer, the second layer, and the third layer of the optical separator are coating layers. The coating layers are stacked in the −Y direction with respect to the outer wall of the ink tank 310. That is, in the configuration illustrated in FIG. 19, the ink tank 310 and the coating layers are stacked along the Y-axis. The thickness in the Y-axis is emphasized in FIG. 19, but the coating layers can be formed very thin. The second layer is a coating layer adjacent to the first layer in the Z-axis, and the third layer is a coating layer adjacent to the second layer in the Z-axis. For example, B1 in FIG. 19 is a first layer, B2 is a second layer, B3 is a third layer, B4 is a first transmission area, and B5 is a second transmission area.

Since the coating layers are easy to form, the pitch of the optical separator can be narrowed. For example, when the resin slits 330 illustrated in FIG. 17 or two-color molding described later is used, the pitch of the optical separator is on the order of several hundreds micrometers to several millimeters, which is a factor that makes it impossible to increase the resolution of ink amount detection. In this regard, it is considered that the ink amount can be detected with a resolution of the order of several tens of micrometers by using the coating layers.

The area where the light transmittance is relatively low is not limited to the coating layer. The first layer, the second layer, and the third layer are layers of one color of two-color molding, and the first transmission area and the second transmission area may be layers of the other color of two-color molding. A member having low light transmittance constituting the first to third layers is described as a first member and a member having high light transmittance constituting the first transmission area and the second transmission area is described as a second member of two members used for the two-color molding. Thus, the ink tank 310 having the optical separator on the side surface can be formed by using two-color molding using the two members having different light transmittances.

Figure 20:
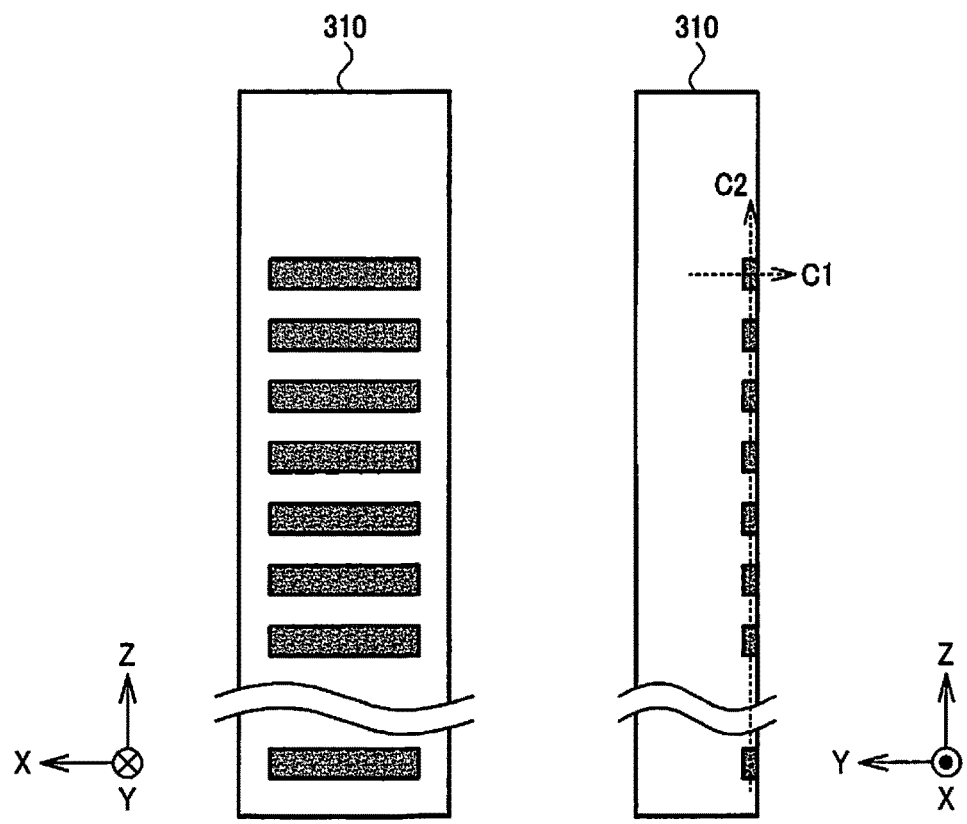
FIG. 20 is a diagram illustrating a configuration example of an optical separator provided on a side surface of an ink tank.
Figure 21:
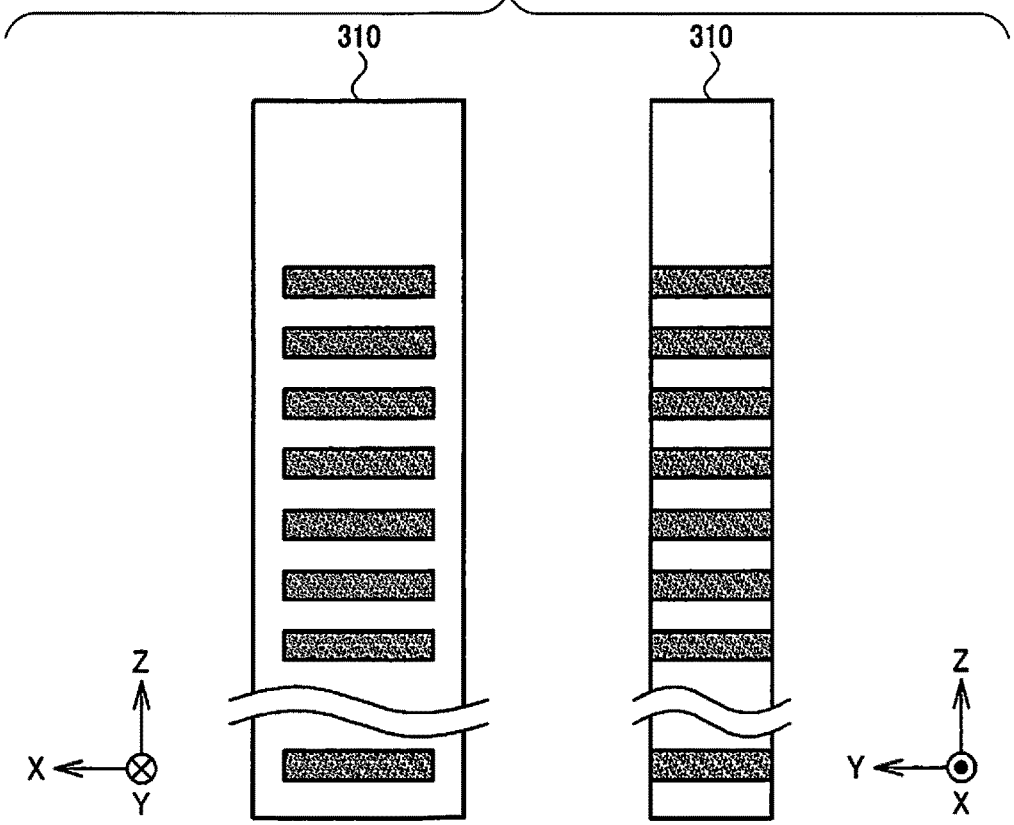
FIG. 21 is a diagram illustrating a configuration example of an optical separator provided on a side surface of an ink tank.

FIGS. 20 and 21 are schematic diagrams illustrating the configuration of the ink tank 310 in which the optical slits are provided on the side surface by two-color molding. The structure in the XZ plane is the same as the example in FIG. 19 which uses the coating layer. However, various configurations in the YZ plane are conceivable.

For example, as illustrated in FIG. 20, the first to third layers may be formed on the surface portion of the ink tank 310. That is, the second member and the first member are laminated along the Y-axis as indicated by C1, and the first member does not penetrate the side surface of the ink tank 310 on the Y-axis. In FIG. 20, the first to third layers may be considered to be layers stacked on the Z-axis. Specifically, the first member and the second member are alternately stacked in the direction indicated by C2 in FIG. 20.

Alternatively, as illustrated in FIG. 21, the first member may be provided so as to penetrate the side surface of the ink tank 310 on the Y-axis. The first member and the second member are alternately stacked on the Z-axis in FIG. 21.

As described above with reference to FIG. 4, the ink tank 310 includes the filling port 311 into which ink IK is filled by the user and the discharging port 312 for discharging the ink IK toward the print head 107. The optical separator is provided on the side surface of the ink tank 310 in the −Y direction closer to the discharging port 312 than to the filling port 311. Thus, light directing from the ink tank 310 to the photoelectric conversion device 322 can be separated in the vertical direction.

In addition, although the example in which the optical separator is a slit has been described above, the present disclosure is not limited thereto, and other configurations capable of separating light in the vertical direction may be used. Specifically, the optical separator may be an optical pinhole. In FIGS. 19 to 21, the first layer and the second layer are rectangles having the ±X direction as the longitudinal direction and the ±Z direction as the short side direction in the XZ plane, and the first transmission area is an area between the first layer and the second layer. When the optical pinhole is used, the first transmission area may be formed into a minute circular shape, and the first layer may be provided in the +Z direction and the second layer may be provided in the −Z direction so as to surround the circular shape. In this case, the first layer and the second layer are continuous at positions deviated from the pinhole in the X direction or the −X direction.

As described above, the photoelectric conversion device 322 has a plurality of photoelectric conversion elements. The arrangement pitch of the plurality of photoelectric conversion elements is narrower than the pitch of the optical separation by the optical separator. The arrangement pitch of the photoelectric conversion elements is an interval at which the photoelectric conversion elements are provided. The optical separation pitch is an interval between members having low light transmittance or an interval between members having high light transmittance. For example, the optical separation pitch is an interval between the first layer and the second layer or an interval between the first transmission area and the second transmission area.

When the resin slit 330 illustrated in FIG. 17 and the two-color molding illustrated in FIGS. 20 and 21 are used, it is not easy to form the minute structure and it is difficult to narrow the optical separation pitch. Further, it is not necessary to narrow the optical separation pitch than a pitch of the photoelectric conversion elements. For example, when the light separation pitch is narrow enough to allow both light transmitted through the first transmission area and light from the second transmission area to enter one photoelectric conversion element, the significance of light separation by the second layer is damaged.

Furthermore, a signal value of the photoelectric conversion element is lowered when light is blocked by the second layer. That is, by making the arrangement pitch of the plurality of photoelectric conversion elements narrower than the optical separation pitch by the optical separator, the formation of the optical separator is facilitated and the efficient configuration can be realized.

Figure 22:
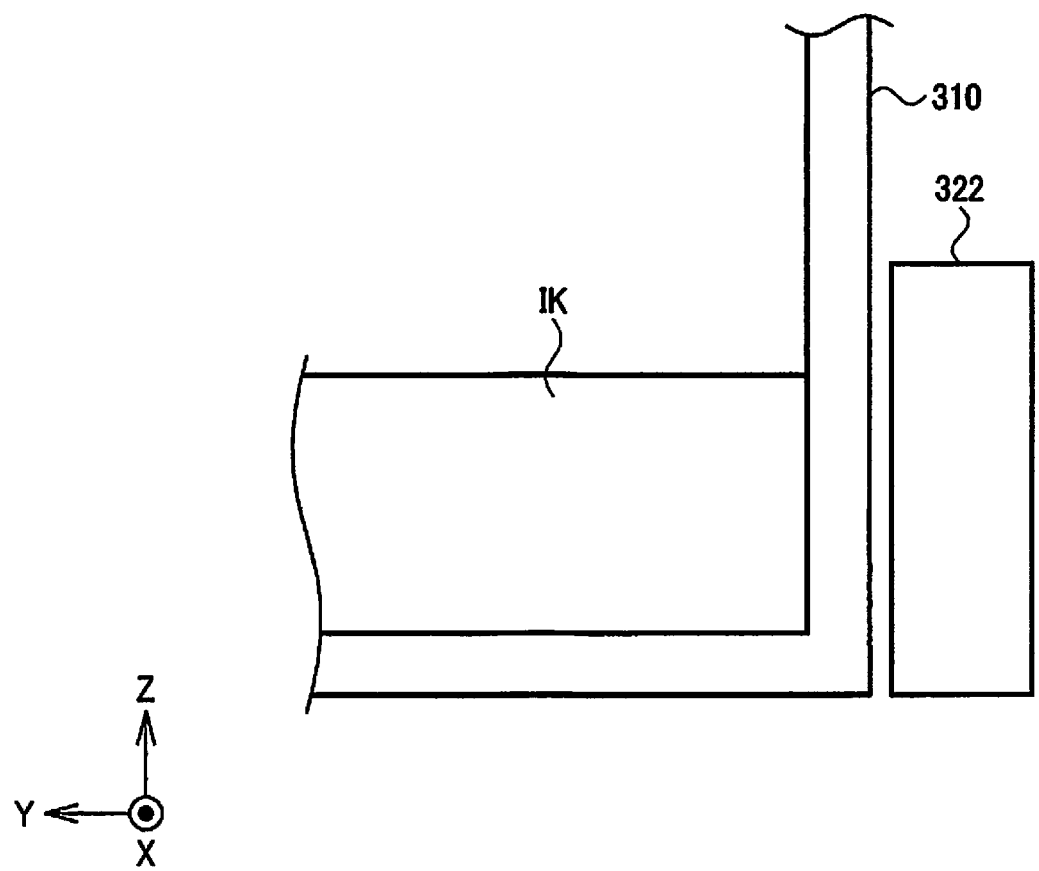
FIG. 22 is a schematic diagram when an optical separator is omitted.

Further, the example of providing an optical separator on one of the side surfaces of the sensor unit 320 and the ink tank 310 has been described above. However, when the ink amount detection processing does not require accuracy compared to the image reading processing in the scanner unit 200, the optical separator can be omitted. FIG. 22 is a schematic diagram describing the relationship between the photoelectric conversion device 322 and the ink tank 310 when the optical separator is omitted.

2.3 Modifications Related to Light Source 2.3.1 Relationship with Light Guide

In the example illustrated in FIG. 6, the sensor unit 320 includes the light guide 324. The light source 323 irradiates the light guide 324 with light. As described above, in order to make the light guide 324 emit light uniformly, light from the light source 323 needs to be incident in a direction along the longitudinal direction of the light guide 324. Specific methods can be considered in various ways as illustrated in FIGS. 10 to 12. In the examples illustrated in FIGS. 10 to 12, the position of the light source 323 in the Z-axis does not overlap the photoelectric conversion device 322. However, the relationship between the light guide 324 and the light source 323 is not limited thereto.

Figure 23:
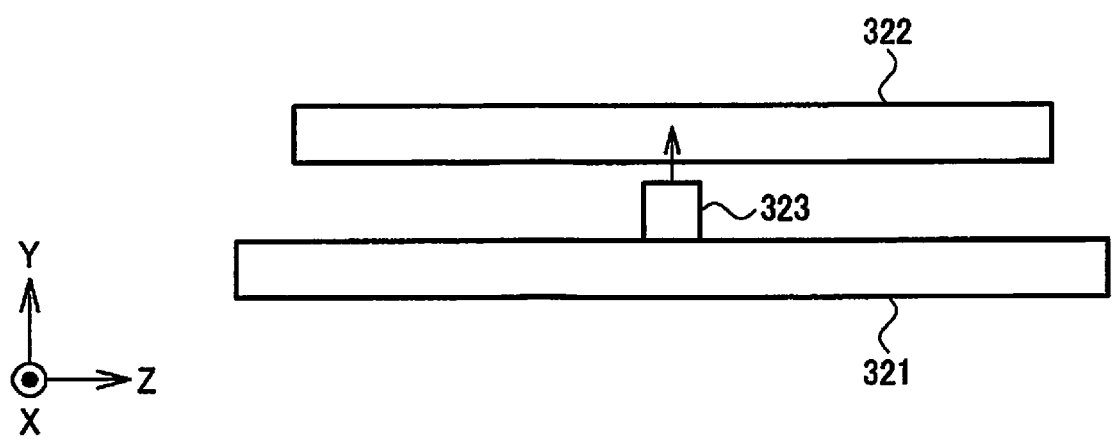
FIG. 23 is a diagram for explaining a positional relationship between a light source and a light guide.
Figure 24:
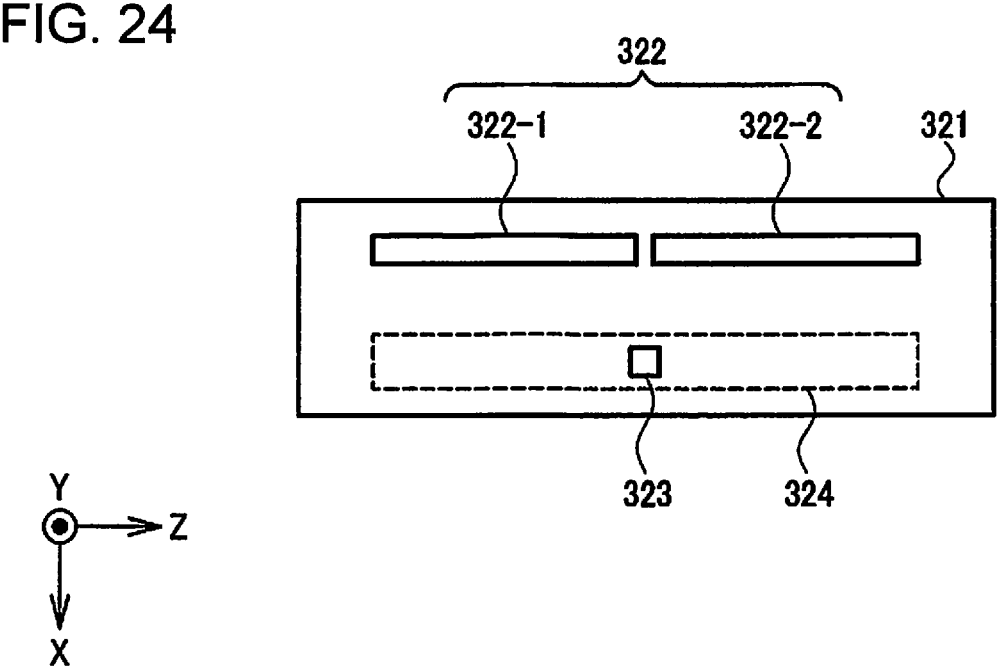
FIG. 24 is a diagram for explaining a positional relationship between a light source, a light guide, and a photoelectric conversion device.

FIGS. 23 and 24 are schematic diagrams illustrating other configurations of the light source 323 and the light guide 324. As illustrated in FIG. 23, the light source 323 may irradiate the light guide 324 with light from a direction intersecting the longitudinal direction of the light guide 324. The longitudinal direction of the light guide 324 is a direction along the longitudinal direction of the photoelectric conversion device 322 and a direction along the Z-axis. The light source 323 is provided in the −Y direction with respect to the light guide 324, and emits light in the +Y direction. More preferably, the light source 323 is provided near the center of the light guide 324 in the Z-axis. For example, as illustrated in FIG. 24, the photoelectric conversion device 322 and the light guide 324 are provided in the same range on the Z-axis, and the light source 323 is disposed at the center of the range.

When the configuration illustrated in FIG. 23 is used, light from the light source 323 is less likely to propagate inside the light guide 324 as compared with FIGS. 10 to 12. It is because that, in the configuration in FIG. 23, an incident angle when light enters an interface from an inside to an outside of the light guide 324 is small and total reflection is difficult to occur. Therefore, the light incident on the light guide 324 is emitted in the +Y direction before sufficiently propagating inside the light guide 324. As a result, the light emitted from the light guide 324 toward the ink tank 310 is more likely to cause intensity variation in the Z-axis than in the configurations of FIGS. 10 to 12.

In the scanner unit 200, the image sensor needs to read an image of a document of a predetermined size, for example, A4 size or A3 size, so that a certain length is required in the longitudinal direction. Therefore, in the scanner unit 200, it is required to emit light uniformly over a wide range to some extent. On the other hand, the photoelectric conversion device 322 of the present embodiment is used for detecting the ink amount and does not require a length in comparison with the scanner unit 200. This is because there are many cases where the side surface of the ink tank 310 itself is not so long in the vertical direction, and the ink amount may be detected only in a portion of the side surface. For example, in the case of detecting an ink end or an ink near end, a problem hardly occurs even if only a range of several centimeters close to the bottom surface of the ink tank 310 is an object of the ink amount detection. The ink end represents a state where the amount of ink is small and it is difficult to continue printing, and the ink near end is a state in which it is determined that printing can be continued but the amount of ink is small.

When the photoelectric conversion device 322 is short, since the area to be irradiated with light is also shortened, the light guide 324 can be shortened accordingly. Therefore, even if the light source 323 is disposed in a positional relationship in which total reflection is hard to occur, since an area of a sufficient proportion of the light guide 324 emits light, accuracy deterioration caused by unevenness of luminance hardly occurs. That is, even if the configurations of FIGS. 23 and 24 are used, the ink amount can be detected with sufficient accuracy. In this case, since processing of bending the light guide 324 as illustrated in FIG. 11 and processing of providing a reflective surface RS as illustrated in FIG. 12 become unnecessary, mounting is facilitated. The light source 323 is disposed in the horizontal direction with respect to the photoelectric conversion device 322. The horizontal direction here is specifically the +X direction or the −X direction. In other words, the positions of the light source 323 and the photoelectric conversion device 322 in the Z-axis overlap each other. That is, unlike the example illustrated in FIG. 10, it is not necessary to arrange the light guide 324 and the light source 323 in the longitudinal direction, and the size of the substrate 321 and the sensor unit 320 in the vertical direction can be reduced.

The light guide 324 may be omitted from the sensor unit 320. In this case, the light source 323 is disposed at a position illustrated in FIG. 24, for example, and the light guide 324 is omitted in FIG. 24. Light from the light source 323 passes through the first opening portion 327 of the case 326 and is emitted to the ink tank 310. In this case, the light emitted to the ink tank 310 is likely to have uneven brightness on the Z-axis. However, as described above, when the photoelectric conversion device 322 is short, ink detection may be performed with sufficient accuracy even if the light guide 324 is omitted.

As described above, in the example when the light source 323 and the photoelectric conversion device 322 are provided on the same substrate 321, various modifications can be performed for the configuration of the optical separator and the configuration of the light guide 324. For example, when accuracy is important, the configuration in which the lens array 325 is provided as the optical separator, and the light source 323 and the light guide 324 are likely to generate total reflection as illustrated in FIGS. 10 to 12 is used. When it is important to simplify the configuration, both the optical separator and the light guide 324 are omitted. In addition, various modifications can be implemented for specific combinations such as omitting the light guide 324 and providing the optical separator.

2.3.2 Location of Light Source

Figure 25:
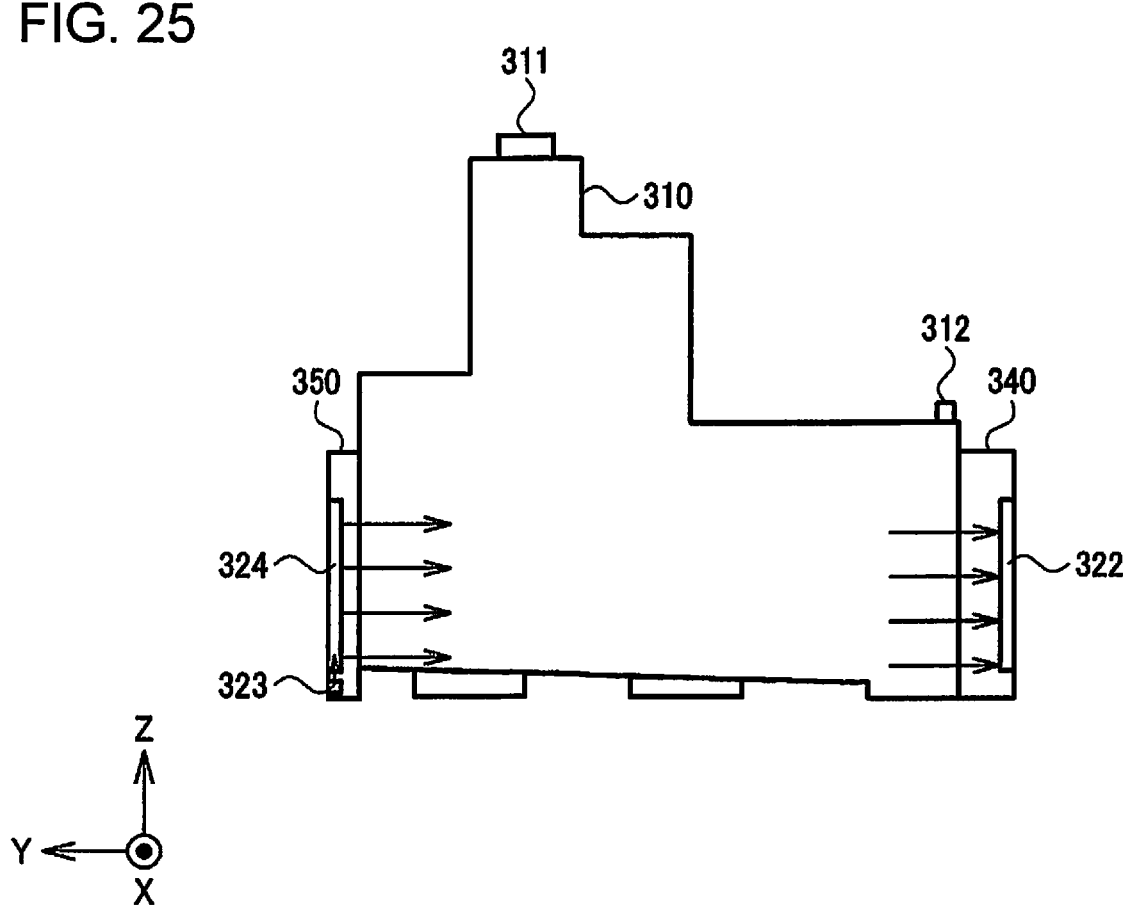
FIG. 25 is a diagram for explaining a positional relationship between an ink tank, a light source, and a photoelectric conversion device.

The light source 323 and the photoelectric conversion device 322 are not limited to those arranged on the same substrate. FIG. 25 is another diagram for explaining the positional relationship between the light source 323, the photoelectric conversion device 322, and the ink tank 310. As illustrated in FIG. 25, the photoelectric conversion device 322 may be provided in a given direction with respect to the ink tank 310, and the light source 323 may be provided in an opposite direction from the given direction. In the example illustrated in FIG. 25, the photoelectric conversion device 322 is provided on the side surface of the ink tank 310 in the −Y direction, and the light source 323 is provided on the side surface of the ink tank 310 in the +Y direction. In the example illustrated in FIG. 9, the photoelectric conversion device 322 detects reflected light of light emitted from the light source 323 in the ink tank 310, but in the example illustrated in FIG. 25, the photoelectric conversion device 322 detects transmitted light that is emitted from the light source 323 and transmitted through the ink tank 310.

Figure 26:
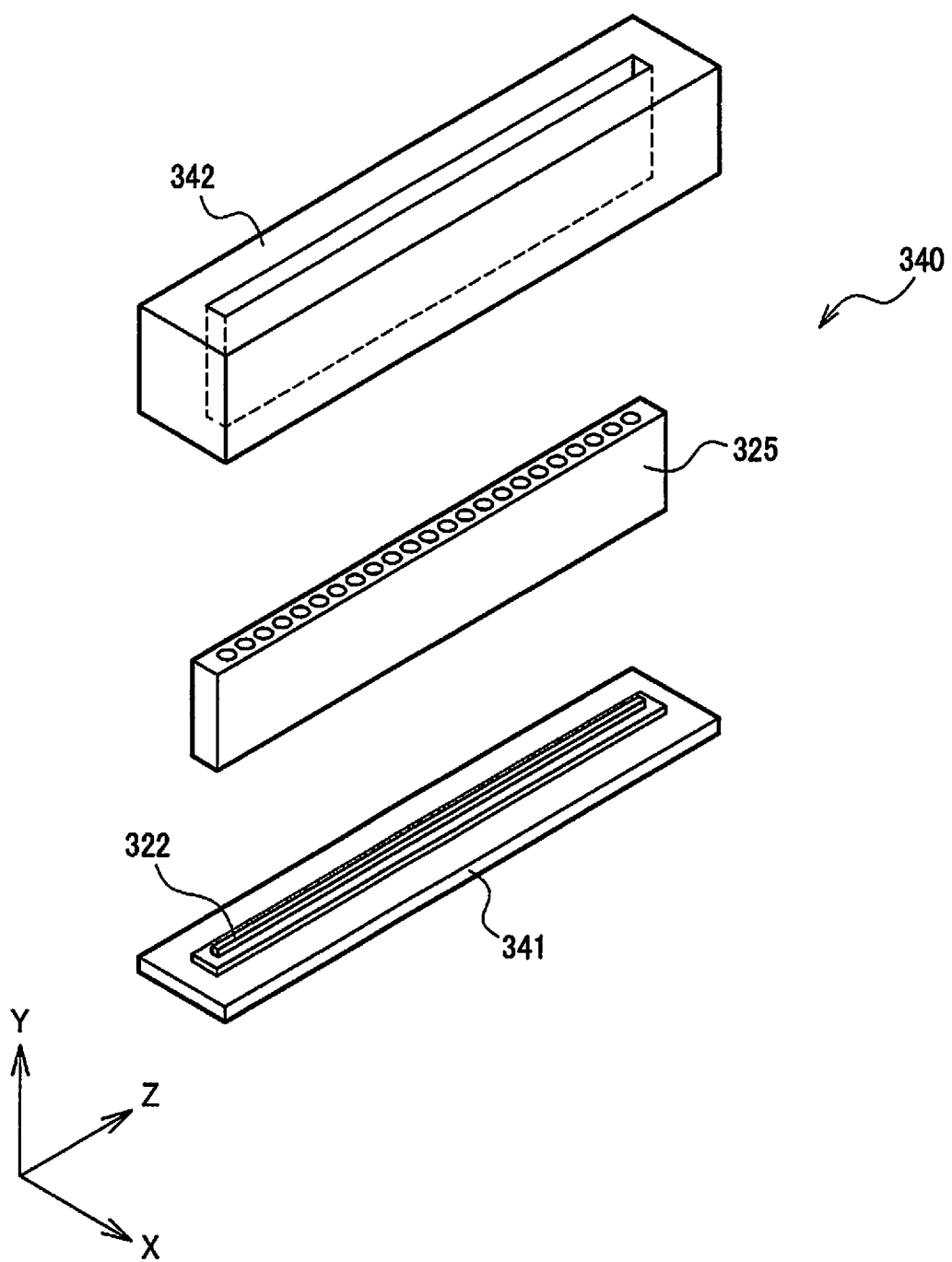
FIG. 26 is an exploded diagram of a light receiving unit.
Figure 27:
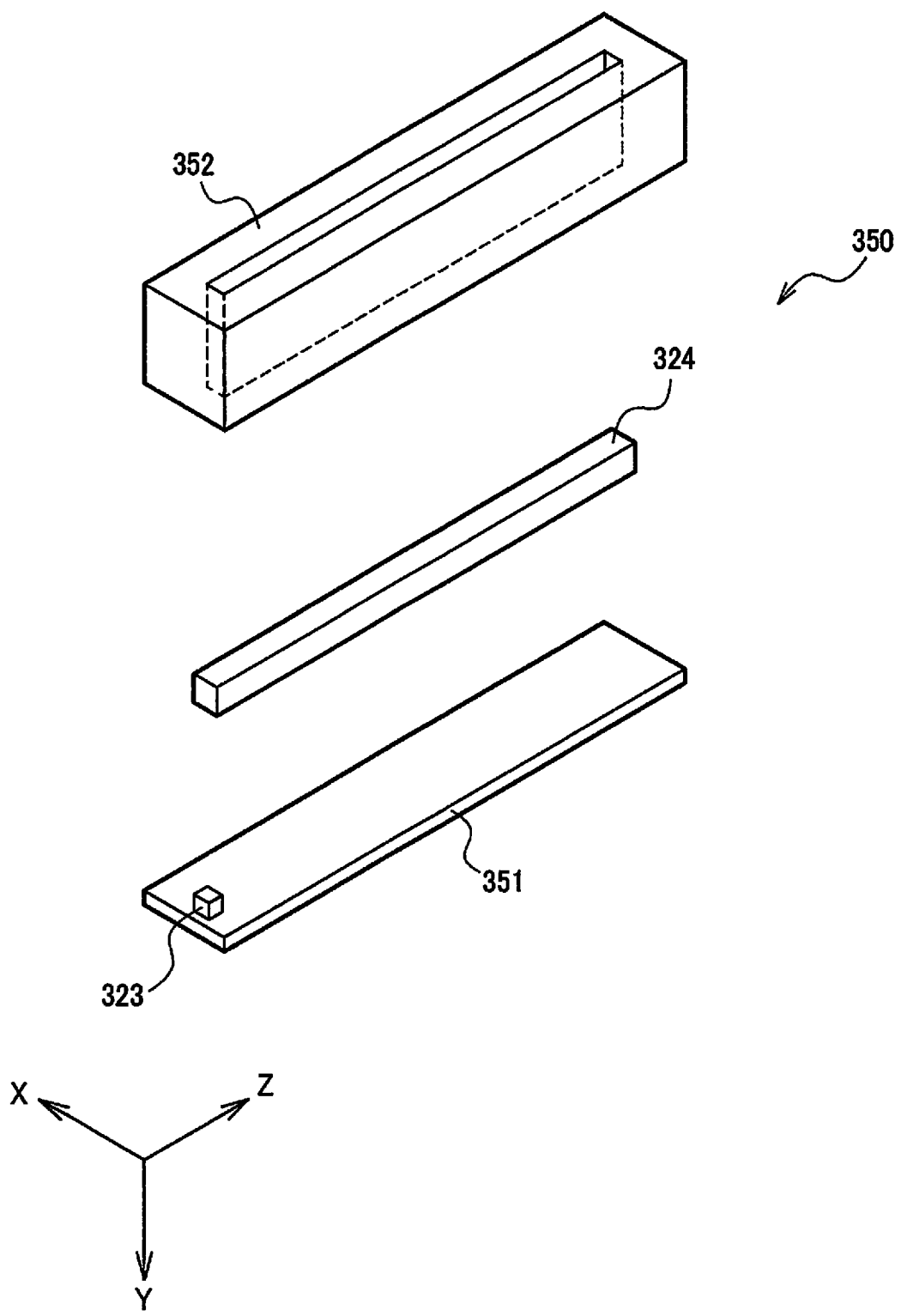
FIG. 27 is an exploded diagram of a light emitting unit.

FIG. 26 is an exploded diagram illustrating the configuration of the light receiving unit 340 including the photoelectric conversion device 322. The light receiving unit 340 includes a sensor substrate 341, the photoelectric conversion device 322, the lens array 325 as the optical separator, and a sensor case 342. FIG. 27 is an exploded diagram illustrating the configuration of a light emitting unit 350 including the light source 323. The light emitting unit 350 includes a light source substrate 351, the light source 323, the light guide 324, and a light source case 352. In FIGS. 26 and 27, the same components as those in FIG. 6 are denoted by the same reference numerals. As can be seen from FIGS. 26 and 27, the light receiving unit 340 has a configuration in which a portion of the sensor unit 320 in FIG. 6 is extracted, and the light emitting unit 350 has a configuration in which the remaining portion of the sensor unit 320 is extracted. In the case of the configurations illustrated in FIGS. 26 and 27, since direct light from the light source 323 to the photoelectric conversion device 322 is not required to be taken into consideration, it is not necessary to provide a light shielding wall.

As illustrated in FIGS. 16 to 22, modifications such as changing the lens array 325 to the resin slit 330, providing an optical separator on the side surface of the ink tank 310, and omitting the optical separator can be executed. Further, as described above with reference to FIGS. 23 and 24, modifications such as changing the positional relationship between the light source 323 and the light guide 324 and omitting the light guide 324 can be executed.

The light receiving unit 340 in FIG. 26 and the light emitting unit 350 in FIG. 27 are respectively arranged on different side surfaces of the ink tank 310 as illustrated in FIG. 25. By aligning positions of the light receiving unit 340 and the light emitting unit 350 in the Z-axis and X-axis, ink amount detection using transmitted light becomes possible. Even in the case of using the transmitted light, since the transmitted light easily reaches the photoelectric conversion device 322 in the area where the ink IK does not exist, the output value of the photoelectric conversion element corresponding to the area increases. Since absorption and scattering of light in the ink IK occur in the area where the ink IK exists, transmitted light reaching the photoelectric conversion device 322 is weak and the output value of the photoelectric conversion element corresponding to the area is small. Therefore, even in the configuration of FIG. 25, the ink amount can be detected by the same method as in FIG. 9. Specific processing is described later.

Figure 28:
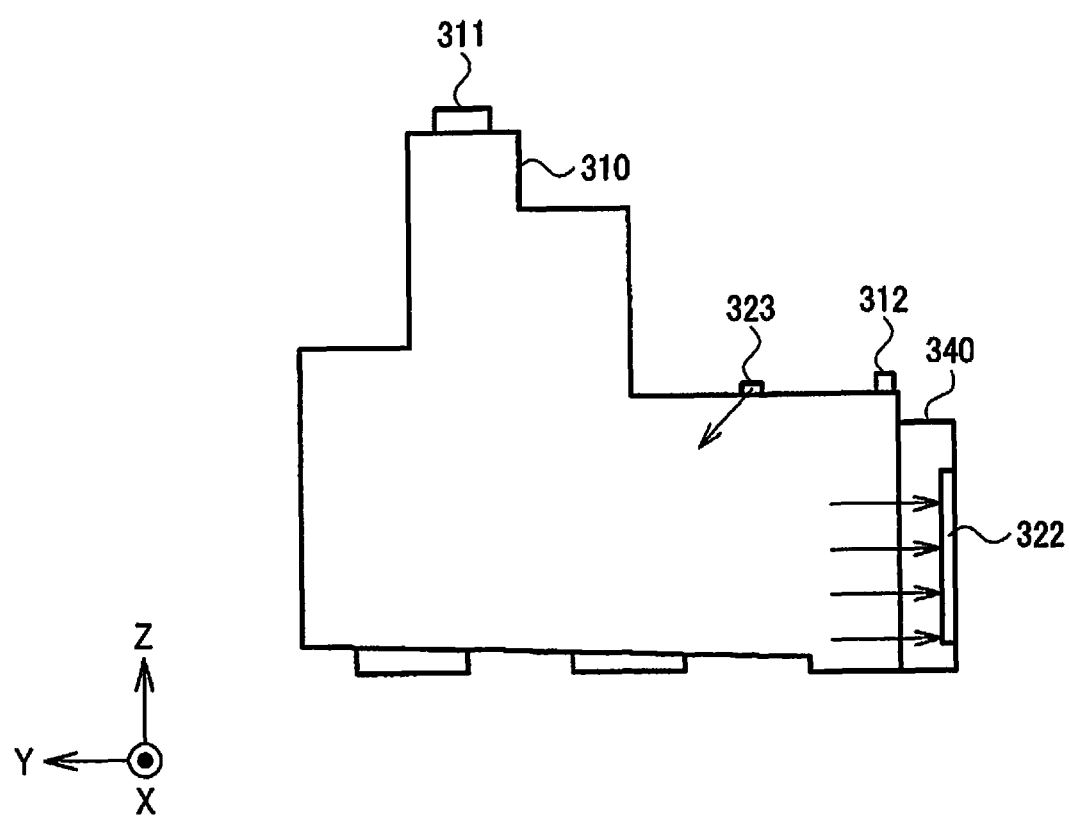
FIG. 28 is a diagram for explaining a positional relationship between an ink tank, a light source, and a photoelectric conversion device.

FIG. 28 is another diagram for explaining the positional relationship between the light source 323, the photoelectric conversion device 322, and the ink tank 310. The photoelectric conversion device 322 and the ink tank 310 are the same as those in FIG. 25. That is, the light receiving unit 340 illustrated in FIG. 26 is provided on the side surface of the ink tank 310 in the −Y direction. FIG. 28 illustrates an example of providing the light source 323 on the upper surface of the ink tank 310. However, the light source 323 can be provided at an optional position when the light source 323 is at a position capable of irradiating the inside of the ink tank 310 with light. In FIG. 28, the substrate provided with the light source 323 is omitted. In FIG. 28, although the provision of the light guide 324 and the light source case 352 is not hindered, these can be omitted.

The light source 323 irradiates the inside of the ink tank 310 with light. When a certain amount of light enters the inside of the ink tank 310, reflection occurs at the inner wall of the ink tank 310 and the interface of the ink IK, and the entire inside of the ink tank 310 emits light. Hereinafter, light illuminating the entire inside of the ink tank 310 is described as spatial light. By using the spatial light, even if the positional relationship between the light emitting side and the light receiving side is not exactly aligned as illustrated in FIG. 9 or FIG. 25, it is possible to realize a state where the area where the ink IK does not exist becomes bright and the area where the ink IK exists becomes dark. When spatial light emitted from the side surface of the ink tank 310 is detected by using the photoelectric conversion device 322, the output value of the photoelectric conversion element changes in accordance with whether ink is present. Therefore, the ink amount can be detected by the same method as in FIG. 9 or FIG. 25.

The configuration illustrated in FIG. 28 has an advantage that the degree of freedom of the position of the light source 323 is high. On the other hand, since the irradiation direction of light from the light source 323 cannot be limited in the configuration illustrated in FIG. 28, the amount of light incident on the photoelectric conversion device 322 is considered to be small as compared to the configuration of FIG. 9 or FIG. 25. Therefore, it is considered that the ink amount detection accuracy is higher by using the configuration of FIG. 9 or FIG. 25 than by using the configuration of FIG. 28.

2.3.3 Type of Light Source

In the above, three of the red LED 323R, the green LED 323G, and the blue LED 323B are provided as the light source 323, and an example in which these emit light sequentially has been illustrated. In this case, the photoelectric conversion device 322 sequentially outputs a signal corresponding to red, a signal corresponding to green, and a signal corresponding to blue. However, the type and the number of light sources 323 are not limited thereto.

For example, the light source 323 may be a white LED. The white LED may be realized by a method of mixing each light of the red LED 323R, the green LED 323G, and the blue LED 323B. Alternatively, the white LED may be realized by a method of combining the LED of a given wavelength band and a phosphor. For example, the white LED can be realized by combining a blue LED and a yellow phosphor, and combining a blue LED, and a red phosphor and a green phosphor.

Light emitted from the light source 323 is not limited to the wavelength band of visible light. For example, the electronic apparatus 10 includes the light source 323 that irradiates the ink tank 310 with infrared light. The light source 323 that emits infrared light may be an LED or other light sources. Hereinafter, it is assumed that the light source 323 that emits infrared light is an LED, and the LED is referred to as an infrared LED. The photoelectric conversion device 322 detects light based on infrared light emitted from the light source 323 to the ink tank 310. The light source 323 that emits infrared light has high affinity with the ink viewing window portion 103 in the ink tank 310.

The window portion 103 has light transmittance for visually recognizing ink IK by the user. Therefore, when the light source 323 that emits visible light is used, the light from the light source 323 may be visually recognized by the user. When the light emitted from the light source 323 is visually recognized every time ink amount is detected, it is troublesome for the user and there is a possibility that the use of the electronic apparatus 10 is hindered. In that respect, when the light source 323 that emits infrared light is used, since the light emitted from the light source 323 is not visually recognized by the user, it is possible to suppress discomfort to the user. The light source 323 that emits ultraviolet light may be used. However, it is preferable to use infrared light having a low frequency in consideration of the deterioration of the ink IK due to the light energy.

Even when infrared light is used, as in the example illustrated in FIGS. 9 and 15, the photoelectric conversion device 322 is provided on the side surface among the side surfaces of the ink tank 310 in the −Y direction that is the horizontal direction, and the window portion 103 is provided in the +Y direction, which is the opposite direction from the −Y direction, with respect to the ink tank 310. In this way, the visual recognition of the ink IK by the user can be suppressed from being hindered by the photoelectric conversion device 322.

The thing that ink tank 310 includes the filling port 311 and the discharging port 312, the window portion 103 is closer to the filling port 311 than to the discharging port 312, and the photoelectric conversion device 322 is closer to the discharging port 312 than to the filling port 311 are the same as the above-described example.

Heretofore, five of red LED, green LED, blue LED, white LED, and infrared LED have been exemplified. The light source 323 may be one of these or a combination of two or more. When a plurality of light sources are used, it is not always necessary to use all the light sources. In this case, it is desirable to use the infrared LED with a frequency higher than that of the light source generating visible light so as not to be visible to the user as much as possible. For example, all the light sources are used immediately after the power source is turned on or the ink is replenished, but only the infrared LED may be used in the subsequent normal state to avoid the use of other light sources generating visible light. Further, the light source 323 is not limited to the LED, and may be a light source using other methods such as a xenon lamp, a semiconductor laser, or the like.

Further, the method for detecting a plurality of light beams having different wavelength bands in the photoelectric conversion device 322 is not limited to those using a plurality of LEDs. For example, the sensor unit 320 may include a light source 323 having a wide wavelength band and a filter (not illustrated). The photoelectric conversion device 322 detects light passing through the filter. The light source 323 here is, for example, a white LED. By providing a red filter that allows red light to pass through, a green filter that allows green light to pass through, and a blue filter that allows blue light to pass through as filters, the photoelectric conversion device 322 can respectively detect red light, green light, and blue light. By changing the wavelength band of the light source 323 and a pass band of the filter, the photoelectric conversion device 322 can detect light in various wavelength bands.

2.4 Modifications of Ink Tank

The number of ink tanks 310 included in the electronic apparatus 10 is not limited to a plurality, and may be one. For example, when the electronic apparatus 10 includes a printer unit 100 dedicated to monochrome printing, the printer unit 100 includes one ink tank 310 for accommodating black ink. In this case, the ink amount can be detected by applying any of the configurations in FIG. 9, FIG. 25, and FIG. 28 to the one ink tank 310.

The electronic apparatus 10 may include a plurality of ink tanks 310 as illustrated in FIG. 2. In this case, the ink amount detection processing is executed for a plurality of ink tanks 310, for example. Hereinafter, an example in which all of the plurality of ink tanks 310 are subjected to ink amount detection will be described, but some of the plurality of ink tanks 310 may be excluded from the targets of ink amount detection.

The electronic apparatus 10 includes a first ink tank, a second ink tank, a first photoelectric conversion device, and a second photoelectric conversion device. The first ink tank is, for example, the ink tank 310a, and the second ink tank is the ink tank 310b. The second ink tank is provided in the horizontal direction relative to the first ink tank. The horizontal direction is specifically the +X direction.

The first photoelectric conversion device is provided on the side surface of the first ink tank in a direction orthogonal to the +X direction, specifically in the −Y direction, and detects light incident from the first ink tank. The second photoelectric conversion device is provided on the side surface of the second ink tank in the −Y direction and detects light incident from the second ink tank.

When a plurality of ink tanks 310 are provided, it is efficient to arrange the plurality of ink tanks 310 adjacent to each other. Therefore, it is difficult to arrange the photoelectric conversion devices 322 on the side surface of the first ink tank on the second ink tank side and on the side surface of the second ink tank on the first ink tank side. When there are three or more ink tanks 310, excluding the ink tanks 310 at both ends, the side surface in the +X direction and the side surface in the −X direction of the given ink tank 310 are in contact with the side surfaces of other ink tanks 310, it is difficult to dispose the photoelectric conversion device 322 on the side surface. That is, it is desirable that the photoelectric conversion device 322 is provided on the side surface in the +Y direction or the side surface in the −Y direction. As illustrated above, in FIG. 9 or the like, the photoelectric conversion device 322 is provided in the −Y direction with respect to the ink tank 310.

The print head 107 performs printing by using the ink IKa in the first ink tank and the ink IKb in the second ink tank. The processing unit 120 detects the amount of ink in the first ink tank based on the output of the first photoelectric conversion device and detects the amount of ink in the second ink tank based on the output of the second photoelectric conversion device. In this way, when the electronic apparatus 10 includes a plurality of ink tanks 310, the ink amount detection processing for the plurality of ink tanks 310 can be performed.

The electronic apparatus 10 may include a first light source for irradiating the first ink tank with light, and a second light source different from the first light source for irradiating the second ink tank with light. The first photoelectric conversion device detects light from the first ink tank in a light emitting period of the first light source. The second photoelectric conversion device detects light from the second ink tank in a light emitting period of the second light source. In this way, since the plurality of ink tanks 310 can be irradiated with light by using respective dedicated light sources, the accuracy of ink amount detection can be improved.

For example, the first light source irradiates a side surface of the first ink tank with light in the −Y direction, and the second light source irradiates a side surface of the second ink tank with light in the −Y direction. In other words, the first light source and the second light source emit light on the side surfaces of the ink tank 310 in the direction in which the first photoelectric conversion device and the second photoelectric conversion device are provided, respectively. For example, the electronic apparatus 10 includes a plurality of sensor units 320 illustrated in FIGS. 6 to 8, and the sensor units 320 are respectively fixed to the side surfaces in the −Y direction of the plurality of ink tanks 310. In this way, the amounts of the ink IK included in the plurality of ink tanks 310 can be detected based on the reflected light from the ink tanks 310.

Alternatively, the first light source may emit light on the side surface of the first ink tank in the +Y direction, and the second light source may emit light on the side surface of the second ink tank in the +Y direction. In other words, the first light source and the second light source emit light on the side surface of the ink tank 310 in the direction opposite from the side surfaces provided with the first photoelectric conversion device and the second photoelectric conversion device. For example, the electronic apparatus 10 includes a plurality of light receiving units 340 illustrated in FIG. 26 and a plurality of light emitting units 350 illustrated in FIG. 27. In each ink tank 310 of the plurality of ink tanks 310, the light receiving unit 340 is fixed to the side surface in the −Y direction, and the light emitting unit 350 is fixed to the side surface in the +Y direction. In this way, the amount of the ink IK included in the plurality of ink tanks 310 can be detected based on the transmitted light transmitted through the ink tanks 310.

The electronic apparatus 10 is not limited to the configuration in which the light source is provided for each ink tank 310. For example, the electronic apparatus 10 includes one light source that irradiates the first ink tank and the second ink tank with light. For example, the electronic apparatus 10 includes a plurality of light receiving units 340 illustrated in FIG. 26, and the light receiving units 340 are respectively fixed to the side surfaces of the plurality of ink tanks 310 in the −Y direction. Similarly to the example illustrated in FIG. 28, the light source 323 causes the entire ink tank 310 to emit light by irradiating each ink tank 310 with light from an optional position. In this case, one light source 323 irradiates the plurality of ink tanks 310 with light. In this way, the amounts of ink IK included in the plurality of ink tanks 310 can be detected based on spatial light of the ink tanks 310. As described above, in the method using spatial light, it is sufficient that the entire ink tank 310 emits light, and it is not necessary to set the light irradiation direction strictly. Therefore, one light source can be shared by the plurality of ink tanks 310. However, it is not hindered to provide a plurality of light sources in the method using spatial light. For example, the electronic apparatus 10 may include a first light source for supplying spatial light to the first ink tank and a second light source for supplying spatial light to the second ink tank.

The first ink tank includes a first filling port and a first discharging port, and the second ink tank includes a second filling port and a second discharging port. The first discharging port is provided in the −Y direction with respect to the first filling port, and the second discharging port is provided in the −Y direction with respect to the second filling port. Thus, it is possible to detect the ink amount at a position close to the discharging port 312 for each ink tank 310 by using the photoelectric conversion device 322.

The electronic apparatus 10 may include the ink viewing window portion 103 in the first ink tank as described above with reference to FIG. 15. The window portion 103 is closer to the first filling port than to the first discharging port. This makes it possible for the user to visually recognize the ink amount for at least one of the plurality of ink tanks 310. As illustrated in FIG. 15, a plurality of the window portions 103 corresponding to all of the plurality of ink tanks 310 may be provided. A large window portion including an area corresponding to the side surfaces of the plurality of ink tanks 310 may be provided. The window portion 103 may be provided in an area corresponding to some of the ink tanks 310 among the plurality of ink tanks 310.

Heretofore, a method of using a plurality of sensor units 320 illustrated in FIG. 8 or a method of using a plurality of light receiving units 340 illustrated in FIG. 26 has been described. However, the arrangement of the photoelectric conversion device 322 is not limited to this in a case of detecting the amounts of ink in the plurality of ink tanks 310. For example, on one substrate, both the photoelectric conversion device 322 for detecting light from the first ink tank and the photoelectric conversion device 322 for detecting light from the second ink tank may be provided.

Figure 29:
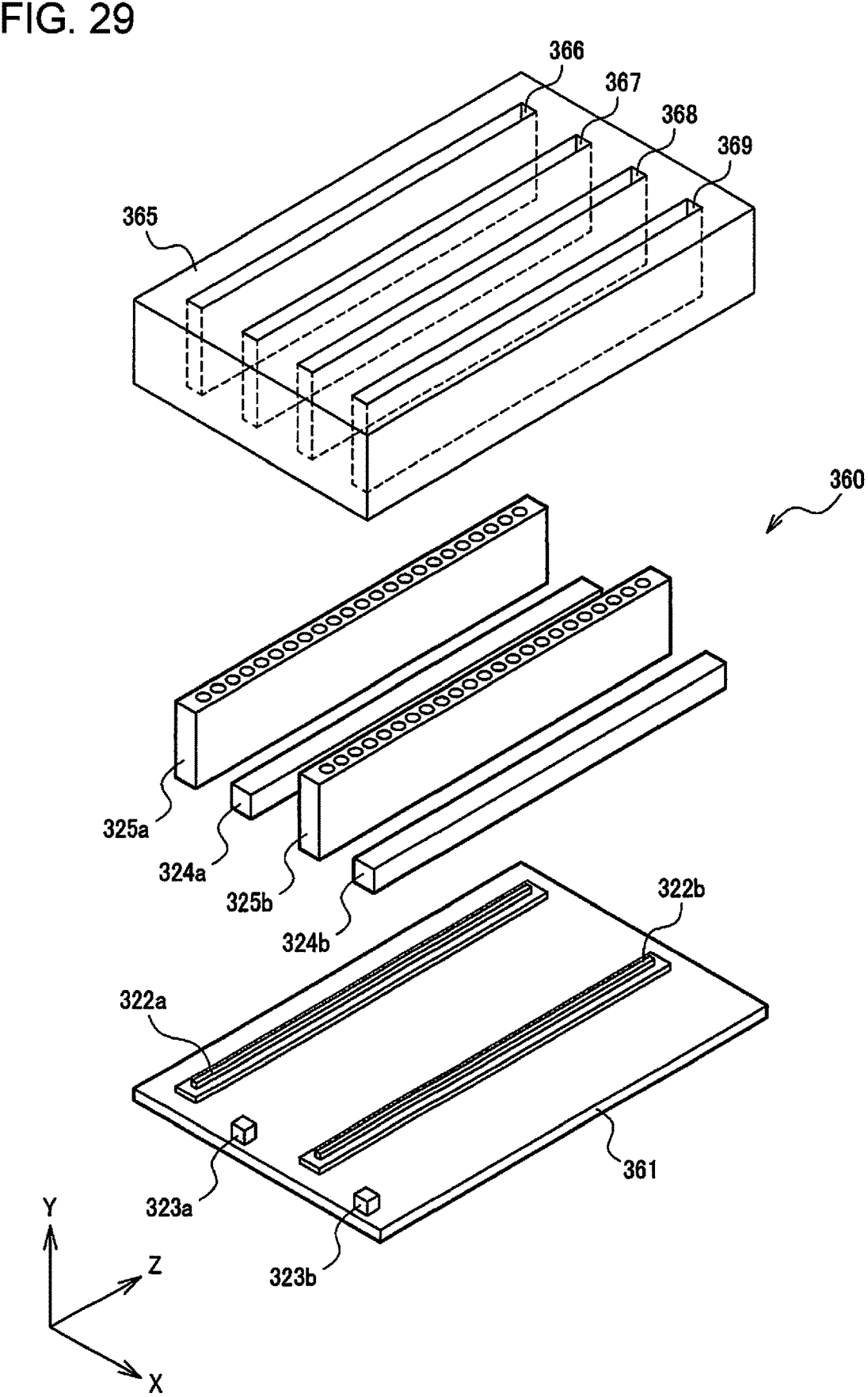
FIG. 29 is an exploded diagram illustrating another configuration of a sensor unit.
Figure 30:
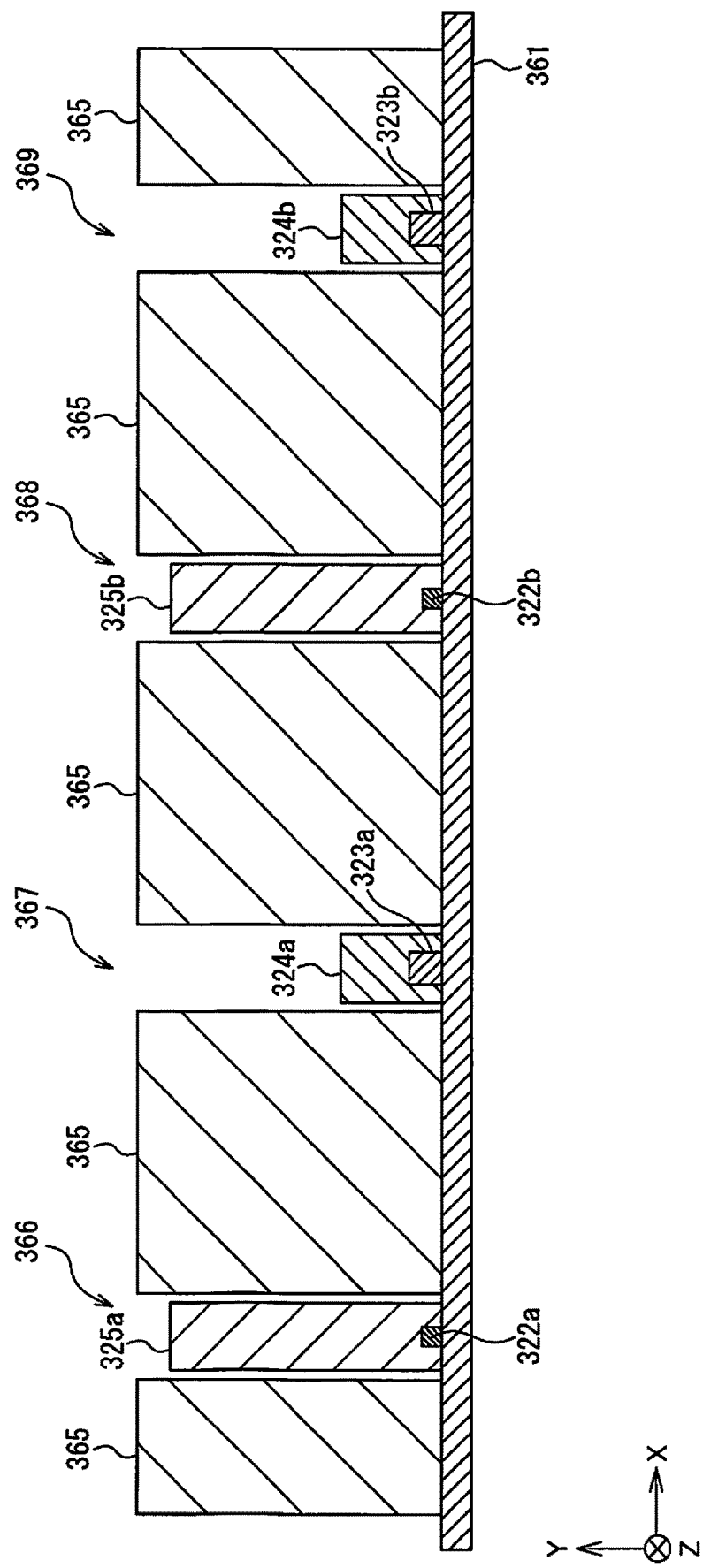
FIG. 30 is a sectional diagram illustrating another configuration of a sensor unit.

FIG. 29 is an exploded diagram illustrating the configuration of the sensor unit 360 that detects the ink amounts of the plurality of ink tanks 310, and FIG. 30 is a sectional diagram of the sensor unit 360. The sensor unit 360 includes a substrate 361, a photoelectric conversion device 322a, a photoelectric conversion device 322b, a light source 323a, a light source 323b, a light guide 324a, a light guide 324b, a lens array 325a, a lens array 325b, and a case 365. The photoelectric conversion device 322a and the photoelectric conversion device 322b are the same as the photoelectric conversion device 322, respectively. The light source 323a and the light source 323b are the same as the light source 323, respectively. The light guide 324a and the light guide 324b are the same as the light guide 324, respectively. The lens array 325a and the lens array 325b are the same as the lens array 325, respectively.

As illustrated in FIGS. 29 and 30, the case 365 is provided with four openings 366 to 369. The photoelectric conversion device 322a and the lens array 325a are provided at a position corresponding to the opening 366. The light guide 324a and the light source 323a are provided at a position corresponding to the opening 367. The photoelectric conversion device 322b and the lens array 325b are provided at a position corresponding to the opening 368. The light guide 324b and the light source 323b are provided at a position corresponding to the opening 369. Light shielding walls are respectively provided between the photoelectric conversion device 322a and the light source 323a, between the light source 323a and the photoelectric conversion device 322b, and between the photoelectric conversion device 322b and the light source 323b. In the examples of FIGS. 29 and 30, the light shielding wall is a part of the case 365.

Light is emitted from the light source 323a to the first ink tank via the light guide 324a, and reflected light of the light is detected by the photoelectric conversion device 322a via the lens array 325a. Light is emitted from the light source 323b to the second ink tank via the light guide 324b, and reflected light of the light is detected by the photoelectric conversion device 322b via the lens array 325b. The size of the ink tank 310 and the positional relationship between the plurality of ink tanks 310 are known in the design of the electronic apparatus 10. Thus, proper positional relationship between the light source 323a, the light source 323b, the photoelectric conversion device 322a, and the photoelectric conversion device 322b is also known. By making the substrate 361 common, the production of the unit for detecting the ink amount and the arrangement in the electronic apparatus 10 can be made efficient.

In FIGS. 29 and 30, the sensor unit 360 for detecting the amounts of ink in two ink tanks 310 is exemplified. However, a sensor unit for detecting the amounts of ink in three or more ink tanks 310 may be realized by using one substrate. In FIGS. 29 and 30, only one case 365 is provided, but only the substrate 361 may be shared and one case may be provided for each ink tank 310 as in FIG. 8.

In the light receiving unit 340 illustrated in FIG. 26 and the light emitting unit 350 illustrated in FIG. 27, the substrate can be shared. For example, a light receiving unit in which a plurality of photoelectric conversion devices 322 for detecting the amounts of ink in a plurality of ink tanks 310 are provided on one substrate may be used. Alternatively, a light emitting unit in which a plurality of light sources 323 for irradiating the plurality of ink tanks 310 with light are provided on one substrate may be used.

3. Ink Amount Detection Processing Based on Output of Photoelectric Conversion Device Next, processing of estimating the amount of ink IK accommodated in the ink tank 310 based on the output of the photoelectric conversion device 322 will be described. In the following description, any of the various embodiments described above may be used for the arrangement of the photoelectric conversion device 322 and the like.

3.1 Basic Ink Amount Detection Processing

FIG. 31 is a waveform representing output data of the photoelectric conversion device 322. As described above with reference to FIG. 13, the output signal OS of the photoelectric conversion device 322 is an analog signal, and output data as digital data is acquired by A/D conversion by the AFE 130. In order to simplify the description, digital data that is a result of A/D conversion performed on the output signal OS is referred to as "output data of the photoelectric conversion device 322".

The horizontal axis of FIG. 31 represents a position of the photoelectric conversion device 322 in the longitudinal direction, and the vertical axis represents a value of output data corresponding to the photoelectric conversion element provided at the position. The numerical values of the horizontal axis of FIG. 31 represent the distances from the reference position in unit of millimeters. FIG. 31 illustrates examples in which the red LED 323R, the green LED 323G, and the blue LED 323B are provided as the light source 323. The processing unit 120 acquires three pieces of output data of RGB as output data of the photoelectric conversion device 322.

When the longitudinal direction of the photoelectric conversion device 322 is the vertical direction, the left end of the horizontal axis is a position corresponding to the photoelectric conversion element provided at the end of the photoelectric conversion device 322 in the +Z direction, and the right end of the horizontal axis is a position corresponding to the photoelectric conversion element provided at the end of the photoelectric conversion device 322 in the −Z direction. If the positional relationship between the photoelectric conversion device 322 and the ink tank 310 is known, the horizontal axis can be replaced with the distances from the reference position of the ink tank 310. The reference position of the ink tank 310 is, for example, a position equivalent to the bottom surface of the ink tank 310.

The output data is, for example, 8-bit data, and has a value in the range of 0 to 255. However, the values of the vertical axis can be replaced with data after the normalization processing or the like described later is performed. The FIG. 31 does not need to include output data corresponding to all photoelectric conversion elements included in the photoelectric conversion device 322, and may be a result of extracting data corresponding to some of the photoelectric conversion elements, for example, according to the pitch of the optical separator.

As described above, regardless of the configuration of reflected light, transmitted light, or spatial light, the photoelectric conversion element corresponding to the area where the ink IK does not exist has relatively large amount of light received, and the photoelectric conversion element corresponding to the area where the ink IK exists has relatively small amount of light received. In the example illustrated in FIG. 31, the value of output data is large in the range indicated by D1, and the value of output data is small in the range indicated by D3. The value of the output data is greatly changed with respect to the change of the position in the range indicated by D2 between D1 and D3. That is, the range of D1 is an ink non-detection area having a high probability that the ink IK does not exist. The range of D3 is an ink detection area having a high probability that the ink IK exists. The range of D2 is an ink boundary area representing a boundary between an area where the ink IK exists and an area where the ink IK does not exist.

The processing unit 120 performs the ink amount detection processing based on the output data of the photoelectric conversion device 322. Specifically, the processing unit 120 detects the position of the interface of the ink IK based on the output data of the photoelectric conversion device 322. As illustrated in FIG. 31, the interface of the ink IK is considered to exist at any position of the boundary area D2. Therefore, the processing unit 120 detects the interface of the ink IK based on a given threshold Th smaller than the value of the output data in the ink non-detection area and greater than the value of the output data in the ink detection area.

For example, the processing unit 120 specifies the maximum value of the output data of the photoelectric conversion device 322 as the value of the output data in the ink non-detection area. The processing unit 120 determines a value smaller than the specified value by a predetermined amount as the threshold Th. Alternatively, the processing unit 120 specifies the minimum value of the output data of the photoelectric conversion device 322 as the value of the output data in the ink detection area. The processing unit 120 determines a value greater than the specified value by a predetermined amount as the threshold Th. Alternatively, the processing unit 120 may determine the threshold Th based on the average of the maximum value and the minimum value of the output data of the photoelectric conversion device 322.

However, when the type of the ink IK and the type of the light source 323 are determined, the value of the output data corresponding to the ink interface can be determined in advance. Therefore, the processing unit 120 may perform processing of reading out the predetermined threshold Th in advance from the storage unit 140 without obtaining the threshold Th each time.

When the threshold Th is acquired, the processing unit 120 detects a position where the output value becomes Th as an interface position of the ink IK. In this way, the amount of ink included in the ink tank 310 can be detected by using the photoelectric conversion device 322 which is a linear image sensor. Information obtained directly by using Th is a relative position of the ink interface with respect to the photoelectric conversion device 322. Therefore, the processing unit 120 may perform calculation for obtaining the remaining amount of the ink IK based on the position of the interface.

When all the output data is larger than Th, the processing unit 120 determines that ink does not exist in the target range of ink amount detection, that is, the interface is located at a position lower than the end point of the photoelectric conversion device 322 in the −Z direction. When all the output data is smaller than Th, the processing unit 120 determines that the target range of ink amount detection is filled with ink, that is, the interface is at a position higher than the end point of the photoelectric conversion device 322 in the +Z direction. If it is not possible that the interface is located at a higher position than the end point of the photoelectric conversion device 322 in the +Z direction, it may be determined that an abnormality has occurred.

The ink amount detection processing is not limited to processing using the threshold Th in FIG. 31. For example, the processing unit 120 performs processing for obtaining an inclination of the graph illustrated in FIG. 31. The inclination is specifically a differentiation value and more specifically, a differential value between adjacent output data. When some of the output data are extracted in accordance with the pitch of the optical separator, the adjacent output data represent the adjacent data in the extracted data string. The processing unit 120 detects a point where the inclination is larger than a predetermined threshold, more specifically, a position where the inclination becomes maximum, as the position of the interface. If the maximum value of the obtained inclination is a given inclination threshold or less, the processing unit 120 determines that the interface is at a position lower than the end point of the photoelectric conversion device 322 in the −Z direction or a position higher than the end point in the +Z direction. Which side the interface is on can be identified from the value of the output data.

When a plurality of output data are acquired as illustrated in FIG. 31, the ink amount detection processing may be performed based on any one of the output data. Alternatively, the processing unit 120 may specify the positions of respective interfaces using respective output data, and determine the final position of the interface based on the specified positions. For example, the processing unit 120 determines, as the interface position, an average value or the like of an interface position obtained based on output data of R, an interface position obtained based on output data of G, and an interface position obtained based on output data of B. Alternatively, the processing unit 120 may obtain composite data obtained by combining three pieces of output data of RGB and obtain the position of the interface based on the composite data. The composite data is average data obtained by averaging output data of RGB at each point, for example.

Figure 32:
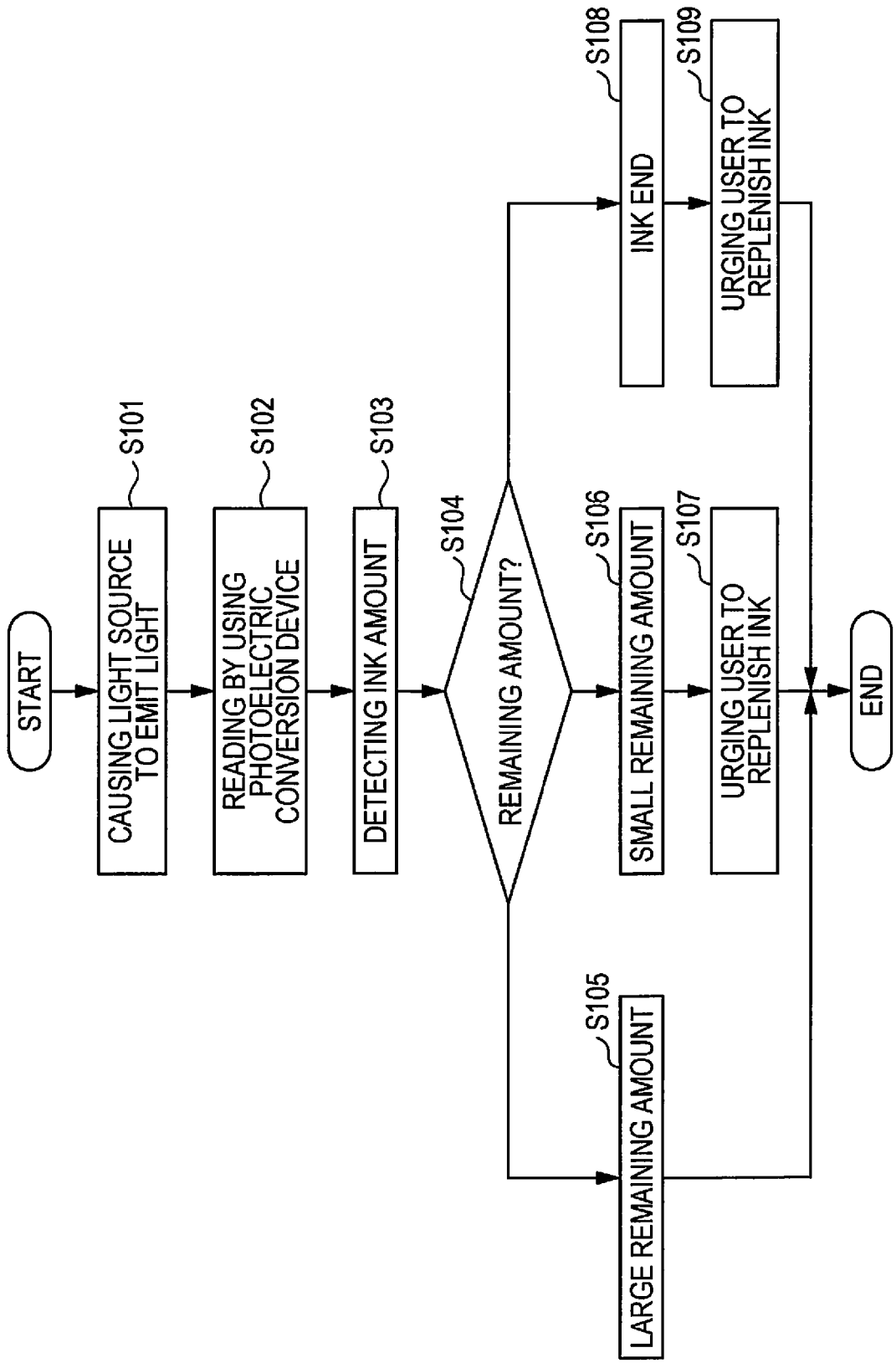
FIG. 32 is a flowchart for explaining ink amount detection processing.

FIG. 32 is a flowchart for explaining processing including the ink amount detection processing. When the processing is started, the processing unit 120 performs control for causing the light source 323 to emit light (S101). Then, in the period during which the light source 323 emits light, reading processing using the photoelectric conversion device 322 is performed (S102). When the light source 323 includes a plurality of LEDs, the processing unit 120 sequentially performs processing of S101 and S102 for each of the red LED 323R, the green LED 323G, and the blue LED 323B. Through the above processing, three pieces of output data of RGB illustrated in FIG. 31 are acquired.

Next, the processing unit 120 performs detection processing of the ink amount based on the acquired output data (S103). As described above, the specific processing of S103 can be variously modified such as comparison processing with the threshold Th and detection processing of the maximum value of the inclination.

The processing unit 120 determines the amount of the ink IK in the ink tank 310 based on the detected position of the interface (S104). For example, the processing unit 120 sets ink amounts in three stages of "large remaining amount", "small remaining amount", and "ink end" in advance, and determines whether the current ink amount corresponds to which one of them. The large remaining amount represents a state in which a sufficient amount of the ink IK is left and no user action is required for continuing printing. The small remaining amount represents a state in which the continuation of printing itself is possible but the amount of ink is reduced and replenishment by the user is desirable. The ink end represents a situation where the ink amount is markedly reduced and the printing operation should be stopped.

When it is determined that the remaining amount is large in processing of S104 (S105), the processing unit 120 ends the processing without performing notification or the like. When it is determined that the remaining amount is small in the processing of S104 (S106), the processing unit 120 performs notification processing for urging the user to replenish the ink IK (S107). The notification processing is performed by displaying a text or an image on a display unit 150, for example. However, the notification processing is not limited to displaying, and may be notification by emitting light from a light emitting unit for notification, notification by sound using a speaker, or notification by combining these. When the ink end is determined in the processing of S104 (S108), the processing unit 120 performs notification processing of urging the user to replenish the ink IK (S109). The notification processing of S109 may be the same as the notification processing of S107. However, as described above, it is difficult to continue the printing operation in the ink end, which is a serious state as compared with the small remaining amount. Thus, the processing unit 120 may perform notification processing in S109 different from that of S107. Specifically, the processing unit 120 may execute, in S109, processing of changing the text to be displayed to a content that strongly prompts the user to replenish ink IK, increasing the light emission frequency, increasing the sound, or the like compared to the processing of S107. The processing unit 120 may perform processing (not illustrated) such as printing operation stop control after the processing of S109.

The execution trigger for the ink amount detection processing illustrated in FIG. 32 can be set in various ways. For example, the execution start of a given print job may be used as the execution trigger or a lapse of a predetermined time may be used as the execution trigger.

The processing unit 120 may store the ink amount detected by in the ink amount detection processing to the storage unit 140. The processing unit 120 performs processing based on the time series change of the detected ink amount. For example, the processing unit 120 obtains an ink increase amount or an ink decrease amount based on a difference between the ink amount detected at a given timing and the ink amount detected at a timing before the given timing.

Since the ink IK is used for printing, head cleaning, or the like, the reduction of the ink amount is natural in consideration of the operation of the electronic apparatus 10. However, the amount of ink IK consumed per unit time in printing and the amount of ink IK consumed per head cleaning are determined to some extent, and if the amount of consumption is extremely large, there may be some abnormality such as ink leakage.

For example, the processing unit 120 obtains a standard ink consumption assumed in printing or the like in advance. The standard ink consumption may be obtained based on the estimated ink consumption per unit time or based on the estimated ink consumption per job. The processing unit 120 determines that there is an abnormality when the ink reduction amount obtained based on the time-series ink amount detection processing is equal to or larger than the standard ink consumption by a predetermined amount or more. Alternatively, the processing unit 120 may perform consumption calculation processing of calculating the amount of ink consumption by counting the number of times of ejection of the ink IK as described above. In this case, the processing unit 120 determines that there is an abnormality when the ink decrease amount obtained based on the time series ink amount detection processing is larger than the ink consumption calculated by the consumption calculation processing by a predetermined amount or more.

The processing unit 120 sets an abnormality flag to be ON when the abnormality is determined. In this way, when the ink amount is excessively reduced, some kind of error processing can be executed. Various processing can be considered when the abnormality flag is set to ON. For example, the processing unit 120 may re-execute the ink amount detection processing illustrated in FIG. 32 with the abnormality flag as a trigger. Alternatively, the processing unit 120 may perform notification processing for urging the user to check the ink tank 310 based on the abnormality flag.

The ink amount increases by replenishing the ink IK by the user. However, it is conceivable that the ink amount increases even when the ink IK is not replenished, such as temporary interface change due to shaking of the electronic apparatus 10, backflow of ink IK from the tube 105, detection error of the photoelectric conversion device 322, or the like. Therefore, when the ink increase amount is a given threshold or less, the processing unit 120 determines that the ink IK is not replenished and the increase width is within an allowable error range. In this case, since it is determined that the change in the ink amount is in a normal state, no additional processing is performed.

On the other hand, when the ink increase amount is larger than the given threshold, the processing unit 120 determines that the ink is replenished and sets an ink replenishment flag to ON. The ink replenishment flag is used as a trigger for executing ink characteristics determination processing which will be described later, for example. The ink replenishment flag may be used as a trigger for processing of resetting an initial value in the consumption calculation processing.

However, when the ink increase amount is larger than the given threshold, there may be a possibility of an unacceptably large error due to some abnormality. Thus, the processing unit 120 performs notification processing for requesting the user to input whether the ink has been replenished, and may determine whether to set the abnormality flag or the ink replenishment flag based on the user input result.

3.2 Ink Droplet

Figure 33:
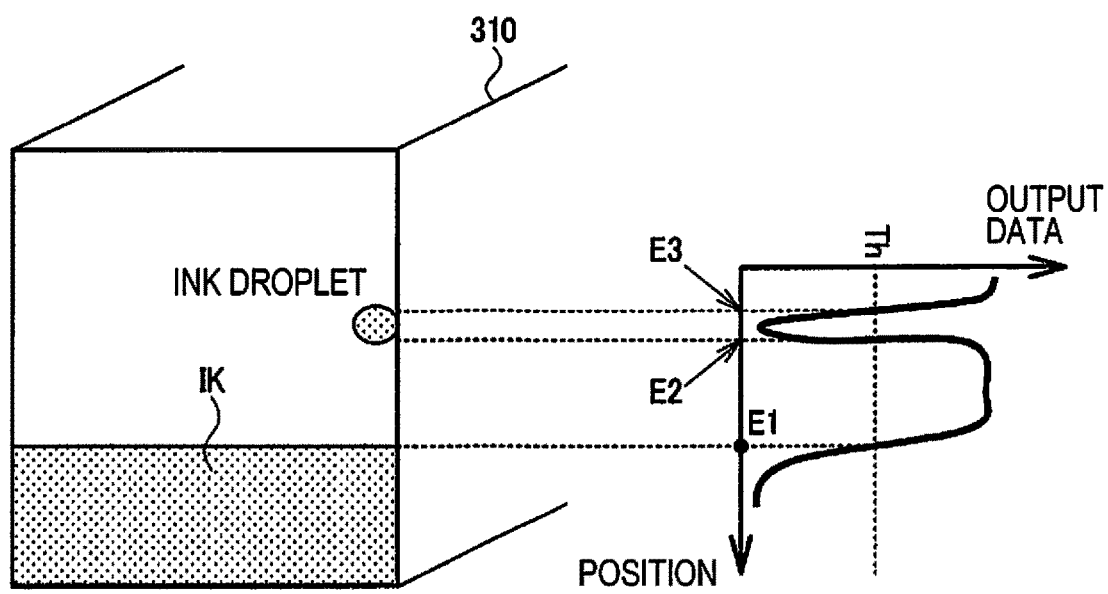
FIG. 33 is a schematic diagram illustrating an ink tank to which an ink droplet is attached and output data at that time.

FIG. 33 is a schematic diagram when an ink droplet adheres to the inner wall of the ink tank 310 in the −Y direction, and a schematic diagram of output data of the photoelectric conversion device 322 when an ink droplet adheres. The ink droplet represents a particle of ink which is a liquid. In FIG. 33, the graph is rotated and described so that the vertical axis represents the position and the horizontal axis represents the output data of the photoelectric conversion device 322 in consideration of the positional relationship between the photoelectric conversion device 322 and the ink tank 310.

As described above, the photoelectric conversion device 322 is provided in the −Y direction with respect to the ink tank 310 and detects light from the side surface of the ink tank 310 in the −Y direction. When the ink droplet adheres to the inner wall in the −Y direction, since absorption and scattering of light are generated by the ink droplet, the portion corresponding to the ink droplet becomes relatively dark. As a result, as illustrated in FIG. 33, in the output data of the photoelectric conversion device 322, the value decreases not only in the position E1 equivalent to the interface but also in the range from a position E2 to a position E3 equivalent to the ink droplet.

The processing unit 120 detects a point at which the output data is a given threshold Th as a position corresponding to the ink interface as described above, for example. As illustrated in FIG. 33, when an ink droplet adheres, there are a plurality of points at which the output data becomes the given threshold Th.

Therefore, the processing unit 120 detects the amount of ink in the ink tank based on the lowermost position among the positions where the amount of light detected by the photoelectric conversion device 322 satisfies a given condition. A position where the detected light amount satisfies the given condition is referred to as a candidate position of the ink interface. As described above, in the electronic apparatus 10 that is a printer includes the print head 107 that performs printing by using the ink IK in the ink tank 310, the light source 323 that irradiates the ink tank 310 with light, the photoelectric conversion device 322 that detects light incident from the ink tank 310 in a period during which the light source 323 emits light, and the processing unit 120 that detects the amount of ink in the ink tank 310 based on the output of the photoelectric conversion device 322.

Since the ink IK in the present embodiment is a liquid, in the normal usage mode of the electronic apparatus 10, the ink moves in the −Z direction which is a vertically downward direction, in accordance with gravity and accumulates from the bottom surface of the ink tank 310. Therefore, even if there is a dark area where output data decreases, when there is a brighter air layer vertically downward, it is assumed that the dark area is not the interface of the ink IK but the ink droplet. Thus, it is possible to appropriately detect the ink amount by estimating the position of the lowermost position among the candidate positions of the ink interface as the ink interface. In the case of the example illustrated in FIG. 33, the processing unit 120 determines that E3 is the ink droplet among E1 and E3 of which output value is Th or less, and determines that E1 is the ink interface.

The processing unit 120 determines that the given condition is satisfied when it is determined that the amount of change of the light amount is the first threshold or more. The amount of change of the light amount is, for example, the amount of change with respect to a given reference light amount. The reference light amount may be a light amount corresponding to the ink non-detection area as described above or a light amount corresponding to the ink detection area. The amount of change of the light amount may be the inclination of the graph. As described above, the method for estimating the candidate position of the ink interface can be variously modified.

When a plurality of candidate positions of the interface are detected based on the output of the photoelectric conversion device 322 at the given timing, the processing unit 120 may detect the lowermost candidate position directly as the position of the interface. However, when an ink droplet adheres to the inner wall of the ink tank 310, it is considered that an event having a low occurrence frequency in the normal usage state of the electronic apparatus 10 has occurred, for example, electronic apparatus 10 is shaken. In this case, since there is a possibility that the state of the ink IK in the ink tank 310 may not be stable, the processing unit 120 may perform the ink amount detection processing again and determines the position of the interface of the ink IK based on the result of the re-detection.

Specifically, when a plurality of candidate positions satisfying the given condition are detected in the ink amount detection processing at the first timing, the processing unit 120 performs the ink amount detection processing again at the second timing after the lapse of a given period. The given period here is a short time of several seconds to several tens of seconds. For example, when the ink amount detection processing is performed for each execution of the print job, since the interval of the ink amount detection processing is longer than the execution time of the job, the given period here is shorter than that. Thus, when the adhesion of the ink droplet is suspected, the ink amount detection processing can be quickly executed again.

The processing unit 120 determines the lowermost position among the candidate positions detected at the first timing as a temporary interface, and determines whether the temporary interface is determined as the ink interface based on comparison processing between the detection result at the second timing and the detection result at the first timing. For example, when it is determined that the difference between the detection result at the second timing and the detection result at the first timing is small, the processing unit 120 determines that the state of the ink IK is stable and the temporary interface is determined as the ink interface. The small difference indicates, for example, that the change in the position of the point at which the output data is a given threshold in the Z-axis is small. In determining whether the temporary interface is reliable, it is important whether the state of ink IK is stable in the vicinity of the temporary interface. Therefore, it is not necessary to compare all of the detection results at the second timing and the detection results at the first timing, and for example, information on a position close to the temporary interface may be compared.

Figure 34:
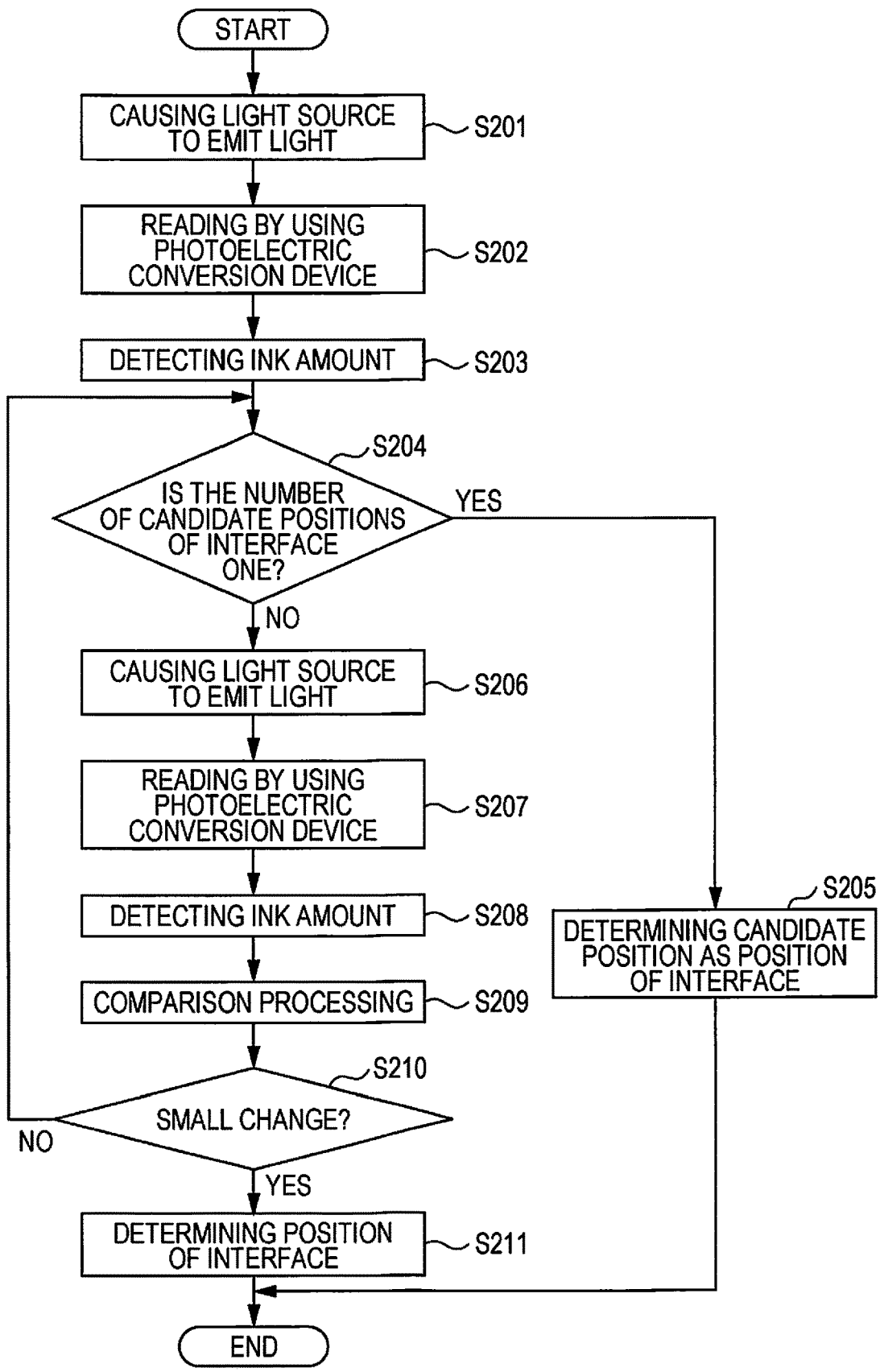
FIG. 34 is a flowchart for explaining ink amount detection processing in consideration of an ink droplet.

FIG. 34 is a flowchart for explaining the ink amount detection processing including processing related to the ink droplet. Processing of S201 and S202 in FIG. 34 is the same as processing of S101 and S102 in FIG. 32. Next, the processing unit 120 performs the ink amount detection processing. Specifically, a point at which the output data becomes the threshold Th is detected (S203). When the ink drop exists, there are a first feature point that changes from a value larger than the threshold Th to a threshold Th or less and a second feature point that changes from a value equal to or less than the threshold Th to a value greater than the threshold Th, in the −Z direction at the point where the output data becomes the threshold Th. In the example illustrated in FIG. 33, E1 and E3 are the first feature points, and E2 is the second feature point. Since the number of ink droplets is not limited to one, three or more first feature points and two or more second feature points may be detected. The processing unit 120 determines the first feature point as a candidate position of the interface. In the example illustrated in FIG. 33, the candidate positions of the interface are E1 and E3, and E1 is the lowermost candidate position between them. The processing unit 120 also stores the second feature point in the storage unit 140.

Next, the processing unit 120 determines whether a plurality of candidate positions of the interface are detected (S204). When there is one candidate position (Yes in S204), the one candidate position is determined as the position of the interface (S205). When a plurality of candidate positions are detected (No in S204), detection processing is executed again after defining the lowermost position of the first feature points as the temporary interface. Specifically, the processing unit 120 performs control for causing the light source 323 to emit light (S206), and performs light reception control of the photoelectric conversion device 322 during a light emission period of the light source 323 (S207). The processing unit 120 detects the first feature point and the second feature point where the output data is the threshold Th (S208).

The processing unit 120 performs processing of comparing the detection result in S203 with the detection result in S208 (S209). For example, comparison of the lowermost points among the first feature points and comparison of the lowermost points among the second feature points are performed. The processing unit 120 determines whether the change between the two detection results is small based on the comparison processing (S210).

When both the changes of the two points are a predetermined level or less (Yes in S210), the degree of change in the vicinity of at least the temporary interface is small, and it is determined that the detection result is reliable. Therefore, the processing unit 120 detects the position of the interface based on the temporary interface detected in S203 (S211). Note that the processing unit 120 may directly use the position of the temporary interface as the position of the interface, may use the position of the lowermost first feature point detected in S208 as the position of the interface, or may determine the position of the interface based on an average or the like of the two positions. In FIG. 34, the processing is finished after the determination of the position of the interface, but the processing may be shifted to the processing of S104 in FIG. 32.

When it is determined that the change between the two detection results is large (No in S210), the processing returns to S204, for example, and performs processing of determining the interface again. However, various modifications can be executed for the processing when No is determined in S210, for example, when the processing is finished without determining the position of the interface.

3.3 Shading Correction

The photoelectric conversion device 322 of the present embodiment includes a plurality of photoelectric conversion elements. Since the characteristics of the photoelectric conversion elements are varied, the output may vary depending on the photoelectric conversion elements even when light of the same intensity is incident. There is a possibility that the detection accuracy of the ink amount may be lowered due to this variation. For example, when the output of a given photoelectric conversion element is lowered compared with the output of a peripheral photoelectric conversion element, the processing unit 120 may not be able to determine whether the output is lowered due to the presence of ink IK or the output is lowered due to the variation in the photoelectric conversion elements. Therefore, preferably, the processing unit 120 performs the correction processing on the output data of the photoelectric conversion device 322, and performs the ink amount detection processing based on the data after the correction processing. Similarly, regarding the ink characteristics determination processing which will be described later, there is a possibility that the processing accuracy may be lowered due to the characteristics variation in the photoelectric conversion elements. By performing the correction processing, the accuracy of the ink characteristics determination processing can be improved.

Shading correction is widely used in the linear image sensor used in a scanner. For example, the scanner incorporates a color reference plate used for shading correction. Specifically, the color reference plate is a white reference plate as a white reference. A white reference value is acquired by performing reading processing of a white reference plate in a state where the light source is turned on. A black reference value is acquired by performing reading processing in a state where the light source is turned off. The scanner performs shading correction processing based on the white reference value and the black reference value with respect to digital data being the reading result of the photoelectric conversion element, and outputs an image based on the corrected data.

In the present embodiment, by performing correction processing similar to that of the scanner, variation in photoelectric conversion elements can be suppressed. However, as illustrated in FIG. 31, the processing unit 120 of the present embodiment performs the ink amount detection processing based on the difference of brightness between the area where the ink IK is not filled and the area where the ink IK is filled. That is, it is not assumed that the photoelectric conversion device 322 used for the ink amount detection processing detects light having a larger amount of light than light from the area where the ink IK is not filled. The side surface of the ink tank 310 is formed of a light transmissive member such as a resin, and the reflectance is not as higher as that of the white reference plate. Therefore, in the case where the output data when the white reference plate is read is used as the white reference value, the area near the maximum value is not used in the actual ink amount detection processing. Since the data is processed using a narrow numerical range, the resolution is lowered, and the accuracy of the ink amount detection processing may be lowered. In the first place, the printer unit 100 and the ink tank unit 300 often do not include the white reference plate.

The method of the present embodiment is applicable to a production method of a printer which detects the ink amount in the ink tank 310 using the light source 323 and the photoelectric conversion device 322. The production method includes a first step of irradiating the ink tank 310 with light from the light source 323 in a state where the ink IK is not filled in the ink tank 310, and detecting light from the ink tank 310 using the photoelectric conversion device 322. Also, the production method includes a second step of storing a first correction parameter of the output of the photoelectric conversion device 322 in a non-volatile storage unit of the printer, based on the output of the photoelectric conversion device 322 in the first step. The non-volatile storage unit is included in, for example, a storage unit 140. The storage unit 140 may include a volatile storage unit in addition to the non-volatile storage unit.

In the first step, "unfilled" means that ink is not filled in an area facing the photoelectric conversion device 322 in the ink tank 310. That is, the first step is not prevented from being executed in a state where the ink IK is filled in the area in the −Z direction with respect to the position where the photoelectric conversion device 322 is provided. Alternatively, the first step may be executed when the ink IK is once filled and the ink is discharged and not filled. The state at this time is also "unfilled" because the ink will be filled later. The processing unit 120 performs light emission control of the light source 323 and light reception control of the photoelectric conversion device 322. When the light source 323 includes the red LED 323R, the green LED 323G, and the blue LED 323B, the first correction parameter may be obtained by causing any one LED to emit light, but it is not hindered to obtain the first correction parameter individually for each emission color. The first correction parameter stored in the storage unit 140 is a set of values corresponding to the number of photoelectric conversion elements.

The first correction parameter is a white reference parameter. In this way, for each element of the plurality of photoelectric conversion elements, correction is performed so that the value of the output data in the ink non-detection area becomes a value near the maximum value. Thus, since variation in the photoelectric conversion elements is suppressed and the range of output data is effectively utilized, the accuracy of ink amount detection processing can be improved.

Further, the photoelectric conversion device 322 used for the ink amount detection processing is not assumed to receive light having a smaller amount of light than light from the area filled with the ink IK. When correction processing is performed with output data in a state where the light source 323 is turned off as a reference value, the area near the minimum value is not used in actual ink amount detection processing. Thus, the accuracy of ink amount detection processing may be reduced.

Therefore, the production method of the printer according to the present embodiment may include a third step of irradiating the ink tank 310 with light from the light source 323 and detecting light from the ink tank 310 using the photoelectric conversion device 322 in a state where the ink tank 310 is filled with the ink IK. The production method includes a fourth step of storing a second correction parameter of the output of the photoelectric conversion device in a non-volatile storage unit of the printer based on the output of the photoelectric conversion device 322 in the third step.

In the third step, "filling" means that at least an area of the ink tank 310 facing the photoelectric conversion device 322 is filled with ink, and the specific amount of ink IK can be variously modified.

The second correction parameter is a parameter of a black reference. In this way, for each element of the plurality of photoelectric conversion elements, correction is performed so that the value of the output data in the ink detection area becomes a value near the minimum value. By using both the white reference parameter and the black reference parameter, variation in the photoelectric conversion elements is further suppressed and the range of output data is effectively utilized, thereby improving the accuracy of ink amount detection processing.

When the photoelectric conversion device 322 is provided in each of the plurality of ink tanks 310, ink IK corresponding to the target ink tank 310 may be filled in the third step for each photoelectric conversion device 322. For example, in the third step for the photoelectric conversion device 322 for detecting the amount of yellow ink IK, in a state where the yellow ink IK is filled, the ink tank 310 is irradiated with light from the light source 323, and light from the ink tank 310 is detected using the photoelectric conversion device 322. In the third step for the photoelectric conversion device 322 for detecting the amount of the magenta ink, the magenta ink IK is filled. In this way, the data range can be appropriately expanded. However, filling of the same ink IK for inspection is not hindered for all the ink tanks 310 in consideration of a reduction in manufacturing burden. In this case also, the deterioration of accuracy caused by variation in the photoelectric conversion elements can be suppressed.

The correction processing using the first correction parameter and the second correction parameter is performed by equation (1). In equation (1), W represents the first correction parameter which is the parameter of the white reference. B represents the second correction parameter which is the parameter of the black reference. E is output data before the correction processing, and E' is output data after the correction processing.

$$E' = \frac{E - B}{W - B} \quad (1)$$

The processing unit 120 acquires output data after A/D conversion from the AFE 130, and performs correction processing using the above equation (1) on each output data. Then, the processing unit 120 performs the ink amount detection processing and the ink characteristics determination processing described later based on the output data after the correction processing. In the case of using the above equation (1), E' is data of 0 or more and 1 or less. However, the numerical range of E' may be changed by multiplying the right side of the equation (1) by a given coefficient. For example, when the output data is set to 8 bits, the processing unit 120 multiplies the right side by 255 and then converts it to an integer, and sets the result as corrected output data E'.

Figure 35:
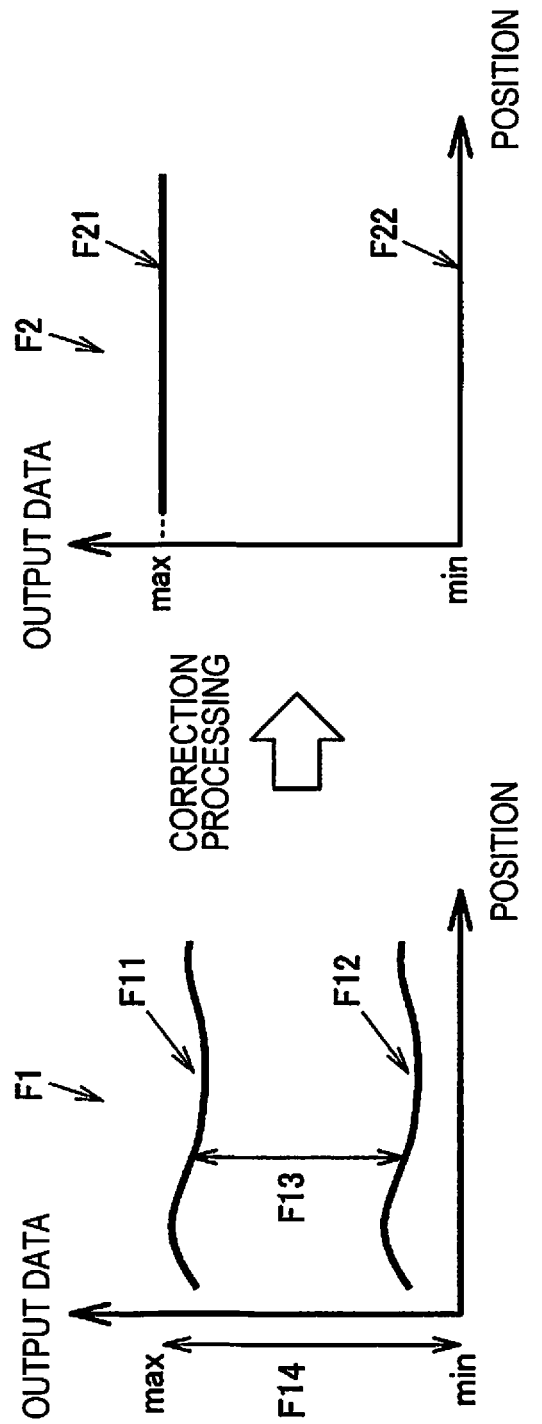
FIG. 35 is a diagram for explaining correction processing with respect to output data.

FIG. 35 is a schematic diagram for explaining a change in output data due to the correction processing. F1 in FIG. 35 represents data before the correction processing, and F2 represents data after the correction processing. In both F1 and F2, the horizontal axis represents a position in the photoelectric conversion device 322, and the vertical axis represents output data of the photoelectric conversion element corresponding to the position.

F11 is an example of output data detected in the first step, that is, the first correction parameter. Despite the incidence of light from an area that is not filled with ink IK on all the photoelectric conversion elements, values vary due to variation in the photoelectric conversion elements. F12 is an example of output data detected in the third step, that is, the second correction parameter. Despite the incidence of light from an area that is filled with ink IK on all the photoelectric conversion elements, values vary due to variation in the photoelectric conversion elements. Further, since the output data in the ink amount detection processing has a value between F11 and F12, for example, a range indicated by F13, the output data is narrower than F14, which is a numerical value range that the output data can take.

F21 is a correction result for the output data detected in the first step. As indicated by F21, since correction processing is performed so that output data corresponding to the area not filled with ink IK has the maximum value max, variation in data is suppressed. F22 is a correction result for the output data detected in the third step. As indicated by F22, since correction processing is performed so that output data corresponding to the area filled with the ink IK has the minimum value min, the variation in data is suppressed. Further, since the output data in the ink amount detection processing has a value between F21 and F22, a numerical range that the output data can take can be effectively utilized.

As illustrated in the above equation (1) and FIG. 35, the first correction parameter is a normalization parameter of the output of the photoelectric conversion device 322. Similarly, the second correction parameter is a normalization parameter of the output of the photoelectric conversion device 322. That is, correction processing in the present embodiment is normalization processing based on the first correction parameter. By using the output data after the normalization processing, the accuracy of ink amount detection processing or the like can be improved.

However, the production method of the printer according to the present embodiment is not limited to one including all the first to fourth steps. In the manufacturing step of the printer, it is considered normal that the ink tank 310 is not filled with ink IK. Thus, the first step is easily implemented. On the other hand, in the third step, it is necessary to fill the ink tank 310 with ink IK to the extent that the ink IK exists at least at a portion, facing the photoelectric conversion device 322, of the ink tank 310. Therefore, the case where the third step can be executed is limited, or the filling of ink IK is required only for executing the third step.

Therefore, the production method of the printer according to the present embodiment may include a fifth step of detecting light from the ink tank 310 using the photoelectric conversion device 322 in a state where the light source 323 is not caused to radiate light, and a sixth step of storing a third correction parameter of the output of the photoelectric conversion device 322 in the non-volatile storage unit of the printer based on the output of the photoelectric conversion device 322 in the fifth step. The third correction parameter is a parameter of the black reference.

The fifth step and the sixth step are performed in place of the third step and the fourth step. In this way, the parameter of the black reference can be easily acquired as compared with the case where the third step is performed. The processing unit 120 executes correction processing on the output data of the photoelectric conversion device 322 based on the first correction parameter and the third correction parameter. The third step is advantageous from the viewpoint of the range of the output data, and the fifth step is advantageous from the viewpoint of the easiness of measurement.

3.4 Correction Processing by Mark

As described above with reference to FIG. 31, what is required in the ink amount detection processing is information indicating which one of the plurality of photoelectric conversion elements included in the photoelectric conversion device 322 has a position corresponding to the ink interface. In order to specify the ink amount, the position of the ink interface in the ink tank 310 is required. That is, in order to specify the ink amount, the positional relationship between the ink tank 310 and the photoelectric conversion device 322 has to be known.

For example, the sensor unit 320 is fixed to a predetermined position of the ink tank 310 based on the design. Since the error in mounting of the photoelectric conversion device 322 on the substrate 321 is considered to be sufficiently small, when the sensor unit 320 is fixed to the ink tank 310 as designed, the positional relationship between the ink tank 310 and the photoelectric conversion device 322 also becomes as designed. However, the positional relationship between the sensor unit 320 and the ink tank 310 may not coincide with that of the design due to the assembly error.

Figure 36:
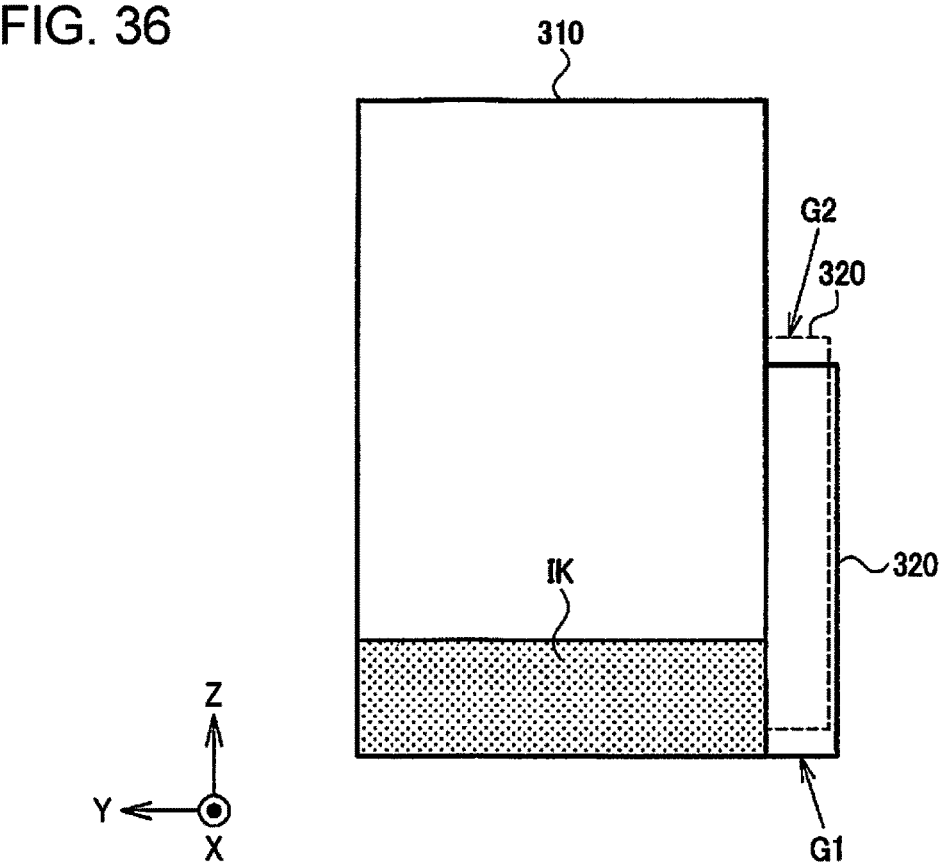
FIG. 36 is a schematic diagram for explaining an assembly error.

FIG. 36 is a schematic diagram illustrating the assembly error of the sensor unit 320. The sensor unit 320 is designed to be fixed at the position indicated by G1, but may be fixed at the position indicated by G2 that is shifted in the +Z direction due to the assembly error. When the sensor unit 320 is shifted in the +Z direction, the processing unit 120 detects the ink interface at the position of the photoelectric conversion element in the −Z direction rather than the photoelectric conversion element originally corresponding to the ink interface. Therefore, it is determined that the ink amount is smaller than the actual amount. On the contrary, when the sensor unit 320 is shifted in the −Z direction, the processing unit 120 detects the ink interface at the position of the photoelectric conversion element in the +Z direction rather than the photoelectric conversion element originally corresponding to the ink interface. Therefore, it is determined that the ink amount is larger than the actual amount. Thus, the assembly error in the Z-axis becomes a factor for lowering the accuracy of the ink amount detection processing. Although errors in the horizontal direction, particularly in the X-axis, can be generated, the assembly errors in the horizontal direction do not lead to erroneous determination of the interface position. The sensor unit 320 is illustrated in FIG. 36, but the same applies to the case of using the light receiving unit 340.

The electronic apparatus 10 of the present embodiment includes the ink tank 310 with a mark MK attached to its side surface. The photoelectric conversion device 322 is provided outside the side surface to which the mark MK is attached out of the side surfaces of the ink tank 310, and detects light from the ink tank 310 in a period during which the light source 323 emits light. The processing unit 120 determines the position of the interface of the ink IK based on the output of the photoelectric conversion device 322, and detects the amount of ink in the ink tank 310 based on the position of the mark MK and the position of the interface.

Figure 37:
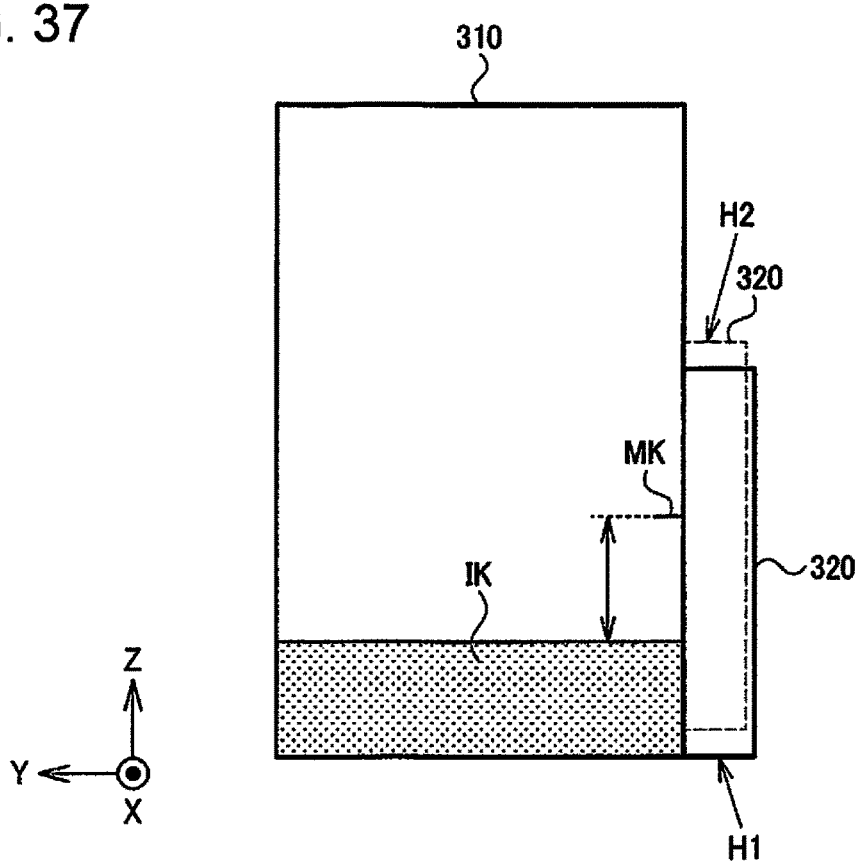
FIG. 37 is a diagram for explaining ink amount detection processing based on a mark.

FIG. 37 is a schematic diagram illustrating the relationship between the position of the mark MK and the assembly error of the photoelectric conversion device 322. For example, the photoelectric conversion device 322 is provided in the −Y direction of the ink tank 310, and the mark MK is attached to the side surface of the ink tank 310 in the −Y direction. Due to the assembly error, the sensor unit 320 may be fixed at the position indicated by H1, or may be fixed at the position indicated by H2. The position of the interface detected by the photoelectric conversion device 322 changes between H1 and H2. However, since the position of the mark MK detected by the photoelectric conversion device 322 is also changed, the difference between the position of the mark MK and the position of the interface is common between H1 and H2. Since the position of the mark MK in the ink tank 310 is known in design, the processing unit 120 can appropriately determine the position of the interface in the ink tank 310 even when the assembly error occurs. For example, if the distance from the bottom surface of the ink tank 310 to the mark MK is known, the processing unit 120 can calculate the distance from the bottom surface of the ink tank 310 to the interface based on the difference between the position of the mark MK and the position of the interface.

The mark MK is a member that is provided at a given position of the ink tank 310 in the Z-axis, and has a smaller light transmittance than the members constituting the ink tank 310. For example, the mark MK is a coating layer provided on the outer wall of the ink tank 310. Alternatively, when the ink tank 310 is formed by two-color molding, the mark MK is made of a member having relatively low light transmittance, and a portion other than the mark MK is made of a member having relatively high light transmittance. That is, the mark MK can be realized by the same configuration as the first layer to the third layer when the optical separator is provided on the side surface of the ink tank 310. In this way, the positional relationship between the photoelectric conversion device 322 and the mark MK can be estimated based on the output of the photoelectric conversion device 322.

Figure 38:
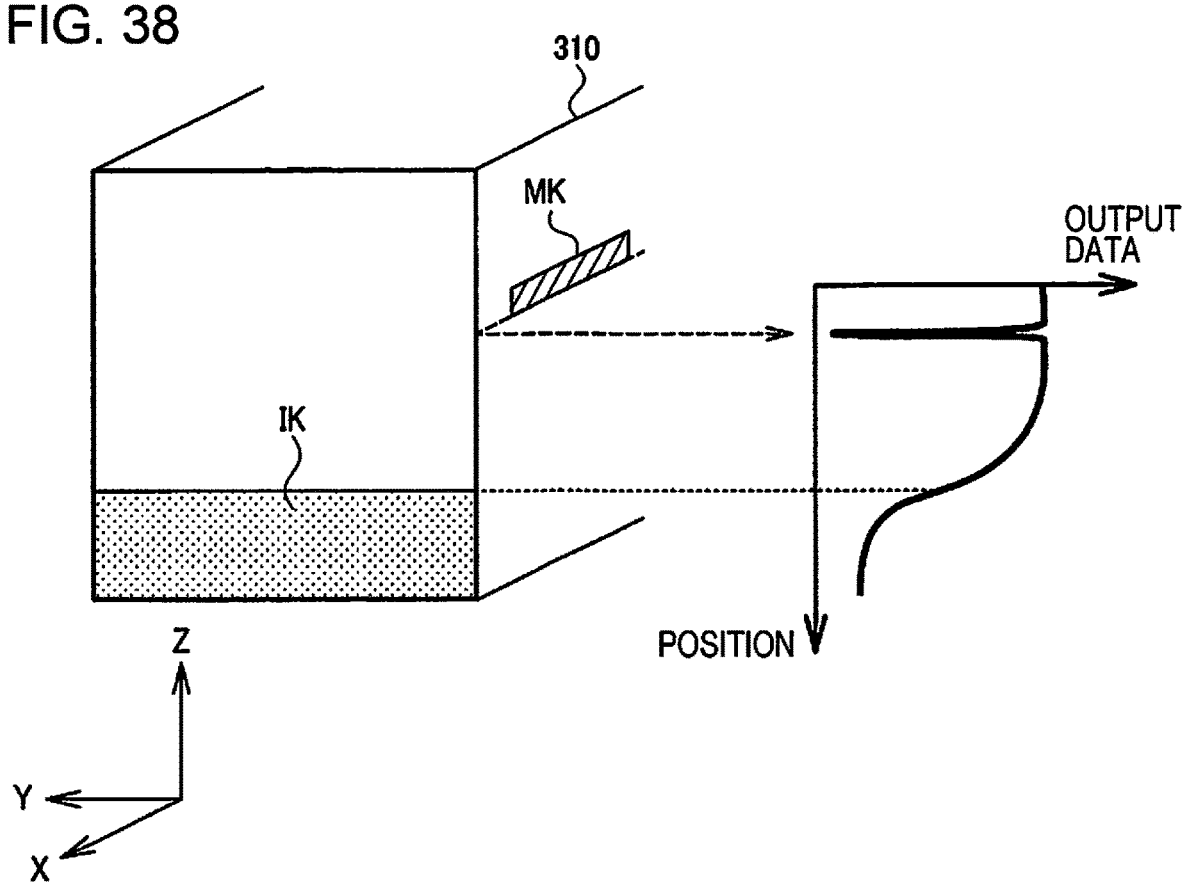
FIG. 38 is a schematic diagram illustrating an ink tank with a mark and output data.

FIG. 38 is a schematic diagram for explaining the relationship between the mark MK and the output data of the photoelectric conversion device 322. Since the light emitted from the area to which the mark MK is attached to the photoelectric conversion device 322 becomes very weak light, the output data corresponding to the position of the mark MK is made smaller than the peripheral output data to the extent to be identifiable. Thus, the position of the mark MK in the photoelectric conversion device 322 can be specified by making the optical characteristics of the mark MK different from those of the wall surface of the ink tank 310.

As described above, the processing unit 120 performs ink amount detection processing based on the relative position of the mark MK and the interface on the Z-axis. Therefore, the position of the mark MK on the Z-axis in the ink tank 310 needs to be a given fixed value. For example, the mark MK may be a point provided at a predetermined position on the side surface of the ink tank 310. The point is, for example, a minute circular shape having a size capable of suppressing light incident on a given photoelectric conversion element.

However, the positional relationship between the photoelectric conversion device 322 and the ink tank 310 on the X-axis may change due to the assembly error. When the length of the mark MK on the X-axis is short, there is a possibility that the positional relationship in which the mark MK and the photoelectric conversion device 322 do not face each other may be caused by the assembly error. Therefore, the mark MK is preferably a shape including a line in the horizontal direction.

For example, the mark MK is a line segment extending in the horizontal direction as illustrated in FIG. 38, specifically, is a rectangle with the Z-axis as the short side direction and the X-axis as the longitudinal direction. By using such a mark MK, it is possible to appropriately detect the mark MK by the photoelectric conversion device 322 even when the assembly error in the horizontal direction occurs. However, the mark MK may include a line in the horizontal direction at a portion of a boundary between the area of the mark MK and an area other than the mark MK, and the shape thereof is not limited to a rectangle. For example, the mark MK may be a triangle provided so that any one side thereof is horizontal. In this case, the processing unit 120 uses the position of the horizontal side of the mark MK for the ink amount detection processing. The concrete shape of the mark MK can be variously modified.

As illustrated in FIG. 38, the mark MK can be detected as a position where the output data is locally decreased. Therefore, the processing unit 120 may perform processing of determining the position of the mark MK based on the output of the photoelectric conversion device 322. For example, the processing unit 120 performs both the detection processing of the mark MK and the detection processing of the interface every time when performing the ink amount detection processing.

However, it is considered that, once the assembly is performed, the positional relationship between the ink tank 310 and the photoelectric conversion device 322 is not changed significantly thereafter. Therefore, the electronic apparatus 10 may include a non-volatile storage circuit for storing information representing the position of the mark MK. The processing unit 120 detects the ink amount by reading information indicating the position of the mark MK from the non-volatile storage circuit. In this case, since the information that has already been obtained can be used for the position of the mark MK, the processing unit 120 can detect the ink amount by detecting the interface of the ink IK from the output data. For example, the processing unit 120 obtains the mark MK in the first ink amount detection processing, and writes the obtained position of the mark MK in the storage unit 140. In the subsequent ink amount detection processing, the processing unit 120 continuously utilizes the position of the mark MK that has been written. Thus, the position of the mark can be identified even in a situation where the identification of the mark is difficult because the interface of the ink exists above the position of the mark.

Alternatively, the position of the mark MK may be written in the storage unit 140 at the manufacturing stage. For example, the production method of the printer according to the present embodiment includes a seventh step of storing a fourth correction parameter representing the position of the mark MK in a non-volatile storage unit of the printer based on the output of the photoelectric conversion device 322 in the first step. Here, in the first step, an example of acquiring the fourth correction parameter together with the first correction parameter which is a parameter of white correction is exemplified, but it is not limited thereto. For example, the production method of the printer may include an eighth step, which is different from the first step, of irradiating the ink tank 310 with light from the light source 323 and detecting light from the ink tank 310 using the photoelectric conversion device 322. In this case, the production method includes a seventh step of storing the fourth correction parameter representing the position of the mark MK in a non-volatile storage unit of the printer based on the output of the photoelectric conversion device 322 in the eighth step.

In the ink tank 310, a slit which is an optical separator for separating light in the vertical direction may be provided on the side surface. In this case, since the optical separator includes an area with low light transmittance, the optical characteristics difference between the area and the mark MK is small. Therefore, in this case, it is preferable that the length of the mark MK in the vertical direction is longer than the pitch of the slit.

Figure 39:
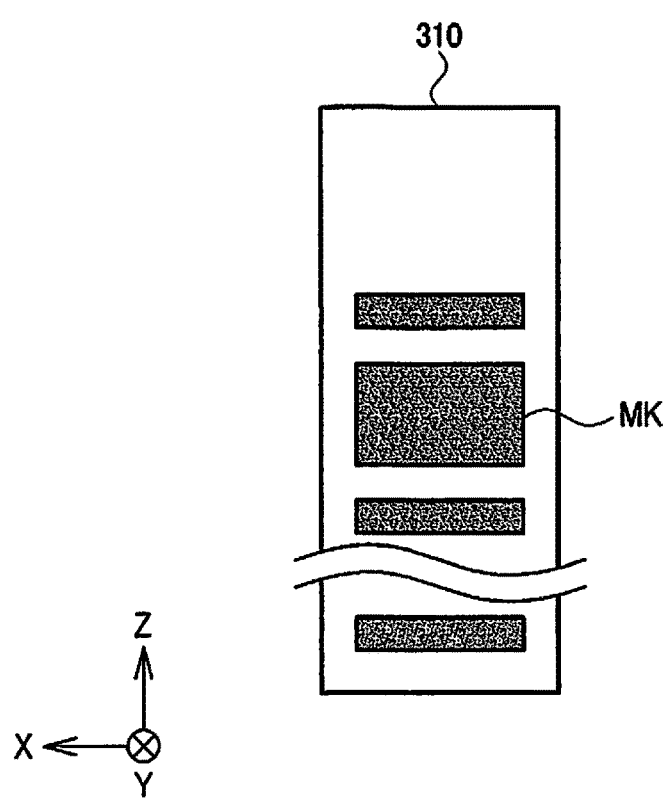
FIG. 39 is a diagram illustrating an example of a relationship between a slit and a mark provided on a side surface of an ink tank.

FIG. 39 is a schematic diagram illustrating the side surface of the ink tank 310 provided with both the optical separator and the mark MK. When the optical separator is provided, areas with a large amount of light reaching the photoelectric conversion device 322 from the ink tank 310 and areas with a small amount thereof appear alternately, in the Z-axis. As illustrated in FIG. 38, it is difficult to determine whether the reduction is caused by the optical separator or the mark MK, only by simply detecting the reduction of the output data. On the other hand, after changing the lengths of the optical separator and the mark MK, the processing unit 120 detects a range where the output data decreases. For example, in −Z direction, the processing unit 120 detects a point where the output data changes from a value larger than a given threshold to a value equal to or smaller than the threshold, and a point where the output data changes from a value equal to or smaller than the threshold to a value larger than the threshold, thereby obtaining the length between the two points.

In the example illustrated in FIG. 39, since the reduction range of the data caused by the mark MK is about three times as long as the reduction range of the data caused by the optical separator, the mark MK and the optical separator can be appropriately identified. As described above, the resolution in the ink amount detection processing is determined by the arrangement pitch of photoelectric conversion elements in the photoelectric conversion device 322 and the wider optical separation pitch of the optical separator. The pitch of the optical separator is preferably narrowed as much as possible, considering the resolution. Therefore, when a difference is provided between the lengths of the optical separator and the mark MK, it is easier to form the mark MK when the mark MK is made longer, and it is possible to suppress a decrease in resolution.

Figure 40:
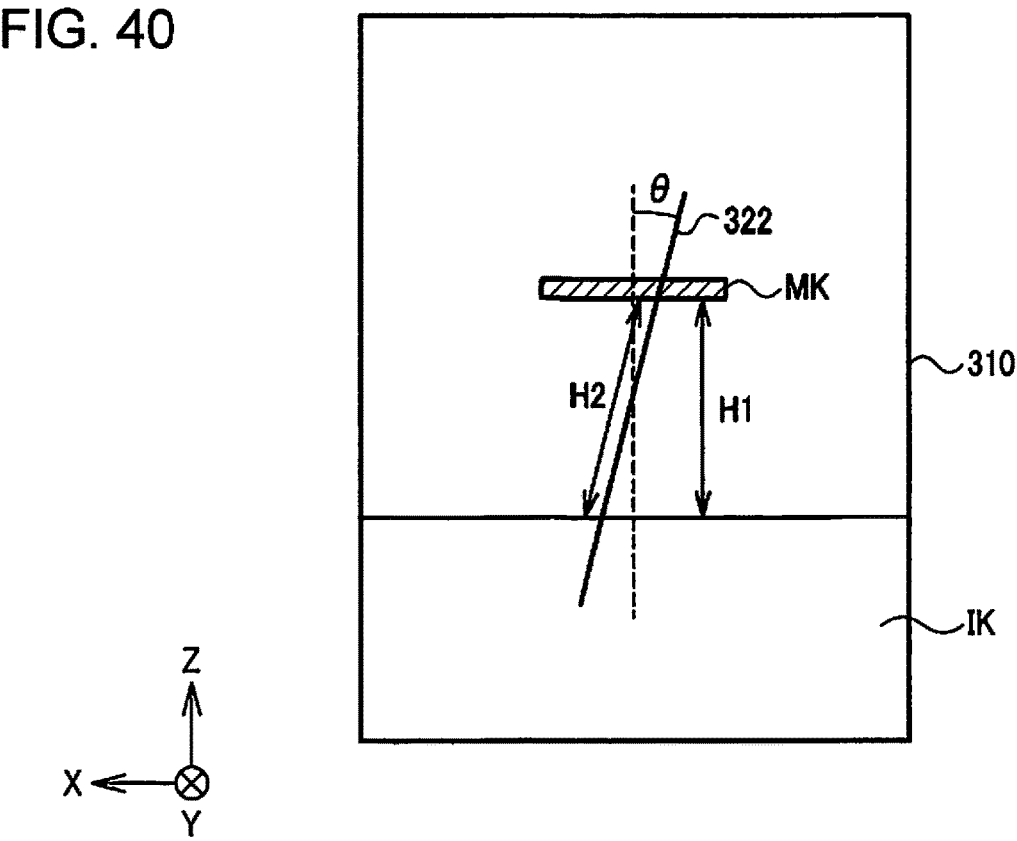
FIG. 40 is a schematic diagram when a photoelectric conversion device is inclined with respect to an ink tank.

Heretofore, an assembly error in the translation direction of the photoelectric conversion device 322 has been described. However, the assembly errors can occur in the rotational direction. FIG. 40 is a schematic diagram illustrating a relationship between the ink tank 310 and the photoelectric conversion device 322 when the photoelectric conversion device 322 rotates around the Y-axis by θ. As illustrated in FIG. 40, the distance between the mark MK and the interface on the Z-axis is H1. However, the processing unit 120 performs the ink amount detection processing on the assumption that the photoelectric conversion devices 322 are arranged along the Z-axis. Therefore, the processing unit 120 determines that the distance between the mark MK and the interface on the Z-axis is H2. By determining that the distance from the mark MK to the interface is excessively long, it is determined that the ink amount is smaller than the actual amount. Thus, the assembly error in the rotational direction also becomes a factor of lowering the accuracy of the ink amount detection processing.

The photoelectric conversion device 322 according to the present embodiment may include a first linear image sensor provided on the substrate 321 and a second linear image sensor provided on the substrate 321. The processing unit 120 estimates the inclination of the photoelectric conversion device 322 with respect to the ink tank 310 based on the position of the mark MK determined from the first linear image sensor and the position of the mark MK determined from the second linear image sensor.

Figure 41:
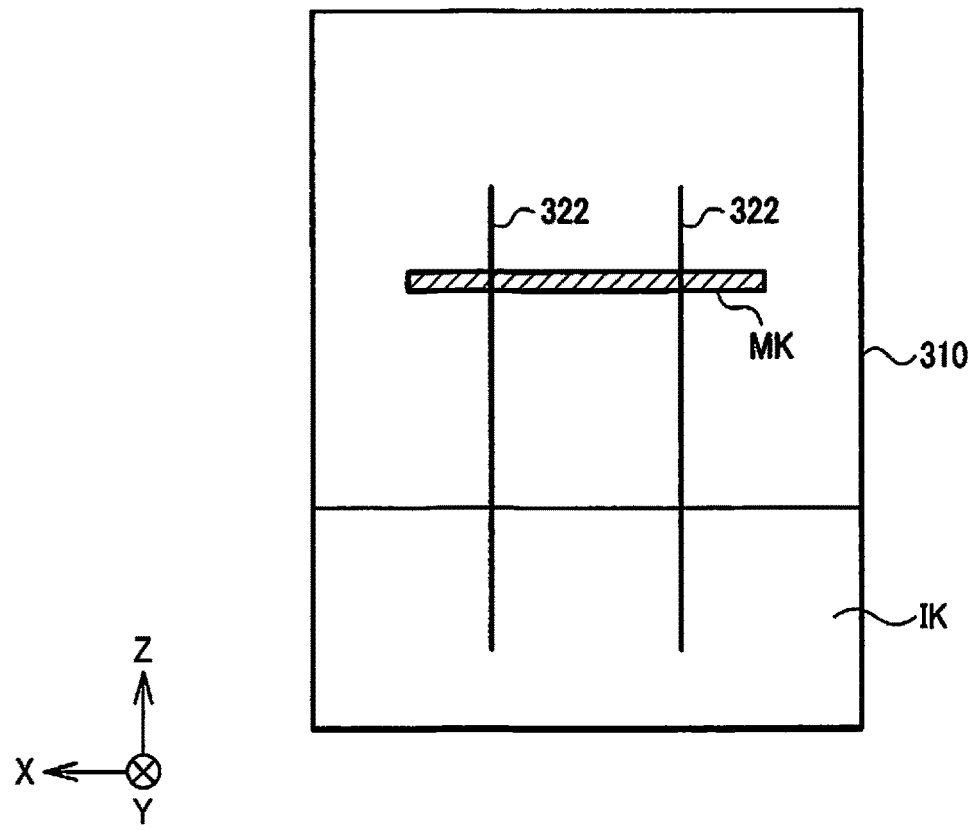
FIG. 41 is a schematic diagram when a plurality of photoelectric conversion devices are provided in a horizontal direction with respect to one ink tank.
Figure 42:
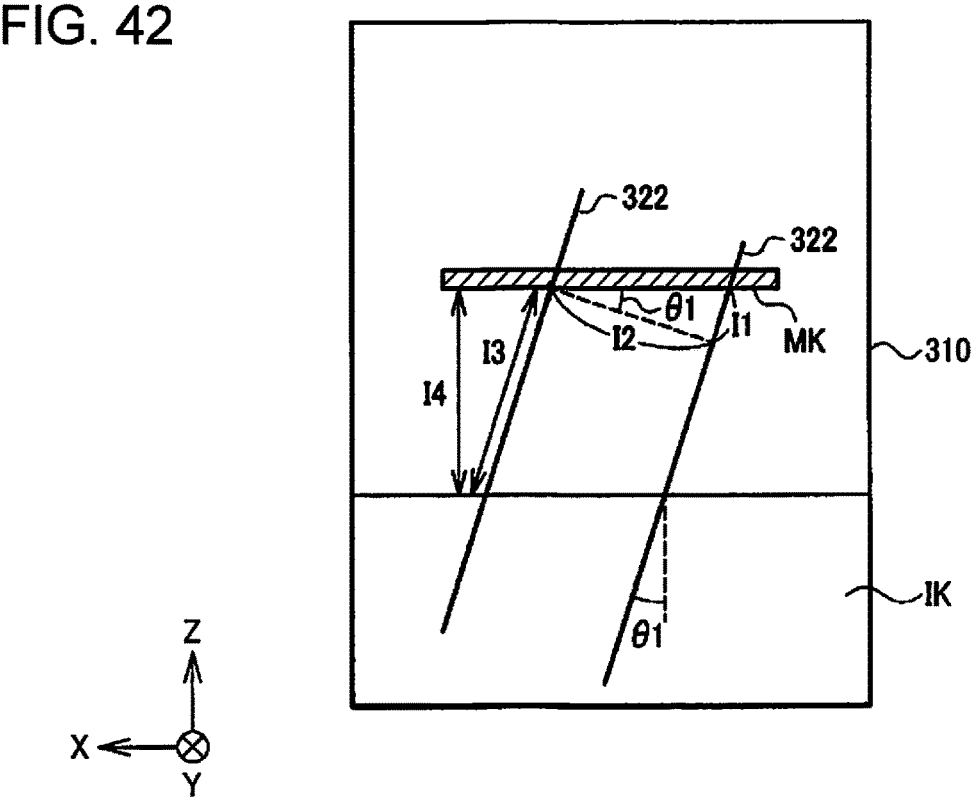
FIG. 42 is an explanatory diagram of a method for detecting an inclination of a photoelectric conversion device with respect to an ink tank.

FIGS. 41 and 42 are diagrams for explaining the positional relationship between the ink tank 310, the first linear image sensor, and the second linear image sensor. FIG. 41 illustrates a positional relationship in a state where no assembly error occurs. For example, the first linear image sensor and the second linear image sensor are sensor chips having the same length and the same element pitch. In the example illustrated in FIG. 41, when no assembly error occurs, the position of the mark MK in the first linear image sensor coincides with the position of the mark MK in the second linear image sensor. The position of the interface in the first linear image sensor coincides with the position of the interface in the second linear image sensor. The positional relationship between the first linear image sensor and the second linear image sensor may be known, and the length, the element pitch, the position in the Z-direction, or the like are not limited to examples in FIG. 41.

FIG. 42 illustrates the positional relationship when the photoelectric conversion device 322 rotates by θ1 with respect to the ink tank 310. The position of the mark MK in the second linear image sensor is shifted by l1 as compared with the position of the mark MK in the first linear image sensor. Since the distance l2 between the two linear image sensors is known, a rotation angle θ1 due to an assembly error is obtained by the following equation (2). When θ1 is obtained, the actual distance l4 between the mark MK and the interface is obtained by equation (3).

$$\theta 1 = \tan^{-1}\left(\frac{l1}{l2}\right) \quad (2)$$

$$l4 = l3 \times \cos\theta 1 \quad (3)$$

Thus, by using two linear image sensors for one ink tank 310, the inclination of the photoelectric conversion device 322 with respect to the ink tank 310 can be detected. Thus, even when the assembly error in the rotational direction occurs, the ink amount detection processing can be performed with high accuracy. The two linear image sensors need to be arranged not side by side in the longitudinal direction. More preferably, the second linear image sensor is disposed at a certain interval in a direction intersecting the longitudinal direction of the first linear image sensor. This is because even if the rotation angle θ1 is the same, the difference l1 between the detection positions of the two linear image sensors increases as the interval l2 increases. However, since the two linear image sensors need to detect the same ink tank 310, the interval cannot be excessively widened. Therefore, it is desirable to set an appropriate value for the interval between the two linear image sensors based on the shape of the ink tank 310 or the like.

The processing unit 120 may estimate an inclination φ of the ink tank 310 with respect to the horizontal plane based on the position of the interface determined from the first linear image sensor and the position of the interface determined from the second linear image sensor.

Figure 43:
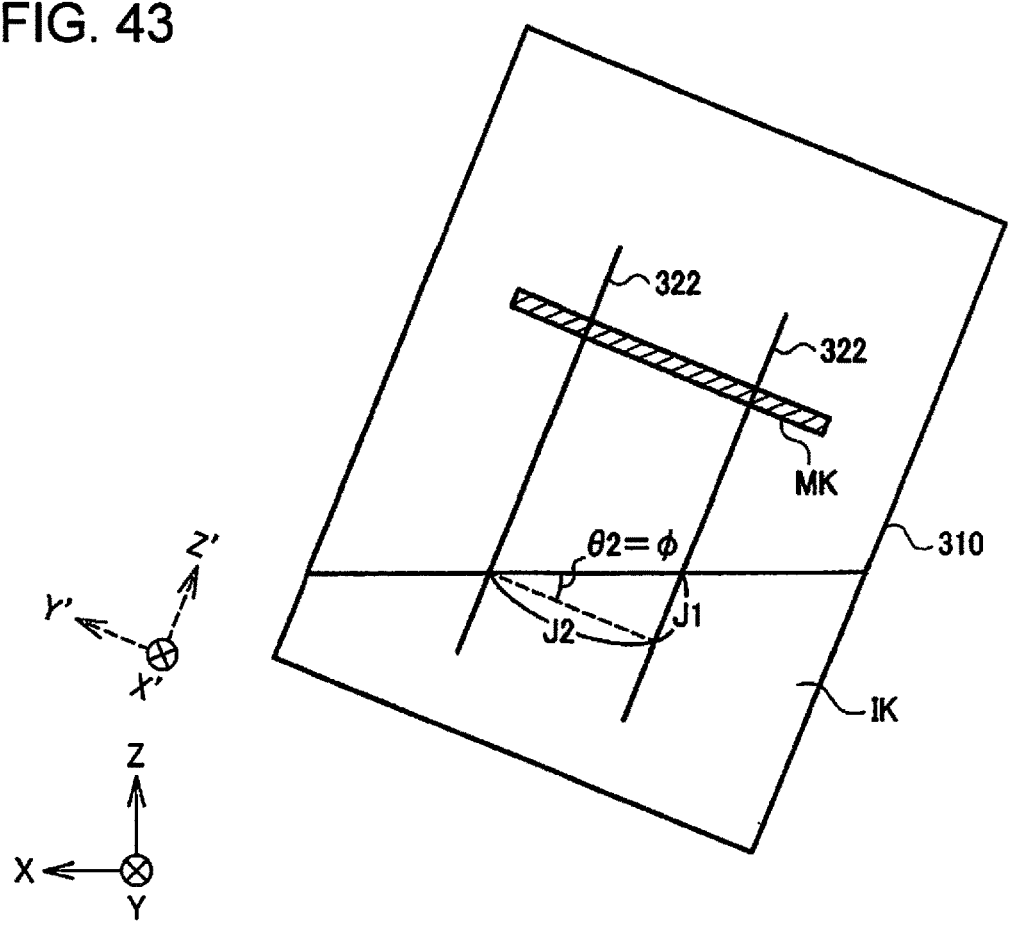
FIG. 43 is an explanatory diagram of a method for detecting an inclination of an ink tank with respect to a horizontal plane.

FIG. 43 is a schematic diagram when the ink tank 310 is inclined with respect to an XY plane which is the horizontal plane. FIG. 43 illustrates an example in which the photoelectric conversion device 322 is fixed at an appropriate angle with respect to the ink tank 310. As illustrated in FIG. 43, when the ink tank 310 is inclined with respect to the horizontal plane, the line representing the mark MK rotates in accordance with the rotation of the ink tank 310, but the ink interface coincides with the horizontal plane.

The position of the interface in the second linear image sensor is shifted by J1 as compared with the position of the interface in the first linear image sensor. Since the distance J2 between the two linear image sensors is known, the rotation angle θ2 of the photoelectric conversion device 322 with respect to the horizontal plane is obtained by the following equation (4). In FIG. 43, an example is considered in which the assembly error in the rotational direction of the ink tank 310 and the photoelectric conversion device 322 is not generated. Therefore, the inclination φ of the ink tank 310 with respect to the horizontal plane is equal to the rotation angle θ2 of the photoelectric conversion device 322 with respect to the horizontal plane.

$$\theta 2 = \tan^{-1}\left(\frac{J1}{J2}\right) \quad (4)$$

In the case of the state illustrated in FIG. 43, since the ink tank 310 itself is inclined, the ink amount cannot be specified only from the interface at one given point. In order to specify the ink amount, arithmetic processing using the position of the interface at the given point, the inclination angle φ of the ink tank 310, and the shape of the ink tank 310 is required. The processing unit 120 may determine the ink amount by performing such a calculation. Alternatively, when the inclination of the ink tank 310 is detected, the processing unit 120 may perform processing for notifying the user of the fact and skip the calculation of the ink amount.

The processing unit 120 may obtain both the inclination θ1 of the photoelectric conversion device 322 with respect to the ink tank 310 and the inclination φ of the ink tank 310 with respect to the horizontal plane. That is, the situation that the photoelectric conversion device 322 rotates by θ1 with respect to the ink tank 310, and the ink tank 310 inclines by φ with respect to the horizontal plane may be taken into consideration.

As illustrated in FIGS. 42 and 43, the inclination θ1 of the photoelectric conversion device 322 with respect to the ink tank 310 is obtained based on the difference in the positions of the marks MK in the two linear image sensors. Further, the inclination θ2 of the photoelectric conversion device 322 with respect to the horizontal plane is obtained based on the difference in the positions of the interfaces in the two linear image sensors. The inclination φ of the ink tank 310 with respect to the horizontal plane is obtained based on θ1 and θ2. For example, φ is a difference between θ1 and θ2. That is, even when both the inclination of the photoelectric conversion device 322 with respect to the ink tank 310 and the inclination of the ink tank 310 with respect to the horizontal plane are generated, the processing unit 120 can calculate each inclination based on two linear image sensors provided for the same ink tank 310.

4. Determination Processing of Ink Characteristics Based on Output of Photoelectric Conversion Device The electronic apparatus 10 according to the present embodiment is a printer including the ink tank 310, the print head 107, the light source 323, the photoelectric conversion device 322, and the processing unit 120. The processing unit 120 determines the ink characteristics in the ink tank 310 based on the characteristics of the light amount detected by the photoelectric conversion device 322.

As described above with reference to FIGS. 2 and 3, the electronic apparatus 10 may include a plurality of ink tanks 310 filled with different kinds of ink IK. In this case, there is a possibility that the user erroneously fills the other ink tank 310 such as the ink tank 310b with the ink IKa to be filled in the ink tank 310a. Even if the electronic apparatus 10 is a monochrome printer having one ink tank 310, if the user uses printers of different models together, there is a possibility that the ink IK used for another printer is erroneously filled. Furthermore, even when the user uses only one monochrome printer, since many different inks are distributed in the market depending on the model, the possibility that the user erroneously purchases and fills ink for the different model cannot be denied.

For example, when the ink tank 310 to be filled with yellow ink is filled with magenta ink, the color of the printing result largely deviates from the desired color. That is, in order to perform appropriate printing, it is necessary to appropriately detect the error of the color of the ink. Therefore, the processing unit 120 determines the color characteristics of the ink as the ink characteristics.

FIG. 44 is a diagram comparing output data of the photoelectric conversion device 322 for two inks IK having different color characteristics. K1 in FIG. 44 is an example of output data of the photoelectric conversion device 322 when measurement is performed for the ink tank 310 filled with yellow ink. K2 is an example of output data of the photoelectric conversion device 322 when measurement is performed for the ink tank 310 filled with magenta ink. The horizontal axes of K1 and K2 represent positions in the photoelectric conversion device 322, and the vertical axes represent output data corresponding to the positions. In FIG. 44, the position of ink interface is made common to K1 and K2. However, as will be described later, the output data in the ink boundary area or the ink detection area may be acquired in the ink characteristics determination processing, and the position of the ink interface is optional.

FIG. 44 illustrates the result of performing the correction processing indicated by the above equation (1) with the first correction parameter as the white reference parameter and the third correction parameter as the black reference parameter. The third correction parameter is a parameter acquired in a state where the ink IK is not filled. Therefore, as illustrated in FIG. 44, data in the ink detection area does not become a value close to 0, but becomes a different value depending on the color characteristics of the target ink IK.

In the example illustrated in FIG. 44, when yellow ink is the target, the signal value in the ink amount detection area is a value around 0.55 when any of RGB illumination light is used. On the other hand, when the magenta ink is the target, the signal value in the ink amount detection area is a value around 0.40 when any of RGB illumination light is used.

The processing unit 120 determines the ink characteristics based on the light amount in the ink detection area which is an area where it is determined that ink IK exists in the ink tank. In other words, the processing unit 120 uses the value of the output data in the ink detection area as a feature amount for determining the ink characteristics. As described above, the magnitude of the light amount is detected as the magnitude of the output data based on the photoelectric conversion device 322.

The processing unit 120 first specifies an ink detection area. For example, the processing unit 120 specifies an area where the inclination is an inclination threshold or less and the data value is smaller than 1 by a predetermined amount or more as the ink detection area. The processing unit 120 obtains the minimum value of data in the ink detection area as the ink characteristics determination feature amount. In the example illustrated in FIG. 44, the processing unit 120 may use any of RGB data to obtain the minimum value. Alternatively, composite data obtained by combining two or more pieces of data among RGB may be obtained, and the minimum value in the ink detection area of the composite data may be obtained. The composite data is average data obtained by averaging RGB data at each point, for example.

In the example illustrated in FIG. 44, the processing unit 120 determines that the ink IK is yellow ink when the obtained minimum value is close to 0.55, and that the ink IK is magenta ink when it is close to 0.40. Although an example using the minimum value is exemplified here, other statistical values such as the average value and the median value of the output data in the ink detection area may be used.

As described above, in the ink characteristics determination processing, it is important to determine whether a given ink tank 310 is filled with an erroneous ink IK. Therefore, the processing unit 120 determines whether the ink IK other than the yellow ink is filled in the yellow ink tank 310, and does not need to specify a specific color of the ink IK. For example, when the ink tank 310 for yellow ink is targeted, the processing unit 120 compares the output data in the ink detection area with 0.40 as a reference value of yellow ink, and determines abnormality when the difference is equal to or more than a given threshold. Similarly, when the ink tank 310 for magenta ink is targeted, the processing unit 120 compares the output data in the ink detection area with 0.55 as a reference value of magenta ink, and determines abnormality when the difference is equal to or more than a given threshold.

The processing unit 120 may also determine the ink characteristics based on the change characteristics of the light amount in the ink boundary area which is the boundary area between the area determined to have the ink IK in the ink tank and the area determined to have no ink. In other words, the processing unit 120 uses the change in the output data in the ink boundary area as the ink characteristics determination feature amount.

For example, the processing unit 120 obtains the maximum value of the inclination of the output data, and detects, as a boundary area, an area where the maximum value of the inclination is larger than the inclination threshold. The processing unit 120 obtains the maximum value of inclination in the boundary area as an ink characteristics determination feature amount. In the example illustrated in FIG. 44, the maximum value of inclination of yellow ink is relatively small, and the maximum value of inclination of magenta ink is large. Thus, the processing unit 120 can identify yellow ink and magenta ink by determining the maximum value of the inclination. Here, an example in which the maximum value of the inclination is used has been exemplified, but other statistical values such as an average value or a median value may be used. When using the inclination, the processing unit 120 may perform processing of specifying the color of ink IK, or may determine normality/abnormality.

In FIG. 44, the example in which the third correction parameter is used as the black reference parameter has been described. Thus, the reference value used for the ink characteristics determination processing is different according to ink IK, such as the reference value of the yellow ink is about 0.55 and the reference value of the magenta ink is about 0.40. However, the parameter of the black reference may be a second correction parameter.

For example, in the case of the photoelectric conversion device 322 corrected by the second correction parameter acquired in the state where the yellow ink is filled, the reference value of the yellow ink becomes a value close to zero. In the case of the photoelectric conversion device 322 corrected by the second correction parameter acquired in the state where magenta ink is filled, the reference value of the magenta ink becomes a value close to zero. In this case, the relationship in which the output data in the ink detection area when the appropriate ink IK is filled is close to 0, and the output data in the ink detection area when the different ink IK is filled deviates from 0 is established.

For example, when magenta ink is erroneously filled in the ink tank 310 corresponding to the photoelectric conversion device 322 corrected by using yellow ink, the output data in the ink detection area becomes a negative value which is small enough to be identified as compared with 0. When yellow ink is erroneously filled in the ink tank 310 corresponding to the photoelectric conversion device 322 corrected by using magenta ink, the output data in the ink detection area becomes a value which is large enough to be identified as compared with 0. Thus, even when correction processing using the second correction parameter is performed, ink characteristics determination processing can be appropriately executed. Since the reference value becomes a value close to zero, the numerical range of the output data may be expanded as necessary so that a negative value can be taken. Similarly, after performing the correction processing using the second correction parameter, the ink characteristics determination processing can be performed using the inclination in the ink boundary area.

The ink characteristics determined in the ink characteristics determination processing are not limited to color characteristics. For example, as described above with reference to FIG. 2, pigment ink and dye ink exist as the same black ink. The pigment ink has high color reproducibility and quick drying property. The dye ink has a vivid color and is easy to obtain a glossy feeling. Therefore, it is desirable to properly use inks of the same color according to the characteristics. In the printer, ink characteristics suitable for the printer are different according to various factors such as a physical structure of the print head 107, an ink ejecting method, a printing speed, and a printing medium expected to be used. For this reason, there may be a case where suitable inks IK are different depending on the model even for pigment inks of the same color. Therefore, the processing unit 120 determines the color material characteristics of the ink as the ink characteristics. The color material represents a raw material of color and specifically represents a pigment or a dye. However, as organic pigments and inorganic pigments are known as pigments, the color materials here may represent more specific types and differences in properties.

FIG. 45 is a diagram comparing output data of the photoelectric conversion devices 322 for two inks IK having different color material characteristics. L1 in FIG. 45 is an example of output data of the photoelectric conversion device 322 in the case of measuring the ink tank 310 filled with magenta dye ink. L2 is an example of output data of the photoelectric conversion device 322 in the case of measuring the ink tank 310 filled with magenta pigment ink. The horizontal axes of L1 and L2 represent positions in the photoelectric conversion device 322, and the vertical axes represent output data corresponding to the positions. Similarly to FIG. 44, FIG. 45 illustrates the result of performing the correction processing indicated by the above equation (1) using the first correction parameter as the white reference parameter and the third correction parameter as the black reference parameter.

As illustrated in FIG. 45, output data of the photoelectric conversion device 322 based on light emission of the red LED 323R is greatly different between magenta dye ink and magenta pigment ink. Therefore, the processing unit 120 determines the ink characteristics based on the light amount in the ink detection area or the change characteristics of the light amount in the ink boundary area. Specifically, the processing unit 120 determines that the ink is the dye ink when the R data in the ink detection area is small, and determines that the ink is the pigment ink when the data is large. Alternatively, the processing unit 120 determines that the ink is the dye ink when the inclination of the R data in the ink boundary area is large, and determines that the ink is the pigment ink when the data is small.

Alternatively, when the photoelectric conversion device 322 detects light of the first wavelength and light of the second wavelength, the processing unit 120 may determine the ink characteristics based on the first characteristics of the light amount of light of the first wavelength and the second characteristics of the light amount of light of the second wavelength. In other words, the processing unit 120 uses information representing the relationship between the first characteristics and the second characteristics as the ink characteristics determination feature amount. As described above, the configuration in which the photoelectric conversion device 322 detects light having a plurality of different wavelengths may be realized by a plurality of light sources 323 having different wavelength bands of irradiation light, or realized by a combination of a light source having a wide wavelength band and a filter.

In the example illustrated in FIG. 45, for the magenta dye ink, RGB data has the same characteristics in both the ink boundary area and the ink detection area. On the other hand, in the magenta pigment ink, the R data is larger than the G data and B data in the ink detection area. In the magenta pigment ink, the inclination of the R data is smaller than the inclination of the G data and B data in the ink boundary area. Therefore, the processing unit 120 determines that the ink is the magenta dye ink when a first characteristics related to red light and a second characteristics related to blue light or green light are similar, and determines that the ink is the magenta pigment ink when the first characteristics and second characteristics are not similar.

Specifically, the processing unit 120 obtains a ratio of the R data value to the B data value or the G data value in the ink detection area, as the ink characteristics determination feature amount. The processing unit 120 determines that the ink is the magenta dye ink when the determined ratio is close to 1, and determines that the ink is the magenta pigment ink when the difference from 1 is large. Alternatively, the processing unit 120 determines the ratio of the inclination of the R data to the inclination of the B data or the inclination of the G data in the ink boundary area. The processing unit 120 determines that the ink is the magenta dye ink when the determined ratio is close to 1, and determines that the ink is the magenta pigment ink when the difference from 1 is large.

The determination of the color characteristics and the determination of the color material characteristics have been described above respectively. However, the processing unit 120 of the present embodiment may perform the ink characteristics determination processing of determining both the color characteristics and the color material characteristics.

In the above, the example in which the determination based on the first characteristics relating to light of the first wavelength and the second characteristics relating to light of the second wavelength is used for the determination of the color material characteristics has been described. However, depending on the ink characteristics, determination based on the first characteristics and the second characteristics may be used for determination of color characteristics. In other words, the processing unit 120 can optionally select which one of the three ink characteristics determination feature amounts is used for each of the determination of the color characteristics and the determination of the color material characteristics.

In addition, the ink characteristics determination processing and the ink amount detection processing are not limited to those executed exclusively. The processing unit 120 detects the amount of ink in the ink tank based on the change in the light amount in the vertical direction detected by the photoelectric conversion device 322. That is, both of ink amount detection processing and ink characteristics determination processing may be performed based on the output from the photoelectric conversion device 322.

In the above, reference data representing the characteristics of the ink IK is known, and the method for determining the ink characteristics based on the comparison processing between the ink characteristics determination feature amount obtained from the output data of the photoelectric conversion device 322 and the given reference value in the processing unit 120 has been described. As illustrated with reference to FIGS. 44 and 45, the reference value here is a value of output data in the ink detection area, the inclination of the output data in the ink boundary area, the relationship between the plurality of characteristics corresponding to light of the plurality of wavelengths, or the like, which is obtained in advance for the ink IK to be determined.

However, the ink characteristics determination processing of the present embodiment is not limited to this. Specifically, the photoelectric conversion device 322 performs light detection at a first timing and light detection at a second timing different from the first timing. The processing unit 120 determines the ink characteristics based on the characteristics of the light amount detected at the first timing and the characteristics of the light amount detected at the second timing.

As described above, characteristics of the output data of the photoelectric conversion device 322 are different depending on the color characteristics and the color material characteristics of the ink IK. For this reason, it is estimated that the ink IK has changed between the two timings when the output data detected at the second timing changes significantly with respect to the output data detected at the first timing. The change of the output data here represents the change of the ink characteristics determination feature amount, and the change in the position of the interface is not included in the change of the output data.

Specifically, when the ink characteristics determination processing at the second timing is performed after the user filled the wrong ink IK in the ink tank 310 that has been filled with the appropriate ink IK at the first timing, the ink characteristics determination feature amount obtained from the output data changes greatly. Normally, the same ink tank 310 is continuously filled with ink IK having the same characteristics. That is, in the processing for a given ink tank 310, it is not assumed that the ink characteristics determination feature amount will change significantly. Therefore, when such a change is detected, the processing unit 120 determines that it is abnormal. For example, the processing unit 120 performs processing of notifying the user that the wrong ink IK is filled by using a display unit 150 or the like.

The execution trigger for the ink characteristics determination processing of the present embodiment is optional. For example, the execution of printing processing may be used as the trigger similarly to the ink amount detection processing. However, as can be seen from the above-described example, it is considered that the situation where the inappropriate ink IK is filled occurs when the user performs the replenishment operation incorrectly. Therefore, the processing unit 120 may execute the ink characteristics determination processing using the determination that the user has replenished the ink IK as a trigger. For example, when it is determined that the ink amount is increased by a predetermined amount or more in the ink amount detection processing, the ink characteristics determination processing is started.

5. Electronic Apparatus as Multifunction Peripheral

Figure 46:
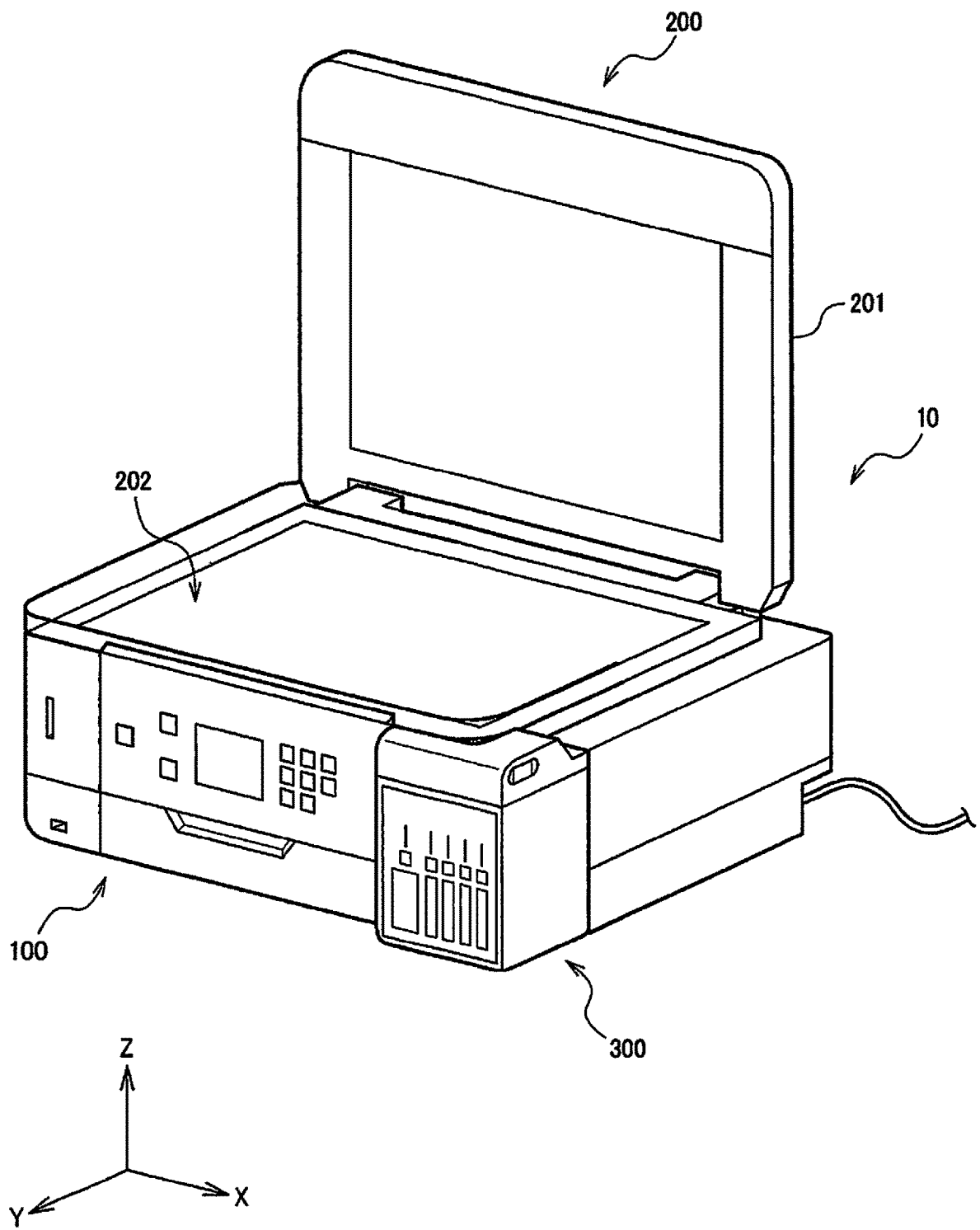
FIG. 46 is a perspective diagram of an electronic apparatus when a scanner unit is used.

The electronic apparatus 10 according to the present embodiment may be a multifunction peripheral having a printing function and a scanning function. FIG. 46 is a perspective diagram illustrating a state in which the case 201 of the scanner unit 200 is pivoted with respect to the printer unit 100 in the electronic apparatus 10 of FIG. 1. In the state illustrated in FIG. 46, a document table 202 is exposed. The user sets a document to be read on the document table 202, and then instructs the execution of scanning by using the operation unit 160. The scanner unit 200 reads an image of the document by performing the reading processing while moving the image reading unit (not illustrated) based on an instruction operation by the user. The scanner unit 200 is not limited to a flat bed type scanner. For example, the scanner unit 200 may be a scanner having an auto document feeder (ADF) (not illustrated). The electronic apparatus 10 may be an apparatus having both the flat bed type scanner and a scanner having the ADF.

The electronic apparatus 10 includes the image reading unit including a first sensor module, the ink tank 310, the print head 107, the second sensor module, and the processing unit 120. The image reading unit reads the document by using a first sensor module including m, m being an integer of two or more, linear image sensor chips. The second sensor module includes n, n being an integer of 1 or more and n<m, linear image sensor chips, and detects light incident from the ink tank 310. The processing unit 120 detects the amount of ink in the ink tank based on the output of the second sensor module. The first sensor module is a sensor module used for scanning an image in the scanner unit 200, and the second sensor module is a sensor module used for the ink amount detection processing in the ink tank unit 300.

Both the first sensor module and the second sensor module include a linear image sensor chip. The specific configuration of the linear image sensor chip is the same as that of the photoelectric conversion device 322 described above, and a plurality of photoelectric conversion elements are arranged side by side in a predetermined direction. Since the linear image sensor used for the image reading and the linear image sensor used for the ink amount detection processing can be used in common, it is possible to improve the manufacturing efficiency of the electronic apparatus 10.

However, the first sensor module needs to have a length corresponding to the document size to be read. Since the length of one linear image sensor chip is about 10 mm, for example, the first sensor module needs to include at least two linear image sensor chips. On the other hand, the second sensor module has a length corresponding to the target range of ink amount detection. The target range of ink amount detection can be variously modified but is generally shorter than that of the image reading. That is, as described above, m is an integer of 2 or more, n is an integer of 1 or more, and m>n. Thus, the number of linear image sensor chips can be appropriately set according to the application.

The difference between the first sensor module and the second sensor module is not limited to the number of linear image sensor chips. The m linear image sensor chips of the first sensor module are provided such that the longitudinal direction thereof corresponds to the horizontal direction. The n linear image sensor chips of the second sensor module are provided such that the longitudinal direction thereof corresponds to the vertical direction. Since the second sensor module needs to detect the interface of the ink IK as described above, the longitudinal direction corresponds to the vertical direction.

On the other hand, in consideration of reading the image of the document, the longitudinal direction of the first sensor module needs to be the horizontal direction. This is because when the longitudinal direction of the first sensor module is set to the vertical direction, it is difficult to stably set the document on the document table 202, or it is difficult to stabilize the document posture when the document is transported by the ADF. By setting the longitudinal direction of the linear image sensor chip in accordance with the application, the ink amount detection processing and the image reading can be performed appropriately.

The image reading unit may include a third sensor module having k, k being an integer of k>n, linear image sensor chips. The electronic apparatus 10 includes, as operation modes, a first mode for reading a document on the document table using the first sensor module and a second mode for reading the document while transporting the document using the third sensor module. In this way, it is possible to realize the electronic apparatus 10 having both the flat bed type scanner and the scanner having the feeder. At this time, it is possible to make the manufacturing of the electronic apparatus 10 more efficient by configuring both sensor modules of the two scanners with linear image sensor chips. Since the third sensor module is also used for image reading similarly to the first sensor module, the number of linear image sensor chips is larger than that of the second sensor module.

Alternatively, the image reading unit may use the first sensor module for reading by the ADF. Further, a fourth sensor module having a charge-coupled device (CCD) image sensor chip may be included. The linear image sensor chip included in the first sensor module and the linear image sensor chip included in the second sensor module are metal-oxide-semiconductor (MOS) image sensor chips. In this case, the electronic apparatus 10 includes, as operation modes, the first mode for reading the document on the document table by using the fourth sensor module and the second mode for reading the document while transporting the document by using the first sensor module.

Even in this case, it is possible to realize the electronic apparatus 10 having both the flat bed type scanner and the scanner having the feeder. At this time, the fourth sensor module for the first mode is a CCD system, so that an image with deep depth of field can be read. That is, as the fourth sensor module, the sensor module suitable for a method for reading the document on the document table can be used.

The first sensor module and the second sensor module have different configurations of optical separators. For example, the first sensor module has a first optical separator which is a lens module. On the other hand, in the ink tank 310, a second optical separator for separating light incident on the second sensor module in the vertical direction is provided on the side surface. That is, the optical separator for the second sensor module may be a separator of a simple configuration provided on the wall surface of the ink tank 310 as described above with reference to FIGS. 18 to 21. In this way, it is possible to provide an appropriate optical separator according to the accuracy required for each sensor module.

Alternatively, the first sensor module may have the first optical separator as a lens module, and the second sensor module may have the second optical separator as a slit. The slit here is, for example, a resin slit 330 illustrated in FIG. 17. Even in this case, it is possible to provide an appropriate optical separator according to the accuracy required for each sensor module.

The first sensor module operates at a first operating frequency, and the second sensor module operates at a second operating frequency lower than the first operating frequency. In image reading, it is necessary to continuously acquire signals corresponding to many pixels and to form image data by performing A/D conversion processing, correction processing, or the like of the signals. Therefore, it is desirable to perform reading by the first sensor module at high speed. On the other hand, the ink amount detection is less likely to be a problem even when the number of photoelectric conversion elements is small and it takes a certain amount of time to detect the ink amount. By setting the operating frequency for each sensor module, each sensor module can be operated at an appropriate speed.

The position of the light source may be changed between the first sensor module and the second sensor module. For example, the first sensor module has a light source provided in a direction along the longitudinal direction of the m linear image sensor chips, and the second sensor module has a light source provided in a direction intersecting the longitudinal direction of the n linear image sensor chips. As described above, the length of the second sensor module in the longitudinal direction is shorter than that of the first sensor module, and the reading accuracy is not required as compared with the first sensor module. Therefore, as illustrated in FIGS. 23 and 24, the light source 323 and the photoelectric conversion device 322 can be arranged side by side in the direction along the X-axis. That is, an appropriate light source arrangement can be used according to the accuracy required for each sensor module.

The first sensor module includes a light guide and a light source provided at the end of the light guide. As illustrated in FIGS. 10 to 12, light from the light source corresponding to the first sensor module enters the light guide at an angle at which total reflection is likely to occur. Since the entire light guide can be uniformly illuminated, reading accuracy by the first sensor module can be enhanced. The second sensor module may include a light guide 324 as illustrated in FIGS. 23 and 24, or the light guide 324 may be omitted.

As described above, the printer according to the present embodiment includes an ink tank, a print head, a substrate, a light source, a photoelectric conversion device, and a processing unit. The print head performs printing by using ink in the ink tank. The light source is provided at the substrate and irradiates the ink tank with light from the side of the ink tank. The photoelectric conversion device is provided at the substrate and detects light incident from the ink tank in a period during which the light source emits light. The processing unit detects the amount of ink in the ink tank based on the output of the photoelectric conversion device.

In the printer according to the present embodiment, processing of detecting the amount of ink in the ink tank is performed based on the light source and the photoelectric conversion device mounted on the same substrate. Thus, the manufacture of the unit including the light source and the photoelectric conversion device and the arrangement in the electronic apparatus are facilitated, and the ink amount can be detected appropriately by using the efficient configuration.

Further, the photoelectric conversion device may be a linear image sensor.

In this way, the ink amount can be accurately detected by detecting the ink amount by using a plurality of photoelectric conversion elements arranged in a predetermined direction.

Further, a longitudinal direction of the linear image sensor may correspond to the vertical direction.

In this way, the ink amount can be accurately detected by detecting the ink amount by using a plurality of photoelectric conversion elements arranged in the vertical direction.

Further, the printer may also include a second linear image sensor provided on the longitudinal direction side of the linear image sensor.

In this way, by using a plurality of linear image sensors arranged in the vertical direction, the range to be the target of ink amount detection can be expanded.

Further, the printer may also include a light shielding wall provided between the light source and the photoelectric conversion device.

In this way, since direct light from the light source is prevented from entering the photoelectric conversion device, the accuracy of ink amount detection can be improved.

Further, the light source may be disposed in a first direction which is the horizontal direction, with respect to the photoelectric conversion device. The first direction here is, for example, a direction along the X-axis.

In this way, the positional relationship between the light source and the photoelectric conversion device can be set flexibly.

Further, at least a portion, facing the photoelectric conversion device, of the inner wall of the ink tank may have higher ink repellency than the outer wall of the ink tank.

In this way, the decrease in accuracy of ink amount detection caused by ink droplets adhering to the inner wall of the ink tank can be suppressed.

Further, the printer may also include a second substrate provided with a processing unit and an analog front end (AFE). The AFE performs A/D conversion of the analog signal from the photoelectric conversion device.

In this way, it is possible to provide a substrate for the processing unit and the AFE separately from the substrate on which the light source and the photoelectric conversion device are mounted.

Further, the printer may include a second substrate at which the processing unit is provided, and the processing unit may output a control signal for controlling the photoelectric conversion device.

In this way, the photoelectric conversion device can be controlled by using the processing unit, and the substrate for the processing unit can be provided separately from the substrate on which the light source and the photoelectric conversion device are mounted.

Further, the ink tank includes a filling port into which ink is filled by the user, and a discharging port for discharging ink toward the print head. The substrate is closer to the discharging port than to the filling port.

In this way, the photoelectric conversion device can be provided at a position relatively close to the discharging port. Therefore, it is possible to detect the ink amount for an appropriate region in the ink tank.

Further, the printer includes a window portion for visually recognizing ink in the ink tank. The window portion is closer to the filling port than to the discharging port.

In this way, the direction in which the photoelectric conversion device is provided and the direction in which the window portion is provided can be separated with respect to the ink tank. Thus, when the user visually recognizes the ink amount through the window portion, the obstruction of the visual recognition by the photoelectric conversion device can be suppressed.

Although the present embodiment has been described in detail as described above, a person skilled in the art can easily understand that many modifications that do not substantially depart from the novel matters and effects of the present embodiment are possible. Accordingly, all such modifications are intended to be included within the scope of the present disclosure. For example, a term described at least once together with a different term having a broader meaning or the same meaning in the specification or the drawings can be replaced with the different term anywhere in the specification or the drawings. All combinations of the present embodiment and the modifications are also included in the scope of the present disclosure. The configurations and operations of the electronic apparatus, printer unit, scanner unit, ink tank unit, and the like are not limited to those described in the present embodiment, and various modifications can be made.

For example, in the photoelectric conversion device, the linear image sensors may be arranged in the horizontal direction or obliquely from the horizontal direction. In this case, by arranging a plurality of linear image sensors in the vertical direction or moving them in the vertical direction relative to the ink tank, the same information as when the linear image sensors are arranged in the vertical direction can be obtained. The photoelectric conversion device may be one or more area image sensors. In this way, one image sensor may be straddled across a plurality of ink tanks. In addition, the photoelectric conversion device may obtain information from all ink tanks by using one linear image sensor by disposing one linear image sensor in the vertical direction and relatively moving the substrate having the photoelectric conversion device and the light source and the ink tank in the direction in which the ink tanks are arranged. Of course, the light source in this case may be provided separately from the substrate provided with the photoelectric conversion device, and the light source may not be relatively moved.

What is claimed is:

1. A printer comprising:
   an ink tank;
   a print head performing printing by using ink in the ink tank;
   a substrate;
   a light source provided on the substrate and irradiating the ink tank with light from a side of the ink tank;
   a photoelectric conversion device provided on the substrate and detecting light incident from the ink tank in a period during which the light source emits light;
   a light shielding wall provided on the substrate between the light source and the photoelectric conversion device; and
   a processing unit detecting an amount of ink in the ink tank based on an output of the photoelectric conversion device.

2. The printer according to claim 1, wherein the photoelectric conversion device is a linear image sensor.

3. The printer according to claim 2, wherein the linear image sensor is provided such that a longitudinal direction of the image sensor corresponds to a vertical direction.

4. The printer according to claim 2, further comprising:
   a second linear image sensor provided on a longitudinal direction side of the linear image sensor.

5. The printer according to claim 1, wherein the light source is disposed in a first direction which is a horizontal direction with respect to the photoelectric conversion device.

6. The printer according to claim 1, wherein at least a portion, facing the photoelectric conversion device, of an inner wall of the ink tank has higher ink repellency than an outer wall of the ink tank.

7. The printer according to claim 1, further comprising:
   a second substrate provided with the processing unit and an analog front end (AFE), wherein
   the AFE performs analog-to-digital conversion of an analog signal from the photoelectric conversion device.

8. The printer according to claim 1, further comprising:
   a second substrate provided with the processing unit, wherein
   the processing unit outputs a control signal for controlling the photoelectric conversion device.

9. The printer according to claim 1, wherein
   the ink tank includes a filling port into which the ink is filled by a user and a discharging port for discharging the ink toward the print head, and
   the substrate is closer to the discharging port than to the filling port.

10. The printer according to claim 9, further comprising:
    a window portion for visually recognizing ink in the ink tank, wherein
    the window portion is closer to the filling port than to the discharging port.

11. The printer according to claim 1, wherein
    a plurality of the ink tanks are arranged in a first direction, and
    the processing unit detects an amount of ink in each of the plurality of ink tanks based on an output of the photoelectric conversion device by relatively moving the substrate and the ink tanks in the first direction.

* * * * *